(12) United States Patent
Nelson et al.

(10) Patent No.: US 11,522,707 B2
(45) Date of Patent: Dec. 6, 2022

(54) SYSTEM AND METHOD FOR DETECTING COMPROMISED DEVICES

(71) Applicant: Eclypses, Inc., Marco Island, FL (US)

(72) Inventors: Robert E. Nelson, Franktown, CO (US); Aron J. Seader, Colorado Springs, CO (US)

(73) Assignee: Eclypses, Inc., Marco Island, FL (US)

( * ) Notice: Subject to any disclaimer, the term of this patent is extended or adjusted under 35 U.S.C. 154(b) by 90 days.

(21) Appl. No.: 17/193,569

(22) Filed: Mar. 5, 2021

(65) Prior Publication Data

US 2022/0286288 A1 Sep. 8, 2022

(51) Int. Cl.
  *G06F 21/00* (2013.01)
  *H04L 29/06* (2006.01)
  *H04L 9/32* (2006.01)
  *H04L 9/08* (2006.01)

(52) U.S. Cl.
  CPC .......... *H04L 9/3226* (2013.01); *H04L 9/0819* (2013.01); *H04L 9/0866* (2013.01); *H04L 9/0869* (2013.01)

(58) Field of Classification Search
  CPC ... H04L 9/3226; H04L 9/0819; H04L 9/0866; H04L 9/0869
  See application file for complete search history.

(56) References Cited

U.S. PATENT DOCUMENTS

| | | |
|---|---|---|
| 5,654,531 A | 8/1997 | Farabee et al. |
| 5,748,740 A | 5/1998 | Curry et al. |
| 5,889,860 A | 3/1999 | Eller et al. |
| 5,917,913 A | 6/1999 | Wang |
| 6,148,342 A | 11/2000 | Ho |
| 6,173,207 B1 | 1/2001 | Eidson |
| 7,171,693 B2 | 1/2007 | Tucker et al. |
| 7,568,114 B1 | 7/2009 | Schlafly |
| 7,720,864 B1 | 5/2010 | Muth et al. |
| 7,937,579 B2 | 5/2011 | Peckover |

(Continued)

FOREIGN PATENT DOCUMENTS

| | | |
|---|---|---|
| WO | 2001/080141 | 10/2001 |
| WO | 2006/094316 | 9/2006 |
| WO | 2019/165175 | 8/2019 |

OTHER PUBLICATIONS

International Search Report and Written Opinion dated Jun. 6, 2019 in connection with PCT/US2019/019096.

(Continued)

*Primary Examiner* — Lisa C Lewis
(74) *Attorney, Agent, or Firm* — Akerman LLP

(57) ABSTRACT

According to one example, a system includes a first computing device that performs one or more tests that indicate whether the first computing device is compromised. In response to a determination that the first computing device passed the one or more tests, the first computing device manipulates an authentication code to generate a first seed value. In response to a determination that the first computing device failed the one or more tests, the first computing device manipulates the authentication code to generate a second seed value. The first computing device also determines data for transmittal to a second computing device, modifies the data using the first seed value or the second seed value, and transmits the modified data for receipt by the second computing device.

20 Claims, 10 Drawing Sheets

(56) References Cited

U.S. PATENT DOCUMENTS

| | | | |
|---|---|---|---|
| 7,941,376 | B2 | 5/2011 | Peckover |
| 7,970,669 | B1 | 6/2011 | Santos |
| 8,055,913 | B2 | 11/2011 | Ginter et al. |
| 8,077,871 | B2 | 12/2011 | Kato |
| 8,261,058 | B2 | 9/2012 | Peckover |
| 8,359,271 | B2 | 1/2013 | Peckover |
| 8,543,806 | B2 | 9/2013 | Peckover |
| 8,613,107 | B2 | 12/2013 | Peckover |
| 8,639,947 | B2 | 1/2014 | Elovici et al. |
| 8,670,564 | B1 | 3/2014 | Clayton |
| 8,826,448 | B2 | 9/2014 | Peckover |
| 8,965,066 | B1 | 2/2015 | Derakhshani et al. |
| 9,009,829 | B2 | 4/2015 | Stolfo et al. |
| 9,037,858 | B1 | 5/2015 | Juels et al. |
| 9,921,561 | B2 | 3/2018 | Schoenberg |
| 10,042,589 | B2 | 8/2018 | Schoenberg |
| 10,291,403 | B2 | 5/2019 | Ligatti |
| 10,452,320 | B2 | 10/2019 | Schoenberg |
| 10,503,133 | B2 | 12/2019 | Schoenberg |
| 11,012,722 | B2 | 5/2021 | Reynolds |
| 2002/0026321 | A1 | 2/2002 | Faris et al. |
| 2002/0112178 | A1 | 8/2002 | Scherr |
| 2002/0178370 | A1 | 11/2002 | Gurevich |
| 2005/0125150 | A1 | 6/2005 | Wang et al. |
| 2005/0235163 | A1 | 10/2005 | Forienza |
| 2005/0256822 | A1 | 11/2005 | Hollingworth |
| 2006/0010074 | A1 | 1/2006 | Zeitsiff et al. |
| 2006/0126838 | A1 | 6/2006 | Taleb et al. |
| 2007/0177718 | A1 | 8/2007 | Shimosato |
| 2007/0250930 | A1 | 10/2007 | Aziz et al. |
| 2008/0065891 | A1 | 3/2008 | Karamchedu et al. |
| 2008/0222734 | A1 | 9/2008 | Redlich et al. |
| 2008/0244721 | A1 | 10/2008 | Barrus |
| 2008/0270764 | A1 | 10/2008 | McMillen et al. |
| 2008/0307005 | A1 | 12/2008 | Pettigrew, Jr. |
| 2009/0106154 | A1 | 4/2009 | Reynolds et al. |
| 2009/0254572 | A1 | 10/2009 | Redich et al. |
| 2010/0092048 | A1 | 4/2010 | Pan et al. |
| 2010/0250497 | A1 | 9/2010 | Redlich et al. |
| 2010/0280909 | A1 | 11/2010 | Zhang et al. |
| 2010/0306072 | A1 | 12/2010 | Ford, Jr. et al. |
| 2011/0047081 | A1 | 2/2011 | Kelly et al. |
| 2011/0083020 | A1 | 4/2011 | Michiels et al. |
| 2011/0161671 | A1 | 6/2011 | Whitehouse |
| 2012/0042162 | A1 | 2/2012 | Anglin et al. |
| 2013/0097085 | A1 | 4/2013 | Peckover |
| 2013/0117561 | A1 | 5/2013 | Chawla et al. |
| 2013/0136258 | A1 | 5/2013 | Grube |
| 2013/0218738 | A1 | 8/2013 | Senapati et al. |
| 2013/0339697 | A1 | 12/2013 | Bonanno et al. |
| 2014/0023193 | A1 | 1/2014 | Landheer |
| 2014/0115724 | A1 | 4/2014 | Van Brandenburg |
| 2014/0279553 | A1 | 9/2014 | Kassemi et al. |
| 2014/0281539 | A1* | 9/2014 | Faltyn .................. H04L 9/0866 713/168 |
| 2015/0244573 | A1 | 8/2015 | Pirko |
| 2015/0244574 | A1 | 8/2015 | Pirko |
| 2015/0270955 | A1 | 9/2015 | Arnold et al. |
| 2015/0278085 | A1 | 10/2015 | Bybell et al. |
| 2016/0267022 | A1 | 9/2016 | Schoenberger et al. |
| 2016/0274912 | A1 | 9/2016 | Schoenberger et al. |
| 2017/0012974 | A1 | 1/2017 | Sierra et al. |
| 2017/0026174 | A1 | 1/2017 | Pang et al. |
| 2018/0034632 | A1 | 2/2018 | De Atley et al. |
| 2019/0261028 | A1 | 8/2019 | Reynolds |
| 2019/0372945 | A1 | 12/2019 | Reynolds |
| 2021/0211416 | A1* | 7/2021 | Mossoba ................. G06F 21/31 |
| 2021/0258158 | A1 | 8/2021 | Nelson et al. |

OTHER PUBLICATIONS http://securecloudsystems.com/our-solutions/your-challenge/.
http://social.technet.microsoft.com/wiki/contents/articles/12956.biztalk-server-list-of-third-party-adapters.aspx.
http://docs.oracle.com/cd/E18727_01/doc.121/e13570/T172155T172160.htm.
https://web.archive.org/web/20121204005735/http:/www.transcertain.com/Services.html#CertainStore.
Alexandrov et al., "Superweb: Research Issues in Java-Based Global Computing", Department of Computer Science, University of California, 1996.
Ajmani et al., "A Trusted Third-Party Computation Service", MIT Laboratory for Computer Science, 2001.
International Search Report and Written Opinion issued in connection with PCT/US16/22897.
U.S. Appl. No. 17/193,564 for System and Method for Securely Transferring Data, filed Mar. 5, 2021.

* cited by examiner

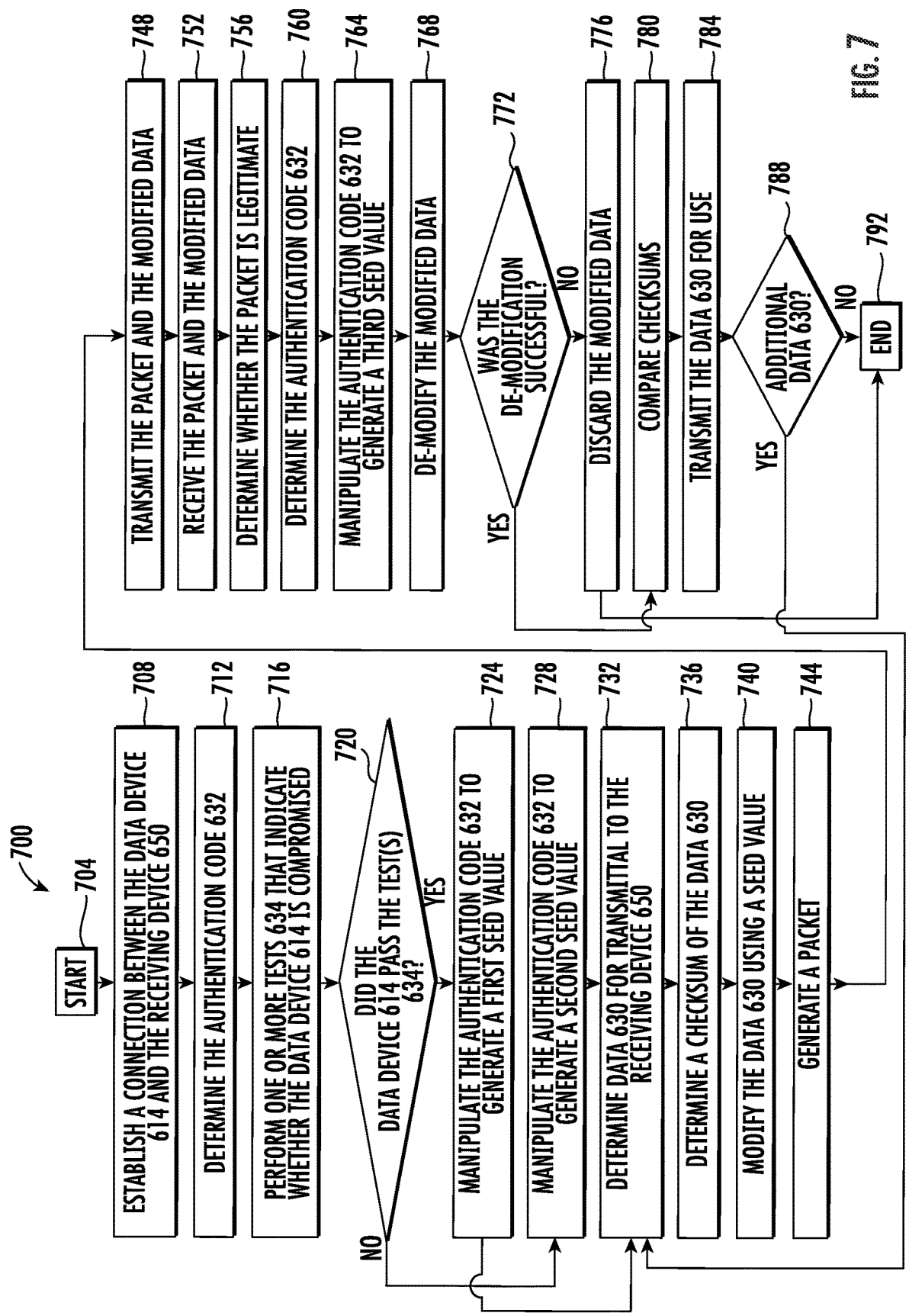

SYSTEM AND METHOD FOR DETECTING COMPROMISED DEVICES

TECHNICAL FIELD

This disclosure relates generally to the field of computer-based communication, and more specifically to a system and method for securely transferring data, and a system and method for detecting compromised devices.

BACKGROUND

Typically, a device may transmit data to another device in an unsecured manner or using traditional security measures (e.g., Secure Sockets Layer (SSL) protocol). These traditional methods of transferring data, however, may be deficient.

Furthermore, a device (e.g., a mobile device) can typically be compromised (e.g., jailbroken, rooted) to provide additional access to the mobile device. For example, a mobile device can be jailbroken to provide access to the entire file system of the mobile device. When a mobile device is compromised, it may be freed from the limitations imposed on the device by its manufacture (e.g., APPLE) and/or the mobile service carrier (e.g., AT&T). As such, the compromised mobile device may be able to do things it previously could not, such as install unofficial applications and modify settings. This compromised mobile device may present a security risk. Unfortunately, traditional methods for detecting such compromised mobile devices may be deficient.

SUMMARY

In a first example, a system includes a first computing device that has one or more processors configured to determine data for transmittal to a second computing device, and determine transmittal mapping data. The processers are further configured to break the data into one or more portions, and, for each of the one or more portions of the data, the processors are also configured to replace the respective portion of the data with a transmittal token included in the transmittal mapping data. The processors are also configured to transmit the transmittal tokens for receipt by the second computing device.

In a second example, a system includes a first computing device that has one or more processors configured to perform one or more tests that indicate whether the first computing device is compromised. In response to a determination that the first computing device passed the one or more tests, the processors are configured to manipulate an authentication code to generate a first seed value. In response to a determination that the first computing device failed the one or more tests, the processors are configured to manipulate the authentication code to generate a second seed value. The processors are also configured to determine data for transmittal to a second computing device, modify the data using the first seed value or the second seed value, and transmit the modified data for receipt by the second computing device.

BRIEF DESCRIPTION OF THE FIGURES

For a more complete understanding of the present disclosure and its features and advantages, reference is now made to the following description, taken in conjunction with the accompanying drawings, in which:

FIG. 7 illustrates a method for detecting compromised devices.

DETAILED DESCRIPTION

Embodiments of the present disclosure are best understood by referring to FIGS. 1-7 of the drawings, like numerals being used for like and corresponding parts of the various drawings.

System and Method for Securely Transferring Data

Typically, a device may transmit data to another device in an unsecured manner. This, however, may be problematic, as an unauthorized entity (e.g., a hacker) may be able to listen to, capture, or otherwise access the transmitted data. Furthermore, even when the device transmits that data using traditional security measures, an unauthorized entity may still be able to access the data. For example, some data may be sent via SSL protocol, which may be susceptible to hacking. As another example, some data may be encrypted using one or more encryption keys prior to the data being sent. These encryption keys, however, are typically stored at the first device (i.e., the device sending the data) and/or the second device (i.e., the device receiving the data). As such, an unauthorized entity may hack one or more of these devices in order to obtain the encryption keys, thereby gaining access to the transmitted data.

Figure 1A:
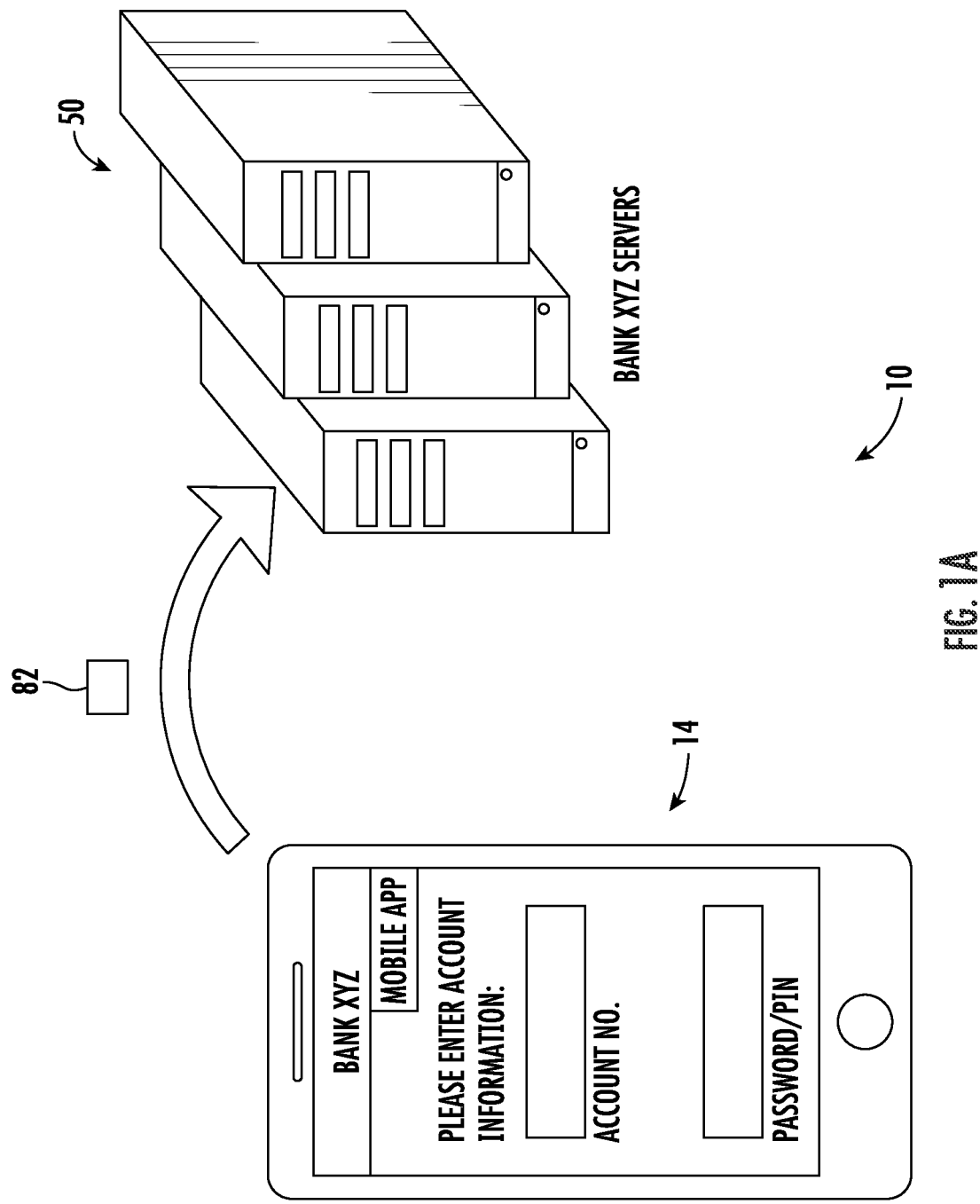
FIGS. 1A-1B illustrate an example system for securely transferring data.
Figure 1B:
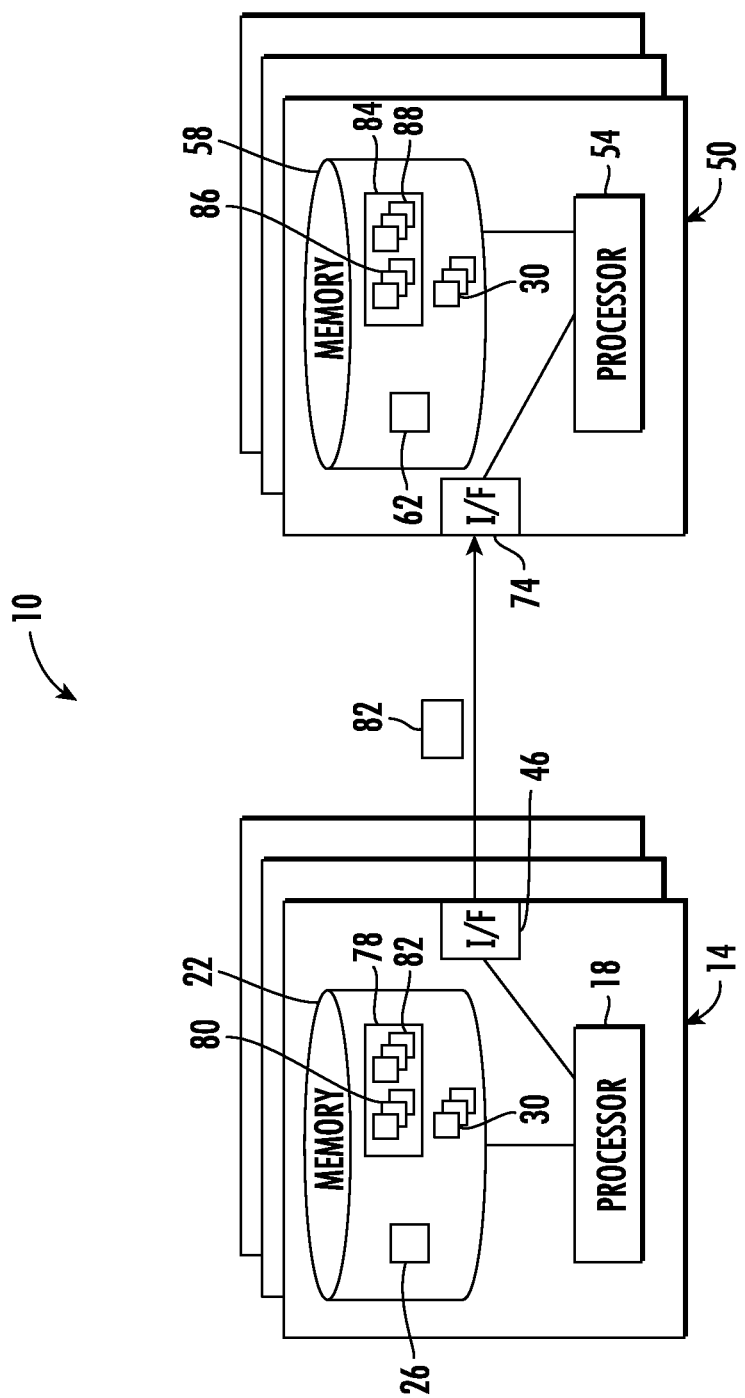

Contrary to this, the system 10 of FIGS. 1A-1B may address one or more of these deficiencies. FIGS. 1A-1B illustrate an example system 10 for securely transferring data 30. In one example of operation, system 10 includes a data device 14 (e.g., a mobile phone) that determines data 30 (e.g., bank account information input by a user) for transmittal to a receiving device 50 (e.g., a server). When the data device 14 is preparing to transmit the data 30 (e.g., the bank account information) to the receiving device 50 (e.g., the server), the data device 14 determines a transmittal token 82 (e.g., a set of characters and/or bytes, such as "/AtHM4b#") for each of one or more portions of the data 30, and then replaces each of the portions of the data 30 with the transmittal token 82. Then, the data device 14 transmits the transmittal tokens 82 to the receiving device 50. The actual data 30, however, is not sent to the receiving device 50.

Following reception of the transmittal tokens 82, the receiving device 50 matches each of the transmittal tokens 82 (e.g., "/AtHM4b#") to a reception token 88 (e.g., "/AtHM4b#"). Based on these matches, the receiving device 50 determines (e.g., rebuilds) the data 30 (e.g., the bank account information input by a user at the data device 14). This allows the receiving device 50 to determine and utilize the data 30 without the data 30 being actually transmitted from the data device 14 to the receiving device 50, in some examples. Instead, transmittal tokens 82 are sent to the receiving device 50 (instead of the data 30). This prevents an unauthorized entity from listening, capturing, or otherwise accessing the data 30 during transmittal, in some examples.

In the example illustrated in FIGS. 1A-1B, the system 10 includes the data device 14. The data device 14 may be any device that receives data, stores data, and/or transmits data (e.g., data 30). For example, the data device 14 may be (or may include) a personal computer, a laptop, a mobile telephone (such as a Smartphone), an electronic notebook, a personal digital assistant, a host computer, a workstation, a web server, a network server, any suitable remote server, a mainframe, a file server, any other computing or processing device, any other device for receiving data, storing data, and/or transmitting data, or any combination of the preceding. The functions of the data device 14 may be performed by any suitable combination of one or more servers or other components at one or more locations. In an example where the data device 14 is a server, the server may be a private server, and the server may be a virtual or physical server. The server may include one or more servers at the same or remote locations. Also, the data device 14 may be (or may include) any suitable component that functions as a server. In the example illustrated in FIGS. 1A-1B, the data device 14 is a mobile telephone. Furthermore, in the example illustrated in FIG. 1B, the data device 14 includes a computer/data processor 18 and data storage medium 22 (e.g., memory) comprising instructions 26 executable by the processor 18 to perform the functions of the data device 14. Additionally, the data device 14 includes a communication port 46 (e.g., receiver, transmitter, transceiver, network interface) configured to receive and transmit information (e.g., receive requests for data, transmit data). Further example details of data device 14 and/or its components are discussed below.

As is discussed above, the data device 14 may be any device that receives data, stores data, and/or transmits data. This data refers to data 30, in some examples. Data 30 represents any type of information. For example, data 30 may be personal information (e.g., a social security number, membership identifier, name, address), business information (e.g., a document, spreadsheet, or other information created, used, and/or received by a business), medical information (e.g., a medical report, a medical diagnosis, a medical bill), financial information (e.g., information regarding investments, credit card information, bank information, account number), security information (e.g., a password, personal access number), a document (e.g., a word document, an excel spreadsheet, a pdf), an audio file (e.g., a music file), a video file (e.g., a movie file, a tv show file, a video clip), account information, a completed voting ballot (e.g., for voting in an election for public office), any other type of information, or any combination of the preceding. Data 30 further represents any portion of information. For example, data 30 may be an entire spreadsheet (or other document, such as a word document), or it may be a portion of an entire spreadsheet (or other document), such as only social security numbers or other personal information included in the spreadsheet (or other document). As another example, data 30 may be an entire medical report, or it may be a portion of the medical report, such as only personal information included in the medical report and/or the diagnosis in the medical report.

Data 30 may be input by a user into the data device 14, in some examples. For example, data 30 may be account information input by a user into the data device 14 (e.g., input into a web browser on the data device 14, input into an "app", such as a mobile application, executed by the data device 14), or selected by a user from a selection displayed on the data device 14. Data 30 may be stored by the data device 14, in other examples. For example, data 30 may be a document stored in memory in the data device 14.

As is discussed above, when the data device 14 is preparing to transmit the data 30 to the receiving device 50, the data device 14 may (1) determine a transmittal token 82 (e.g., a set of characters and/or bytes, such as "/AtHM4b#") for each of one or more portions of the data 30, then the data device 14 may (2) replace each of the portions of the data 30 with the transmittal token 82, and then the data device 14 may (3) send the transmittal tokens 82 to the receiving device (instead of the data 30). To do this, the data device 14 includes transmittal mapping data 78, in some examples. This transmittal mapping data 78 may include transmittal byte values 80, and transmittal tokens 82, in some examples. Furthermore, this transmittal mapping data 78 may allow each byte in the data 30 to be mapped to (and replaced with) a transmittal token 82.

A transmittal byte value 80 represents a value of one byte of data. In computer technology, a byte contains 8 bits, and each of these bits can be either a 0 or a 1. This means that a byte can have a value from 00000000 to 11111111, and any combination between. There are 256 different combinations between 00000000 to 11111111. As such, there are 256 different possible values of a byte, and each of these values is referred to as a number from 0-255 (for a total of 256). Each transmittal byte value 80 represents one of the 256 different possible values of a byte, in some examples.

In the example illustrated in FIGS. 1A-1B, each transmittal byte value 80 (e.g., 0-255) represents a single character of data (e.g., a number, a letter, a symbol). As examples of this, in the English language, the transmittal byte value "33" may represent the symbol "!", the transmittal byte value "38" may represent the symbol "&", the transmittal byte value "49" may represent the number "1", the transmittal byte value "57" may represent the number "9", the transmittal byte value "65" may represent the letter "A", the transmittal byte value "90" may represent the letter "Z", the transmittal byte value "97" may represent the letter "a", and the transmittal byte value "122" may represent the "z". In this example, the word "Hello" may be represented by the following transmittal byte values 80: "H" is represented by transmittal byte value "72", "e" is represented by transmittal byte value "101", "l" is represented by transmittal byte value "108", "l" is represented by transmittal byte value "108", and "o" is represented by transmittal byte value "111". In other examples, each transmittal byte value 80 may represent multiple characters of data.

Data device 14 may include any number of transmittal byte values 80. For example, data device 14 may include 256 different transmittal byte values 80, 128 different transmittal byte values 80, 64 different transmittal byte values 80, or any other number of transmittal byte values 80. In some examples, data device 14 includes a sufficient number of transmittal byte values 80 to fully represent any data 30. For example, data device 14 may include a sufficient number of transmittal byte values 80 to represent every number, symbol, letter, and/or other character in data 30. In the example illustrated in FIGS. 1A-1B, data device 14 includes 256 different transmittal byte values 80.

A transmittal token 82 is a set of data that is used to replace one or more portions of data 30, in some examples. The transmittal token 82 may be any type of data. For example, the transmittal token 82 may be a set of numbers, a set of letters (e.g., A, B, C, etc.), a set of numbers and letters, a set of symbols (e.g., %, !, ?, etc.), a set of bytes, a code, any other grouping of characters and/or bytes, or any combination of the preceding. The transmittal token 82 may have any length. For example, the transmittal token 82 may be an eight character token, a sixteen character token, a 32 character token, a token with a length between eight characters and 32 characters, or a token with any other length.

Although the transmittal token 82 is a set of data, it does not include any information that would allow the data 30 to be determined by an unauthorized user, in some examples. For example, if the data 30 is the message "Hello", the five transmittal tokens 82 that are sent to the receiving device 50 may be (1) "/AtHM4b#, (2) "q?5;dS)H, (3) "Bm)z**s), (4) "{J,v*8Cc" and (5) "*0gei&jE". As such, even if an unauthorized user was able to gain access (or steal) one or more of the transmittal tokens 82, the unauthorized user would be unable to determine the data 30 (e.g., the unauthorized user would be unable to determine that the data 30 was the message "Hello").

Each transmittal token 82 may be assigned to a transmittal byte value 80. This assignment may refer to any manner of allocating a particular transmittal token 82 (e.g., "/AtHM4b#") to a particular transmittal byte value 80 (e.g., the transmittal byte value 80 that represents the letter "H"). Examples of this assignment are discussed below with regard to FIGS. 2-3. The assignment may allow the data device 14 to determine a transmittal token 82 for a portion of the data 30. As an example of this, the data device 14 may (1) determine a byte (e.g., the character "H") that is included in the data 30, (2) determine a transmittal byte value 80 (e.g., the value "72" which represents the matching character "H"), and (3) determine the transmittal token 82 (e.g., "/AtHM4b#") that is assigned to the determined transmittal byte value 80. This may allow the data device 14 to replace the character "H" in data 30 with the transmittal token 82 "/AtHM4b#".

Each transmittal token 82 may be assigned to only a single transmittal byte value 80. Furthermore, the assignment may be changed if the transmittal token 82 has already been used. For example, if data 30 includes the character "H" twice, the first character "H" may be replaced with a first transmittal token 82 (e.g., "/AtHM4b#"), and the second character "H" may be replaced with a second transmittal token 82 (e.g., "-6K82!(@"). To allow for this change, the data device 14 may determine when the first transmittal token 82 has been used. Then, when it has been used, the data device 14 may (1) unassign the first transmittal token 82 (e.g., "/AtHM4b#") from the transmittal byte value 80 (e.g., the value "72" which represents the matching character "H"), (2) dynamically generate (e.g., or otherwise determine) the second transmittal token 82 (e.g., "-6K82!(@"), and (3) assign the second transmittal token 82 (e.g., "-6K82!(@") to the transmittal byte value 80 (e.g., the value "72" which represents the matching character "H"). This prevents the same transmittal token 82 from being used multiple times in the same transmittal message, in some examples.

The data device 14 may utilize a pseudo random bit generator to generate and/or assign the transmittal tokens 82. A pseudo random bit generator may alternatively be referred to as a Deterministic Random Bit Generator (DRBG). Examples of a pseudo random bit generator (or a DRBG) include ISAAC (Indirection, Shift, Accumulate, Add, and Count), ISAAC-64, Hash DRBG SHA-1, Hash DRBG SHA-256, Hash DRBG SHA-512, Cipher DRBG AES-128, Cipher DRBG AES-192, Cipher DRBG AES-256, any other pseudo random bit generator (or DRBG), or any other system or method for creating deterministically random numbers.

In the illustrated example, the system 10 further includes the receiving device 50. The receiving device 50 may be any device that receives transmittal tokens 82 from data device 14 and/or processes data 30. For example, the receiving device 50 may be (or may include) a personal computer, a laptop, a mobile telephone (such as a Smartphone), an electronic notebook, a personal digital assistant, a cable box, a networked television (such as a smart television), a smart monitor or smart display device, a smart projector, a host computer, a workstation, a web server, a network server, any suitable remote server, a mainframe, a file server, any other computing or processing device, any other device that receives transmittal tokens 82 from data device 14 and/or processes data 30, or any combination of the preceding. As is illustrated in FIGS. 1A-1B, the receiving device 50 is a server that the user of the data device 14 is communicating with via a mobile app executed on the data device 14.

Furthermore, as is also illustrated in FIG. 1B, the receiving device 50 includes a computer/data processor 54 and data storage medium 58 (e.g., memory) comprising instructions 62 executable by the processor 54 to perform the functions of the receiving device 50. Additionally, the receiving device 50 includes a communication port 74 (e.g., receiver, transmitter, transceiver, network interface) configured to receive and transmit information (e.g., receive transmittal tokens 82, transmit requests for data 30). Further example details of receiving device 50 and/or its components are discussed below.

As is discussed above, the receiving device 50 may receive the transmittal tokens 82 from the data device 14. Following reception of the transmittal tokens 82, the receiving device 50 may match each of the transmittal tokens 82 (e.g., "/AtHM4b#") to a reception token 88 (e.g., "/AtHM4b#"). Based on these matches, the receiving device 50 may determine (e.g., rebuild) the data 30. This allows the receiving device 50 to determine and utilize the data 30 without the data 30 being transmitted from the data device 14 to the receiving device 50, in some examples. To do this, the receiving device 50 includes reception mapping data 84, in some examples. This reception mapping data 84 may include reception byte values 86, and reception tokens 88, in some examples.

A reception byte value 86 represents a value of one byte of data. For example, each reception byte value 86 may represent one of the 256 different possible values of a byte. Furthermore, each reception byte value 86 (e.g., 0-255) may represent a single character of data (e.g., a number, a letter, a symbol), or may represent multiple characters of data. As examples of this, in the English language, the reception byte value "33" may represent the symbol "!", the reception byte value "38" may represent the symbol "&", the reception byte value "49" may represent the number "1", the reception byte value "57" may represent the number "9", the reception byte value "65" may represent the letter "A", the reception byte value "90" may represent the letter "Z", the reception byte value "97" may represent the letter "a", and the reception byte value "122" may represent the letter "z".

Receiving device 50 may include any number of reception byte values 86. For example, receiving device 50 may include 256 different reception byte values 86, 128 different reception byte values 86, 64 different reception byte values 86, or any other number of reception byte values 86. In some examples, receiving device 50 includes a sufficient number of reception byte values 86 to fully determine any data 30. For example, receiving device 50 may include a sufficient number of reception byte values 86 to determine every number, symbol, letter, and/or other character in data 30. In the example illustrated in FIGS. 1A-1B, receiving device 50 includes 256 different reception byte values 86.

In the example illustrated in FIGS. 1A-1B, the reception byte values 86 included in the receiving device 50 match the transmittal byte values 80 included in the data device 14. As an example of this, the reception byte value "65" and the transmittal byte value "65" may both represent the letter "A". This may allow the receiving device 50 to determine (e.g., rebuild) the data 30.

A reception token 88 is a set of data that is used to determine one or more portions of data 30, in some examples. The reception token 88 may be any type of data. For example, the reception token 88 may be a set of numbers, a set of letters (e.g., A, B, C, etc.), a set of numbers and letters, a set of symbols (e.g., %, !, ?, etc.), a set of bytes, a code, any other grouping of characters and/or bytes, or any combination of the preceding. The reception token 88 may have any length. For example, the reception token 88 may be an eight character token, a sixteen character token, a 32 character token, a token with a length between eight characters and 32 characters, or a token with any other length.

Although the reception token 88 is a set of data, it does not include any information that would allow the data 30 to be determined by an unauthorized user, in some examples. For example, if the data 30 is the message "Hello", the five reception tokens 88 that are used to determine the data 30 may be (1) "/AtHM4b#", (2) "q?S;dS)H", (3) "Bm)z**s)", (4) "{J,v*8Cc", and (5) "*0gei&jE". As such, even if an unauthorized user was able to gain access (or steal) a reception token 88, the unauthorized user would be unable to determine the data 30 (e.g., the unauthorized user would be unable to determine that the data 30 was the message "Hello").

Each reception token 88 may be assigned to a reception byte value 86. This assignment may refer to any manner of allocating a particular reception token 88 (e.g., "/AtHM4b#") to a particular reception byte value 86 (e.g., the reception byte value 86 that represents the letter "H"). Examples of this assignment are discussed below with regard to FIGS. 2-3. The assignment may allow the receiving device 50 to determine the data 30. As an example of this, the receiving device 50 matches each of the transmittal tokens 82 (e.g., "/AtHM4b#") to a reception token 88 (e.g., "/AtHM4b#"). For each match, the receiving device 50 may then determine the reception byte value 86 that is assigned to the matched reception token 88. The receiving device 50 may then utilize these determined reception byte values 86 to determine (e.g., rebuild) the data 30.

Each reception token 88 may be assigned to only a single reception byte value 86. Furthermore, the assignment may be changed if the reception token 88 has already been used. To allow for this change, the receiving device 50 may determine when the first reception token 88 (e.g., "/AtHM4b#") has been used. Then, when it has been used, the receiving device 50 may (1) dynamically generate (e.g., or otherwise determine) the second reception token 88 (e.g., "−6K82!(@"), and (2) assign the second reception token 88 (e.g., "−6K82!(@") to the reception byte value 86 (e.g., the value "72" which represents the matching character "H").

In the example illustrated in FIGS. 1A-1B, the reception tokens 88 included in the receiving device 50 match the transmittal tokens 82 included in the data device 14. For example, a transmittal token 82 may be "/AtHM4b#" and the matching reception token 88 may also be "/AtHM4b#". Additionally, the assignments of the reception tokens 88 to the reception byte values 86 match the assignments of the transmittal tokens 82 to the transmittal byte values 80. For example, the reception token "/AtHM4b#" may be assigned to the reception bye value "72" (which represents the character "H"), and the matching transmittal token "/AtHM4b#" may be assigned to the matching transmittal bye value "72" (which represents the character "H"). This may allow the receiving device 50 to determine the data 30, in some examples.

The receiving device 50 may utilize a pseudo random bit generator (or a DRBG) to generate and/or assign the reception token 88. Examples of this pseudo random bit generator include ISAAC, ISAAC-64, Hash DRBG SHA-1, Hash DRBG SHA-256, Hash DRBG SHA-512, Cipher DRBG AES-128, Cipher DRBG AES-192, Cipher DRBG AES-256, any other pseudo random bit generator (or DRBG), or any other system or method for creating deterministically random numbers. The pseudo random bit generator used by the receiving device 50 is the same as the pseudo random bit generator used by the data device 14, in some examples. As such, the data device 14 may generate and assign transmittal tokens 82 using a particular pseudo random bit generator, and the receiving device 50 may generate and assign reception tokens 88 using the same particular pseudo random bit generator. Furthermore, both the data device 14 and the receiving device 50 may utilize the same seed value(s) for their same pseudo random bit generator. This may result in both the data device 14 and the receiving device 50 dynamically generating and assigning matching transmittal tokens 82 and reception tokens 88.

Modifications, additions, or omissions may be made to system 10 without departing from the scope of the disclosure. For example, system 10 may include any number of data devices 14 and/or receiving devices 50 (and/or any number of components, such as processors or memory units illustrated or described in the above devices). Also, any suitable logic may perform the functions of system 10 and the components and/or devices within system 10. Furthermore, one or more components of system 10 may be separated, combined, and/or eliminated.

Furthermore, although data device 14 and receiving device 50 have been described above as being separate devices, in some examples, they may both be integrated into the same device. In such an example, the data device 14 may refer to a first process being performed within a single device (e.g., within a server), and the receiving device 50 may refer to a second process being performed within the same single device (e.g., within the server). This may allow the single device to securely transfer data between two separate processes being performed by the single device. The device (e.g., a server) may utilize a first processor to perform the process of the data device 14, and may further utilize a second processor to perform the process of the receiving device 50. Alternatively, the process of the data device 14 and the process of the receiving device 50 may be performed by the same processor(s) within the single device.

Figure 2:
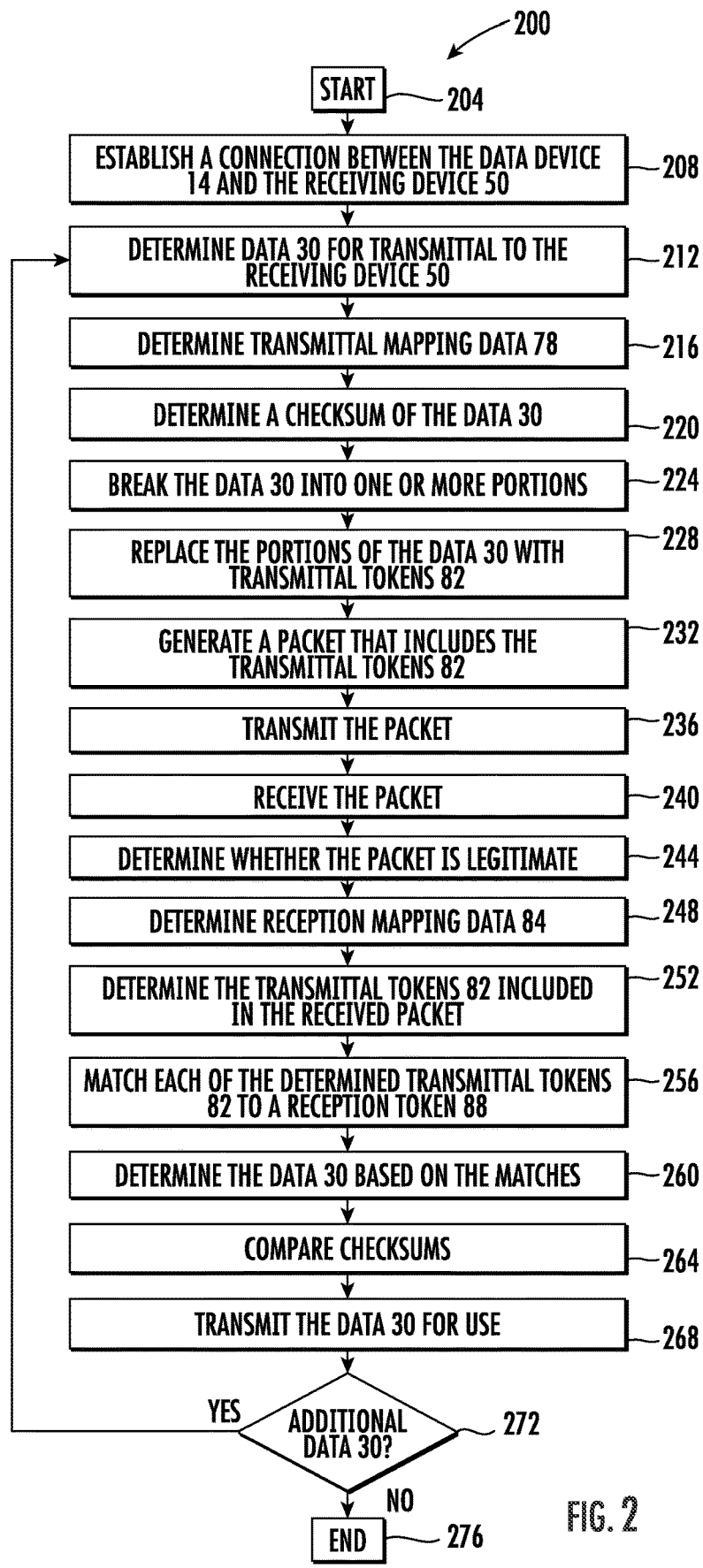
FIG. 2 illustrates an example method for securely transferring data.

FIG. 2 illustrates an example method for securely transferring data. As is illustrated, method 200 of FIG. 2 illustrates an example of securely transferring data 30 from data device 14 to receiving device 50 of FIGS. 1A-1B. However, the steps of method 200 may be utilized to securely transfer data 30 (or any other data) from any device to any other device.

Method 200 beings at step 204. At step 208, a connection is established between data device 14 and the receiving device 50. The connection refers to any type of connection that allows the data device 14 to communicate with the receiving device 50 (and vice versa) so as to transfer data 30, in some examples.

The connection process between the data device 14 and the receiving device 50 may include a pairing process. The pairing process may be any process that synchronizes the receiving device 50 with the data device 14. For example, the pairing process may involve sending one or more messages between the receiving device 50 and the data device 14 in order to synchronize the receiving device 50 with the data device 14. Such synchronization may include checking or verifying that both the receiving device 50 and the data device 14 have one or more of the same pseudo random bit generators, synchronizing the pseudo random bit generators, any other manner of synchronizing the receiving device 50 with the data device 14, or any combination of the preceding. In some examples, the pairing process may not be performed during the connection process. For example, the receiving device 50 and the data device 14 may have been previously paired (e.g., at the factory or in any other secure method or system) and may not need to be paired again. If the receiving device 50 or the data device 14 is missing information used for synchronization (e.g., the receiving device 50 does not have the same pseudo random bit generator), the pairing process may, in some examples, cause the receiving device 50 or the data device 14 to generate the missing information, download the information, otherwise retrieve the missing information, or any combination of the preceding.

The pairing process may further include a synchronization of the pseudo random bit generator(s) included in the data device 14 and the receiving device 50, in some examples. This synchronization of the pseudo random bit generator(s) allows the data device 14 and receiving device 50 to generate matching transmittal mapping data 78 (e.g., transmittal tokens 82) and reception mapping data 82 (e.g., reception tokens 88), in some examples. The synchronization of the pseudo random bit generator(s) may occur in any manner. For example, to synchronize the pseudo random bit generator(s), the data device 14 and the receiving device 50 may both generate, determine, and/or receive one or more seed values (e.g., one seed value, three seed values) that may be input into the pseudo random bit generator(s). These same seed value(s) may synchronize the pseudo random bit generator(s), causing them to independently generate and assign matching transmittal tokens 82 and reception tokens 88. After this initial synchronization (i.e., initialization process or re-initialization process), information transferred (e.g., transmittal tokens 82) during communication between the data device 14 and the receiving device 50 may be used to keep the pseudo random bit generator(s) synchronized, in some examples.

At step 212, the data device 14 determines data 30 for transmittal to the receiving device 50. The data device 14 may determine data 30 in any manner. For example, the data device 14 may determine the data 30 when it is input by a user (or any other entity). As an example of this, the user may input their social security number into a fillable graphical box displayed on the display screen of the data device 14 (or the social security number may be auto filled by a program running on the data device 14), and then the user may activate a button that authorizes the transmittal of the input social security number. When the user activates this button, the data device 14 may determine that this social security number is data 30 that is to be transmitted to the receiving device 50. As another example, the data device 14 may determine the data 30 when it is selected by a user (or any other entity). As an example of this, the user may select a file and/or document from storage (e.g., a word document stored on the data device 14 or accessible to the data device 14), and then the user may activate a button that authorizes the transmittal of the file and/or document. When the user activates this button, the data device 14 may determine that this file and/or document is data 30 that is to be transmitted to the receiving device 50. As another example of this, the user may select an option (e.g., one option from a list of different options) displayed on the display screen of the data device 14, and then the user may activate a button that authorizes the transmittal of the selected option. When the user activates this button, the data device 14 may determine that this selected option is data 30 that is to be transmitted to the receiving device 50. In other examples, the determination of the data 30 may not require user input at all. For example, the transmittal of data 30 may be an automated communication between two end points. In such an example, the determination of the data 30 may occur when the data 30 is selected (or otherwise input) by one of the end points.

At step 216, the data device 14 determines transmittal mapping data 78. As is discussed above, the transmittal mapping data 78 may allow one or more portions of the data 30 to be replaced with a transmittal token 82. This allows the transmittal tokens 82 to be transmitted to the receiving device 50 (as opposed to the data 30, itself), in some examples.

The transmittal mapping data 78 may be determined in any manner. As one example of this, the transmittal mapping data 78 may be determined by (1) determining an order of the transmittal byte values 80, (2) generating the transmittal tokens 82, and then (3) assigning each of the transmittal tokens 82 to a transmittal byte value 80.

The data device 14 may determine an order of the transmittal byte values 80 in any manner. As one example of this, the data device 14 may randomize the order of each of the transmittal byte values 80 (e.g., all 256 transmittal byte values 80 may be randomly ordered). The data device 14 may randomize the order of the transmittal byte values 80 using any method. For example, the data device 14 may randomize the order of the transmittal byte values 80 using the pseudo random bit generator and one or more seed values. In such an example, one or more seed values may be input into the pseudo random bit generator to randomize the order of the transmittal byte values 80.

The data device 14 may generate the transmittal tokens 82 in any manner. For example, the data device 14 may generate the transmittal tokens 82 using the pseudo random bit generator and the one or more seed values. The data device 14 may generate any number of transmittal tokens 82. For example, the data device 14 may generate a transmittal token 82 for each transmittal byte value 80.

Although the transmittal tokens 82 are described above as being generated, in some examples, the transmittal tokens 82 may be determined. The transmittal tokens 82 may be determined by being generated (as is discussed above) by the data device 14. Alternatively, the transmittal tokens 82 may be determined in any other manner. For example, the transmittal tokens 82 may be determined by selecting the transmittal tokens 82 from a group of stored transmittal tokens 82. As an example, the data device 14 may have thousands (or millions, or any other number) of possible transmittal tokens stored on disk or accessible to the data device 14 (e.g., stored on a memory unit that the data device 14 has access to). In such an example, the data device 14 may determine a particular transmittal token 82 by selecting it from these thousands (or millions, or any other number) of possible transmittal tokens. This selection of the transmittal tokens 82 may be performed in any manner (e.g., the selection may be random using the pseudo random bit generator). Furthermore, because the data device 14 may store thousands (or millions, or any other number) of the possible transmittal tokens, the vast number of possible transmittal tokens may prevent an unauthorized entity from determining which transmittal tokens 82 were used, even if the unauthorized entity were to gain access to the data device 14.

The data device 14 may also assign the transmittal tokens 82 to the transmittal byte values 80. This assignment may refer to any manner of allocating a particular transmittal token 82 (e.g., "/AtHM4b#") to a particular transmittal byte value 80 (e.g., the transmittal byte value "72" that represents the letter "H"). The data device 14 may assign the transmittal tokens 82 to the transmittal byte values 80 in any manner. For example, the data device 14 may assign the transmittal tokens 82 to the transmittal byte values 80 in the determined order (e.g., the randomized order) of the transmittal byte values 80. That is, the first generated transmittal token 82 may be assigned to the transmittal byte value 80 that is first in line in the determined order. The second generated transmittal token 82 may be assigned to the transmittal byte value 80 that is second in line in the determined order, and so on. The assignment of transmittal tokens 82 may include a checking process that prevents identical transmittal tokens 82 from being assigned to two different transmittal byte values 80.

The transmittal mapping data 78 may be determined in real time (e.g., determined only when it is needed for a secure transfer of data 30). This may prevent the transmittal mapping data 78 from having to be stored on disk. Instead, the transmittal mapping data 78 may only be stored in transient memory, as opposed to being stored on disk. Furthermore, once the transmittal tokens 82 (from the transmittal mapping data 78) are transmitted (to the receiving device 50), the order of the transmittal byte values 80, the transmittal tokens 82, and the assignment of the transmittal tokens 82 may be deleted (e.g., deleted from transient memory) or otherwise destroyed. As such, the transmittal mapping data 78 may be a one-time use transmittal mapping data that is deleted or is destroyed after its use. This may prevent the transmittal mapping data 78 from being compromised if an unauthorized entity were to access the data device 14. In some examples, all or a portion of the transmittal mapping data 78 may not be deleted or otherwise destroyed. For example, the transmittal byte values 80 may not be deleted.

The determination of the transmittal mapping data 78 by the data device 14 may refer to the data device 14 determining the transmittal mapping data 78 itself, or may refer to the data device 14 causing the transmittal mapping data 78 to be determined. For example, the data device 14 may determine the transmittal mapping data 78 by calling into a library or application installed or accessible to the data device 14, and having the library or application determine the transmittal mapping data 78 for the data device 14.

At step 220, the data device 14 (optionally) determines a checksum of the data 30. The checksum may allow errors to be detected in the data 30. For example, the checksum may be used to detect errors that have been introduced into the data 30 during its transmission and/or storage. The data device 14 may determine the checksum in any manner. For example, the data device 14 may determine the checksum using a checksum algorithm, such as Cyclic Redundancy Check (CRC) 32, SHA-1, SHA-256, or SHA-512. In some examples, the checksum may be derived from the data 30 in its raw form.

At step 224, the data device 14 breaks the data 30 into one or more portions. The data device 14 may break the data 30 into portions in any manner, and the data device 14 may break the data 30 into any number of portions. For example, the data device 14 may break the data 30 into individual bytes of data. As an example of this, if the data 30 is the message "Hello", the data 30 may be broken up into 5 bytes of data: (1) "H", (2) "e", (3) "l", (4) "l", and (5) "o". As another example of this, if the data 30 is a social security number, the data 30 may be broken up into 8 bytes of data, with one byte for each number in the social security number. In other examples, the data device 14 may break the data 30 into any other type of (or size) portion.

At step 228, the data device 14 replaces the portions of the data 30 with transmittal tokens 82. The data device 14 may replace the portions of the data 30 with transmittal tokens 82 in any manner. For example, the data device 14 may utilize the transmittal mapping data 78 in order to replace the portions of the data 30 with transmittal tokens 82. As an example of this, the data device 14 may match each portion of the data 30 (e.g., a byte of data 30) with a transmittal byte value 80. Then, the data device 14 may determine the transmittal token 82 that is assigned to the matching transmittal byte value 80. The data device 14 may then replace the portion of the data 30 with that assigned transmittal token 82.

Figure 3:
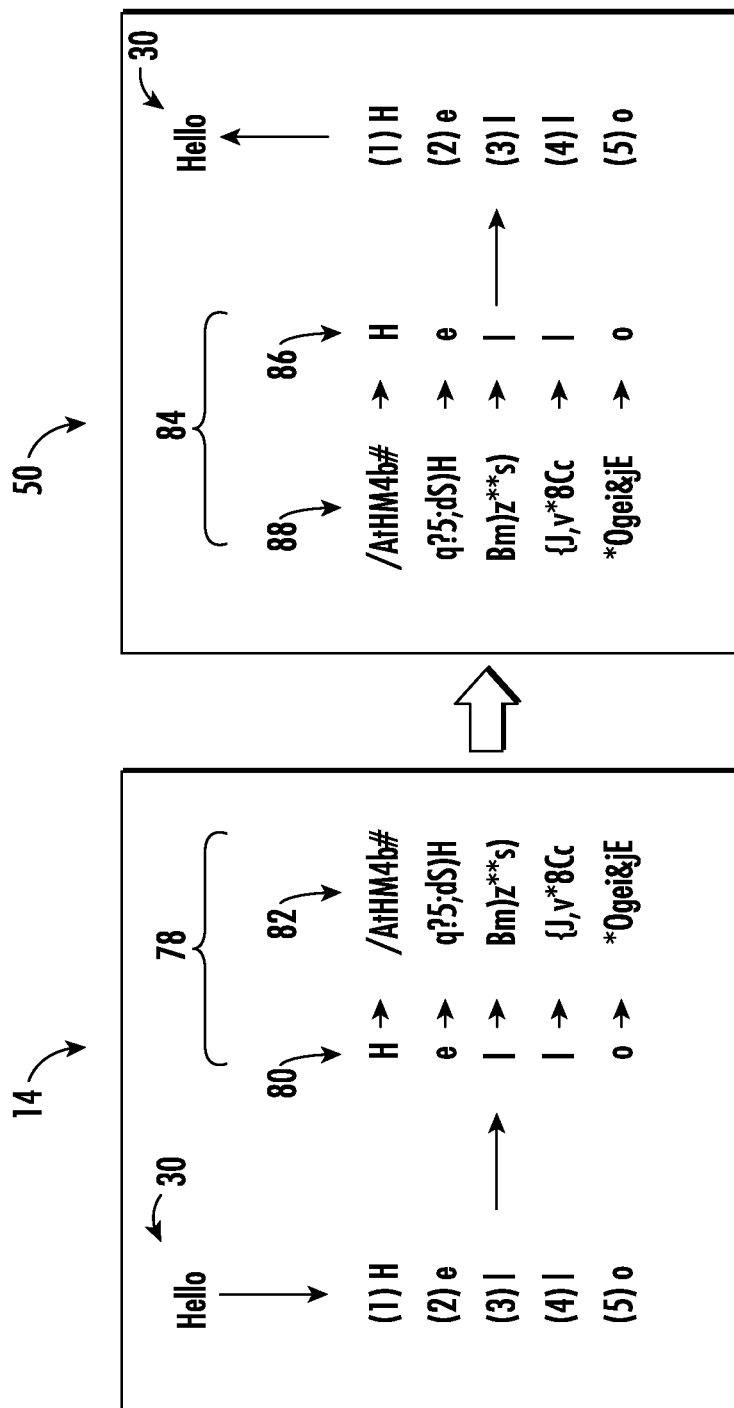
FIG. 3 illustrates one example of using transmittal mapping data and reception mapping data to securely transfer data.

An example of this is illustrated in FIG. 3. Specifically, in the example shown in FIG. 3, the data 30 is broken up into 5 bytes: (1) "H", (2) "e", (3) "l", (4) "l", and (5) "o". Each of these 5 bytes are then matched to transmittal byte values 80. For example, the "H" byte of data 30 is matched to the transmittal byte value 80 that represents "H", the "e" byte of data 30 is matched to the transmittal byte value 80 that represents "e", and so on. The data device 14 then utilized the transmittal mapping data 78 to determine transmittal tokens 82 to replace the bytes of the data 30. As an example of this, the transmittal mapping data 78 may indicate that the transmittal token 82 "/AtHM4b#" is assigned to the matching transmittal byte value 80 that represents "H", as is seen in FIG. 3. As such, the data device 14 utilizes this transmittal mapping data 78 to determine that the transmittal token 82 "/AtHM4b#" can be used to replace the "H" byte, and then the data device 14 replaces the "H" byte with the transmittal token 82 "/AtHM4b#". This replacement continues for each byte of the data 30, in some examples. Thus, in the example seen in FIG. 3, (1) the "H" byte is replaced with the transmittal token 82 "/AtHM4b#", (2) the "e" byte is replaced with the transmittal token 82 "q?S;dS)H", (3) the first "l" byte is replaced with the transmittal token 82 "Bm)zs)", (4) the second "l" byte is replaced with the transmittal token 82** "{J,v*8Cc", and (5) the "o" byte is replaced with the transmittal token 82 "*0gei&jE".

As is seen above, in some examples, data 30 may include the same portion of data 30 twice (e.g., the "l" byte is included twice in the message "Hello"). Based on the assignments in the transmittal mapping data 78, this could result in the same transmittal token 82 being used multiple times in the same transmittal message, in some examples. In other examples, the data device 14 may change the assignments in the transmittal mapping data 78 if a transmittal token 82 has already been used. This may cause the first "l" byte to be replaced with the transmittal token 82 "Bm)zs)", and further cause the second "l" byte to be replaced with the different transmittal token 82** "{J,v*8Cc". To allow for this change, the data device 14 may determine when the first transmittal token 82 has been used. Then, when it has been used, the data device 14 may (1) unassign the transmittal token 82 "Bm)zs)" from the transmittal byte value 80 that represents "l", (2) dynamically generate (e.g., or otherwise determine) the different transmittal token 82** "{J,v*8Cc", and (3) assign the different transmittal token 82 "{J,v*8Cc" to the transmittal byte value 80 that represents "1".

At step 232, the data device 14 generates a packet that includes the transmittal tokens 82. The packet may be generated in any manner. In some examples, the packet may also include additional information (other than the transmittal tokens 82). For example, the packet may include an identifier (e.g., a header, trailer, etc.). The identifier of the packet may include an identification code (which may identify the packet as having been sent by the data device 14), a timestamp (which may identify the time and/or date the packet was created and/or transmitted by the data device 14, such as in a yyyy.dd.HH.mm.sss format or any other format and at any time resolution), a parsing format identifier (which may identify how the packet was formed and how the data can be de-parsed), the determined checksum, a sequence number that may help to identify and recover from the event of a dropped packet or out of order packets within the communication between two devices, any other data, or any combination of the preceding.

In some examples, the checksum and/or any other information in the packet may also be replaced with transmittal tokens 82 (as is discussed in steps 224 and 228). This may allow the transmittal tokens 82 to be sent in the packet, without the actual checksum and/or other information being sent. This, however, may be optional. In other examples, the checksum and/or any other information in the packet may optionally be encrypted, or made secret in any other manner.

The generation of the packet (at step 232) may optionally include shuffling of all or a portion of the information included in the packet. This shuffling refers to a rearrangement of the order of the transmittal tokens 82, and/or any other portion of information included in the packet. As an example of this, the transmittal tokens 82 representing the message "Hello" may be shuffled into an order that now represents the obfuscated message "olleH" (i.e., the reverse order of "Hello"). As such, the shuffling may further obfuscate the transmittal tokens 82 (and thus the data 30). The data device 14 may include one or more shuffling methods that may allow the data device 14 to shuffle the transmittal tokens 82. Examples of the shuffling method may include a method that reverses the order of the transmittal tokens 82, a method that changes the order so that each half is mirrored, a method that flips the order of every other transmittal token 82, a method that causes the order to not be changed or shuffled at all, a method that causes the order to be shuffled in any other manner, or any combination of the preceding.

The shuffling method used to shuffle the transmittal tokens 82 may always be the same. On the other hand, the shuffling method may differ for each packet. For example, the data device 14 may include more than one shuffling method (e.g., 3 shuffling methods, 5 shuffling methods) to choose from. In such an example, the data device 14 may select one of the shuffling methods to use when generating the packet. This selection may, in some examples, be based on the pseudo random bit generator and the seed value(s) input into the pseudo random bit generator.

Although the shuffling has been described above as occurring during the generation of the packet (at step 232), in some examples the shuffling may occur prior to this step. For example, the shuffling (using a shuffling method) may be performed following the breaking of the data 30 into one or more portions (at step 224), but prior to replacing the portions of the data 30 with transmittal tokens 82 (at step 228). In such an example, the shuffling may refer to shuffling the data 30, itself (as opposed to shuffling the transmittal tokens 82). For example, the shuffling may shuffle the order of each of the portions of the data 30. As an example of this, shuffling of the message "Hello" may shuffle the bytes into a reverse order of: (1) "o", (2) "l", (3) "l", (4) "e", and (5) "H". Then these shuffled bytes of data 30 may be replaced with transmittal tokens 82 in the same manner as that discussed in step 228.

The generation of the packet (at step 232) may also optionally include adding one or more chaff tokens to the packet, in some examples. A chaff token may refer to data that may imitate a transmittal token 82, but may not be an actual transmittal token 82. Instead, a chaff token may be a fake token that is meant to hide (or obfuscate) the real transmittal tokens 82. For example, as is discussed above, a transmittal token 82 may be "/AtHM4b#". In such an example, a chaff token may be any other combination of characters (e.g., "97U3M.5^"), but which does not match any transmittal token 82 included in the transmittal mapping data 78. These chaff token(s) included in the packet may hide (or obfuscate) the real transmittal tokens 82. As such, an unauthorized entity intercepting the packet may be unable to separate the transmittal tokens 82 from the chaff tokens, in some examples. Furthermore, the chaff tokens may also increase the size of the packet, which may keep the size of all packets consistent (e.g., chaff tokens may be added to packet(s) so that all packets have the same size, regardless of whether the packet includes many transmittal tokens 82 or few transmittal tokens 82).

The chaff token may by any data. For example, the chaff may be a set of numbers, a set of letters (e.g., A, B, C, etc.), a set of numbers and letters, a set of symbols (e.g., %, !, ?, etc.), a set of bytes, a code, any other grouping of characters and/or bytes, or any combination of the preceding. The chaff token may have a similar format as a transmittal token 82, in some examples. The chaff token may have any length. For example, the chaff token may be an eight character token, a sixteen character token, a 32 character token, a token with a length between eight characters and 32 characters, or a token with any other length. The chaff token may have the same length as a transmittal token 82, in some examples. Furthermore, one or more (or all) of the chaff tokens in a particular packet may have a different format and/or length than other chaff tokens in the particular packet. The packet may include any number of chaff tokens. For example, the packet may include no chaff tokens, one chaff token, two chaff tokens, ten chaff tokens, 100 chaff tokens, 1,000 chaff tokens, 1 million chaff tokens, 10 million chaff tokens, or any other number of chaff tokens. Furthermore, each packet may include the same number of chaff tokens, or a different number of chaff tokens.

Following generation of the packet, the data device 14 transmits the packet at step 236. The data device 14 may transmit the packet to the receiving device 50. The data device 14 may transmit the packet in any manner and over any communications network. For example, the data device 14 may transmit the packet over the Internet (e.g., using a Transmission Control Protocol (TCP) communications protocol, using a Hypertext Transfer Protocol (HTTP) communications protocol), a WI-FI network, a cellular network, a radio telecommunication network, a BLUETOOTH network, a near-field communication (NFC) network, any other wireless network, any wired network (e.g., a Public Switched Telephone Network (PSTN)), any other manner of transmission, or any combination of the preceding. Furthermore, the packet may be transmitted in a single transmission, in some examples.

At step 240, the receiving device 50 receives the packet. After receiving the packet, the receiving device 50 determines whether the packet is legitimate at step 244. The receiving device 50 may determine whether the packet is legitimate in any manner. As an example, the receiving device 50 may analyze the identifier of the packet to determine whether or not the identifier of the packet includes an identification code that identifies the packet as having been sent by the data device 14. In some examples, if the packet is determined to not be legitimate, the packet may be disregarded by the receiving device 50. In some examples, determining whether the packet is legitimate may include decrypting or decoding one or more portions of the packet (e.g., the header of the packet, the checksum). In some examples, the receiving device 50 may determine whether the packet is legitimate by passing the packet to a library or application installed or accessible to the receiving device 50. In such an example, the library or application may determine whether packet is legitimate.

In some examples, determining whether the packet is legitimate includes determining whether the packet was received within a predetermined amount of time. For example, the receiving device 50 may analyze the packet to determine whether or not the packet includes a timestamp that is within a predetermined timestamp threshold. As is discussed above, the timestamp may identify the time and/or date the packet was created and/or transmitted by the data device 14. As such, the receiving device 50 may include a predetermined timestamp threshold that may allow the receiving device 50 to determine whether the packet is too late or too early. The predetermined timestamp threshold may be any amount of time. For example, the predetermined timestamp threshold may by 1 millisecond, 2 milliseconds, 3 milliseconds, 5 milliseconds, 10 milliseconds, 1 second, any negative amount of time (e.g., −1 millisecond), or any other amount of time. The receiving device 50 may compare the time on the timestamp to the time at which the receiving device 50 received the packet. If the lapse in time is greater than the predetermined timestamp threshold, the receiving device 50 determines that the packet is not legitimate, and discards the packet, in some examples. This may prevent the receiving device 50 from acting on a packet that has taken too long to reach the receiving device 50 (or that reached the receiving device 50 too early), as the delay may indicate that the packet was intercepted and/or delayed by an unauthorized entity, in some examples.

In some examples, the receiving device 50 may determine whether the packet is legitimate at a different time or step than step 240. For example, one or more portions of the packet (e.g., the header of the packet, the checksum, the timestamp) may also be encoded using transmittal tokens 82. In such an example, these portions of the packet may need to be determined using the reception mapping data 84, before it can be used to determine whether the packet is legitimate. As such, in this example, the receiving device 50 may determine whether the packet is legitimate following step 260 (below).

At step 248, the receiving device 50 determines reception mapping data 84. As is discussed above, the reception mapping data 84 may allow the receiving device 50 to match each of the received transmittal tokens 82 (from the packet) to a reception token 88. Based on these matches, the receiving device 50 may determine the data 30. This may allow the receiving device 50 to determine and utilize the data 30 without the data 30 being transmitted from the data device 14 to the receiving device 50, in some examples.

The reception mapping data 84 may be determined in any manner. As one example of this, the reception mapping data 84 may be determined by (1) determining an order of the reception byte values 86, (2) generating the reception tokens 88, and then (3) assigning each of the reception tokens 88 to a reception byte value 86.

The receiving device 50 may determine an order of the reception byte values 86 in any manner. As one example of this, the receiving device 50 may randomize the order of each of the reception byte values 86 (e.g., all 256 reception byte values 86 may be randomly ordered). The receiving device 50 may randomize the order of the reception byte values 86 using any method. For example, the receiving device 50 may randomize the order of the reception byte values 86 using the pseudo random bit generator and one or more seed values. In such an example, one or more seed values may be input into the pseudo random bit generator to randomize the order of the reception byte values 86. The receiving device 50 may randomize the order of the reception byte values 86 using the same pseudo random bit generator and the same one or more seed values as did the data device 14. In such examples, the reception byte values 86 and the transmittal byte values 80 have the same random order.

The receiving device 50 may generate the reception tokens 88 in any manner. For example, the receiving device 50 may generate the reception tokens 88 using the pseudo random bit generator and the one or more seed values. The receiving device 50 may generate the reception tokens 88 using the same pseudo random bit generator and the same one or more seed values as did the data device 14. In such examples, the reception tokens 88 and the transmittal tokens 82 may be the same (or may be otherwise matching). The receiving device 50 may generate any number of reception tokens 88. For example, the receiving device 50 may generate a reception token 88 for each reception byte value 86.

Although the reception tokens 88 are described above as being generated, in some examples, the reception tokens 88 may be determined. The reception tokens 88 may be determined by being generated (as is discussed above) by the receiving device 50. Alternatively, the reception tokens 88 may be determined in any other manner. For example, the reception tokens 88 may be determined by selecting the reception tokens 88 from a group of stored reception tokens 88. As an example, the receiving device 50 may have thousands (or millions, or any other number) of possible reception tokens stored on disk or accessible to the receiving device 50 (e.g., stored on a memory unit that the receiving device 50 has access to). In such an example, the receiving device 50 may determine a particular reception token 88 by selecting it from these thousands (or millions, or any other number) of possible reception tokens. This selection of the reception tokens 88 may be performed in any manner (e.g., the selection may be pseudo random). Furthermore, because the receiving device 50 may store thousands (or millions, or any other number) of the possible reception tokens, the vast number of possible reception tokens may prevent an unauthorized entity from determining which reception tokens 88 were used, even if the unauthorized entity were to gain access to the receiving device 50.

The receiving device 50 may also assign the reception tokens 88 to the reception byte values 86. This assignment may refer to any manner of allocating a particular reception token 88 (e.g., "/AtHM4b#") to a particular reception byte value 86 (e.g., the reception byte value 86 "72" that represents the letter "H"). The receiving device 50 may assign the reception tokens 88 to the reception byte values 86 in any manner. For example, the receiving device 50 may assign the reception tokens 88 to the reception byte values 86 in the determined order (e.g., the randomized order) of the reception byte values 86. That is, the first generated reception token 88 may be assigned to the reception byte value 86 that is first in line in the determined order. The second generated reception token 88 may be assigned to the reception byte value 86 that is second in line in the determined order, and so on. The assignment of reception tokens 88 may include a checking process that prevents identical reception tokens 88 from being assigned to two different reception byte values 86.

The reception mapping data 84 may be determined in real time (e.g., determined only when it is needed for a secure transfer of data 30). This may prevent the reception mapping data 84 from having to be stored on disk. Instead, the reception mapping data 84 may only be stored in transient memory, as opposed to being stored on disk. Furthermore, once the reception mapping data 84 is utilized to determine (e.g., rebuild) the data 30, the order of the reception byte values 86, the reception tokens 88, and the assignment of the reception tokens 88 may be deleted (e.g., deleted from transient memory) or otherwise destroyed. As such, the reception mapping data 84 may be a one-time use reception mapping data that is deleted or otherwise destroyed after its use. This may prevent the reception mapping data 84 from being compromised if an unauthorized entity were to access the receiving device 50. In some examples, all or a portion of the reception mapping data 84 may not be deleted or otherwise destroyed. For example, the reception byte values 86 may not be deleted.

The determination of the reception mapping data 84 by the receiving device 50 may refer to the receiving device 50 determining the reception mapping data 84 itself, or may refer to the receiving device 50 causing the reception mapping data 84 to be determined. For example, the receiving device 50 may determine the reception mapping data 84 by calling into a library or application installed or accessible to the receiving device 50, and having the library or application determine the reception mapping data 84 for the receiving device 50.

In the example illustrated in FIG. 3, the reception mapping data 84 included in the receiving device 50 matches the transmittal mapping data 78 included in the data device 14. For example, a transmittal token 82 may be "/AtHM4b#" and the matching reception token 88 may also be "/AtHM4b#". Additionally, the assignments of the reception tokens 88 to the reception byte values 86 match the assignments of the transmittal tokens 82 to the transmittal byte values 80. For example, the reception token "/AtHM4b#" may be assigned to the reception bye value "72" (which represents the character "H"), and the matching transmittal token "/AtHM4b#" may be assigned to the matching transmittal bye value "72" (which also represents the character "H"). This may allow the receiving device 50 to determine the data 30, in some examples.

At step 252, the receiving device 50 determines the transmittal tokens 82 included in the received packet. The receiving device 50 may determine the transmittal tokens 82 in any manner. For example, the receiving device 50 may de-parse the packet to determine the transmittal tokens 82. De-parsing the packet may refer to breaking up the data in the packet into potential tokens, or otherwise identifying potential tokens. For example, the data in the packet (other than the header, for example) may include the following string of characters: "97U3M.5^*0gei&jE{J,v*8Cc?uY2O9)qBm)z**s)q?5;dS)H/AtHM4b#)kT1*'IN".

In such an example, de-parsing this header may identify eight potential tokens: (1) "97U3M.5^", (2) "*0gei&jE", (3) "{J,v*8Cc", (4) "?uY2O9)q", (5) "Bm)z**s)", (6) "q?5;dS)H", (7) "/AtHM4b#", and (8) ")kT1*'IN". The receiving device 50 may de-parse the packet in any manner. In some examples, the receiving device 50 may include one or more parsing methods that may allow the receiving device 50 to de-parse the packet into potential tokens. For example, a parsing method may provide a format and/or length of each token (e.g., one token is 8 characters of the data, one token is 32 characters of the data, one token has the format xxxx-xxx-xxxx-xxxxxxxxx, one token has the characters "A" and "X" as the first and fourth characters), allowing the receiving device 50 to de-parse the packet based on the format and/or length of the tokens. As another example, a parsing method may provide a character pattern in-between tokens (e.g., fake characters that indicate a token, such as the first 2 characters are fake and the last 3 characters are fake). In the example included above, the parsing method indicates that each potential token has 8 characters of the data.

The parsing method used to de-parse the packet may always be the same. On the other hand, the parsing method used to de-parse the packet may differ. For example, both the data device 14 and the receiving device 50 may include more than one parsing method (e.g., 3 parsing methods, 5 parsing methods) to choose from in forming the packet and de-parsing the packet. In such an example, the receiving device 50 may use the same parsing method to de-parse the packet as the data device 14 used to form the packet. Furthermore, in such an example, the data device 14 may form the packet using a particular parsing method, and may further add an identifier of that parsing method into the header of the packet (e.g., the parsing format identifier discussed above). The receiving device 50 may use this parsing format identifier to determine which parsing method to use, and may then use that parsing method to de-parse the packet.

Following the de-parsement of the packet, the receiving device 50 may filter out the chaff tokens (if any) in order to determine the transmittal tokens 82. The receiving device 50 may filter out the chaff tokens in any manner. For example, the receiving device 50 may compare each potential token (determined above) to each of the reception tokens 86 in order to determine if there are any matches. If a potential token does not match any of the reception tokens 86, the potential token may be determined to be a chaff token, and may be filtered out. On the other hand, if a potential token does match a reception token 88, the potential token may be determined to be one of the transmittal tokens 82. As another example, the receiving device 50 may compare each potential token (determined above) to a list of potential chaff tokens determined by the receiving device 50 in order to determine if there are any matches. In such an example, if a potential token does match a potential chaff token, the potential token may be determined to be a chaff token, and may be filtered out. On the other hand, if a potential token does not match a potential chaff token, the potential token may be determined to be one of the transmittal tokens 82.

As an example of this filtering, the receiving device 50 may determine that the following three potential tokens of the eight potential tokens (discussed in the example above) are chaff tokens: (1) "97U3M.5^"; (2) "?uY2O9)q"; and (3) ")kT1*'IN". These chaff tokens are then filtered out, which leaves five transmittal tokens 82: (1) "*0gei&jE", (2) "{J,v*8Cc", (3) "Bm)z**s)", (4) "q?S;dS)H", and (5) "/AtHM4b#".

In some examples, the step of determining the transmittal tokens 82 may (optionally) include un-shuffling the transmittal tokens 82 (and/or any other information) found in the packet. As is discussed above, prior to being sent to the receiving device 50, the data device 14 may have shuffled the order of the transmittal tokens 82. For example, the data device 14 may have reversed the order of the transmittal tokens 82. As an example of this, the transmittal tokens 82 representing the message "Hello" may have been shuffled into an order that now represents the obfuscated message "olleH" (i.e., the reverse order of "Hello"). The receiving device 50 may be able to un-shuffle the transmittal tokens 82, so as to put them back in their proper order. The receiving device 50 may include one or more shuffling methods that may allow the receiving device 50 to un-shuffle the transmittal tokens 82. Examples of the shuffling method may include a method that reverses the order of the transmittal tokens 82, a method that changes the order so that each half is mirrored, a method that changes the order to so that the order of every other transmittal token 82 is flipped, a method that causes the order to not be changed or shuffled at all, a method that causes the order to be shuffled in any other manner, or any combination of the preceding.

The shuffling method used to shuffle and/or unshuffle the transmittal tokens 82 may always be the same. On the other hand, the shuffling method may differ. For example, both the data device 14 and the receiving device 50 may include more than one shuffling method (e.g., 3 shuffling methods, 5 shuffling methods) to choose from for a particular packet. In such an example, the receiving device 50 may use the same shuffling method as the data device 14 used. In some examples, the shuffling method used may be based on the seed values that were input into the pseudo random bit generator of both the data device 14 and the receiving device 50. As such, the data device 14 and the receiving device 50 may select the same shuffling method.

As an example of this un-shuffling, the receiving device 50 may determine that the shuffling method caused the order of the transmittal tokens 82 to be reversed, and the receiving device 50 may then un-shuffle the five determined transmittal tokens 82 by reversing this order. As an example, the transmittal tokens 82 may be un-shuffled so that the following order: (1) "*0gei&jE"; (2) "{J,v*8Cc"; (3) "Bm)zs)"; (4) "q?S;dS)H"; and (5) "/AtHM4b#", is un-shuffled to be the following reverse order: (1) "/AtHM4b#"; (2) "q?S;dS)H"; (3) "Bm)zs)"; (4) "{J,v*8Cc"; and (5) "*0gei&jE".

Although the un-shuffling has been described above as occurring during the determination of the transmittal tokens 82 (at step 252), in some examples the un-shuffling may occur at any other time. For example, the un-shuffling (using a shuffling method) may be performed after the data 30 is determined (at step 260, below). As an example of this, the data 30 may be determined to be the following bytes: (1) "o", (2) "l", (3) "l", (4) "e", and (5) "H"—thereby forming the message "olleH". Then these bytes may be un-shuffled to reverse their order to be the following: (1) "H", (2) "e", (3) "l", (4) "l", and (5) "o"—thereby forming the message "Hello".

At step 256, the receiving device 50 matches each of the determined transmittal tokens 82 to a reception token 88. The receiving device 50 may match a transmittal token 82 to a reception token 88 in any manner. For example, the receiving device 50 may compare the transmittal token 82 to each of the reception tokens 88 in order to determine if there are any matches. The transmittal token 82 may match a reception token 88 if the two tokens are identical (e.g., "/AtHM4b#" and "/AtHM4b#"). As another example, the transmittal token 82 may match a reception token 88 if the reception token 88 includes at least all of the characters of the transmittal token 82 (or vice versa) (e.g., "/AtHM4b#" and "/AtHM4b#L7&2@"). As further examples, the transmittal token 82 may match a reception token 88 if the two tokens are opposite (e.g., "up" and "down"), if the two tokens complement or complete each other (e.g., "12345" and "6789"), if one token asks a question and the other token correctly answers it, any other manner of matching, or any combination of the preceding. In some examples, the step of matching the transmittal token 82 to a reception token 88 may already be a part of the step of determining a transmittal token 82 (as is discussed above with regard to matching potential tokens to the reception tokens). In such examples, the step of matching the transmittal token 82 to a reception token 88 may not be repeated. Instead, the initial match may be used.

In some examples, the matching of a transmittal token 82 to a reception token 88 may cause the receiving device 50 to generate additional reception mapping data 84. For example, once a reception token 88 is determined to be a match to a transmittal token 82, a new reception token 88 may be dynamically generated (or otherwise determined). This new reception token 88 may then be assigned to the exact same reception byte value 86 as the now matched reception token 88. This may allow the receiving device 50 to determine data 30 that includes identical bytes, such as the identical first "l" byte and the second "l" byte included in the message "Hello".

In the example illustrated in FIG. 3, the receiving device 50 compares the transmittal tokens 82 to each of the reception tokens 88 in order to determine if there are any matches. In doing so, the receiving device 50 determines that: (1) the transmittal token 82 "/AtHM4b#" matches the reception token 88 "/AtHM4b#"; (2) the transmittal token 82 "q?5;dS)H" matches the reception token 88 "q?5;dS)H"; (3) the transmittal token 82 "Bm)zs)" matches the reception token 88 "Bm)zs)"; (4) the transmittal token 82 "{J,v*8Cc" matches the reception token 88 "{J,v*8Cc"; and (5) the transmittal token 82 "*0gei&jE" matches the reception token 88 "*0gei&jE".

At step 260, the receiving device 50 determines the data 30 based on the matches of transmittal tokens 82 to reception tokens 88. The receiving device 50 may determine the data in any manner based on the matches. For example, the receiving device 50 may rebuild the data 30 based on the matches. In such an example, the receiving device 50 may utilize the reception mapping data 84 to determine the reception byte value 86 that is assigned to each matched reception token 88. Then, the receiving device 50 may replace that matched reception token 88 with its assigned reception byte value 86. The receiving device 50 may then combine all of these reception byte values 86 (and/or the data that they represent) to rebuild the data 30.

An example of this is illustrated in FIG. 3. Specifically, in the example shown in FIG. 3, the reception mapping data 84 indicates that the reception byte value 86 that represents "H" is assigned to the matched reception token 88 "/AtHM4b#". As such, the receiving device 50 utilizes this reception mapping data 84 to determine that the matching reception token 88 "/AtHM4b#" can be replaced with the "H" byte. Then, the receiving device 50 replaces the matching reception token 88 "/AtHM4b#" with the "H" byte. This replacement continues for each matching reception token 88, in some examples. In the example seen in FIG. 3, (1) the reception token 88 "/AtHM4b#" is replaced with the "H" byte, (2) the reception token 88 "q?S;dS)H" is replaced with the "e" byte, (3) the reception token 88 "Bm)zs)" is replaced with the first "l" byte, (4) the reception token 88** "{J,v*8Cc" is replaced with the second "l" byte, and (5) the reception token 88 "*0gei&jE" is replaced with the "o" byte. The receiving device 50 then combines all of these bytes to rebuild the data 30: "Hello".

At step 264, the receiving device 50 (optionally) determines a second checksum of the data 30, and compares it to the checksum received from the data device 14. The checksum may allow errors to be detected in the data 30. For example, the checksum may be used to detect errors that have been introduced into the data 30 during its transmission and/or storage. The receiving device 50 may determine the checksum in any manner. For example, the receiving device 50 may determine the checksum using a checksum algorithm. In some examples, the checksum may be derived from the data 30 in its raw form. The receiving device 50 may compare the two checksums in any manner. For example, the receiving device 50 may compare the two checksums using a CRC. If the two checksums match, the receiving device 50 may move to step 268 where the data 30 is transmitted for use. If the two checksums do not match, the receiving device 50 may discard the data 30 (as it may include errors), and may request that the data device 14 retransmit the message again (using transmittal tokens 82, as is discussed above).

At step 268, the receiving device 50 transmits the data 30 for use. In some examples, the receiving device 50 may transmit the data 30 for use by the receiving device 50. For example, the data 30 may be transmitted to an application or other program that is being executed by the processor of the receiving device 50. This may allow the application or other program to use or otherwise access the data 30. In other examples, the receiving device 50 may transmit the data 30 to the user of the receiving device 50. In such an example, the transmission of the data 30 may refer to a transmission that causes the data 30 to be displayed on a display screen (e.g., displayed on a display screen of a Smartphone), and/or a transmission that causes the data 30 to be output to another user interface (e.g., output as sound from speakers or earphones of a mobile device). As such, the user may view, listen to, or otherwise access the data 30. In additional examples, the receiving device 50 may transmit the data 30 to another device (e.g., a server that will store the data 30, a television that will display the data 30). In other examples, the transmission of the data 30 may refer to any other manner in which the receiving device 50 may utilize the data 30. For example, the transmission of the data 30 may refer to the receiving device 50 storing the data 30 in memory (e.g., storage on disk).

At step 272, the data device 14 determines whether to transmit additional data 30 (using transmittal tokens 82, as is discussed above). The data device 14 may determine whether to transmit additional data 30 for any reason. For example, a user of data device 14 may have selected to have additional data 30 transmitted. As another example, an application, program, and/or device on data device 14 may have provided additional data 30 to the data device 14 for transmittal. As a further example, the data device 14 may have received a request from the receiving device 50 for additional data 30.

If it is determined at step 272 that additional data 30 should not be transmitted, the method 200 moves to step 276, where the method 200 ends. On the other hand, if it is determined that additional data 30 should be transmitted, the method 200 moves back up to step 212, where the data device 14 determines the additional data 30. Then the method 200 re-performs one or more (or all) of steps 212-272 so as to securely transfer the additional data 30 (using transmittal tokens 82, as is discussed above).

Although the method 200 may re-perform steps 212-272, it may do so using different transmittal mapping data 78 and different reception mapping data 84. For example, the data device 14 may generate (or determine) new transmittal mapping data 78 for each packet that is transmits to the receiving device 50, and the receiving device 50 may generate (or determine) new reception mapping data 84 for each packet it receives from the data device 14. As such, even if an unauthorized entity were to determine the first transmittal tokens 82, the first reception tokens 88, and/or data 30 from the previous transmission, these determinations would not help the unauthorized entity in subsequent transmissions.

The steps 212-272 may be re-performed any number of times, so as to securely transfer any amount of data. Furthermore, the steps 212-272 may continue to be performed even if a particular transmission of data 30 does not reach its intended recipient (i.e., the receiving device 50). As an example, if the receiving device 50 receives a third message, and also receives a fifth message (but never receives the fourth message, for some reason), the receiving device 50 may still be able determine the fifth message, and any subsequent message or other data 30. In such an example, the receiving device 50 may utilize the sequence number in the identifier of the packet (discussed above) to assist in identifying that the fourth message was not received, and to further assist in generating (or determining) new reception mapping data 84 for the fifth message. In traditional systems, such a failure to receive data in its proper order may cause issues. In contrast to this, the system 10 may be able to handle not receiving data in order. One reason for this is that the transmittal mapping data 78 and the reception mapping data 84 is generated in real time, in some examples. This may allow the reception mapping data 84 for the fifth message to be generated despite the receiving device 50 having never received the fourth message, in some examples.

Additionally, the steps 212-272 may continue to be performed even if data 30 is received by the receiving device 50 in the wrong order. As an example, if the receiving device 50 receives an eighth message before it received the sixth or seventh message, the receiving device 50 may still be able determine the eighth message, and any prior or subsequent message or other data 30. In such an example, the receiving device 50 may keep track (e.g., in a log) of the sequence numbers from the packets it has already received. Then, if the receiving device 50 is expecting to receive the sixth message (because it has already received the first five messages), but it actually receives the eighth message instead, the receiving device 50 may jump ahead to generating (or determining) new reception mapping data 84 for the eighth message (instead of for the sixth message). This jump may be performed by running two extra iterations of the method that generates (or determines) the new reception mapping data 84. This new reception mapping data 84 may be used to determine the eighth message. The receiving device 50 may then store the sequence number for the eighth message, and then it may reset to its last known complete state (e.g., the state where it had received and determined the fifth message).

Then, if the receiving device 50 receives the seventh message (instead of the sixth message), the receiving device 50 may jump ahead to generating (or determining) new reception mapping data 84 for the seventh message (instead of for the sixth message). This jump may be performed by running one extra iteration of the method that generates (or determines) the new reception mapping data 84. This new reception mapping data 84 may be used to determine the seventh message. The receiving device 50 may then store the sequence number for the seventh message, and then it may reset to its last known complete state (e.g., the state where it had received and determined the fifth message). Then, if the receiving device 50 finally receives the sixth message, the receiving device 50 may generate (or determine) the new reception mapping data 84 for the sixth message, and use it to determine the sixth message. Then the receiving device 50 may determine that it has received the first eight messages, and it may set its complete state to the eighth message. The receiving device 50 may now be ready to receive subsequent messages.

Modifications, additions, or omissions may be made to method 200. For example, although the steps of method 200 are described above as being performed by data device 14 or receiving device 50, in some examples, one or more of the steps of method 200 may be performed by any other device. As another example, one or more steps of method 200 may be optional, or may not be performed. For example, method 200 may not include step 208, where a connection is established. Instead, communication between the data device 14 and receiving device 50 may begin when the data device 14 starts transmitting data 30. As another example, method 200 may not include steps 220 and 264, regarding checksums. As a further example, the steps of method 200 may be performed in parallel or in any suitable order.

Furthermore, in some examples, system 10 is not limited to only transferring data 30 from the data device 14 to the receiving device 50. For example, the receiving device 50 may perform steps 212-236 to transmit data 30 to data device 14, and the data device 14 may perform steps 240-268 to determine this data 30. That is, both devices may utilize the same steps to communicate back and forth between each other.

System and Method for Securely Transferring Data Using Encryption Keys

Figure 4A:
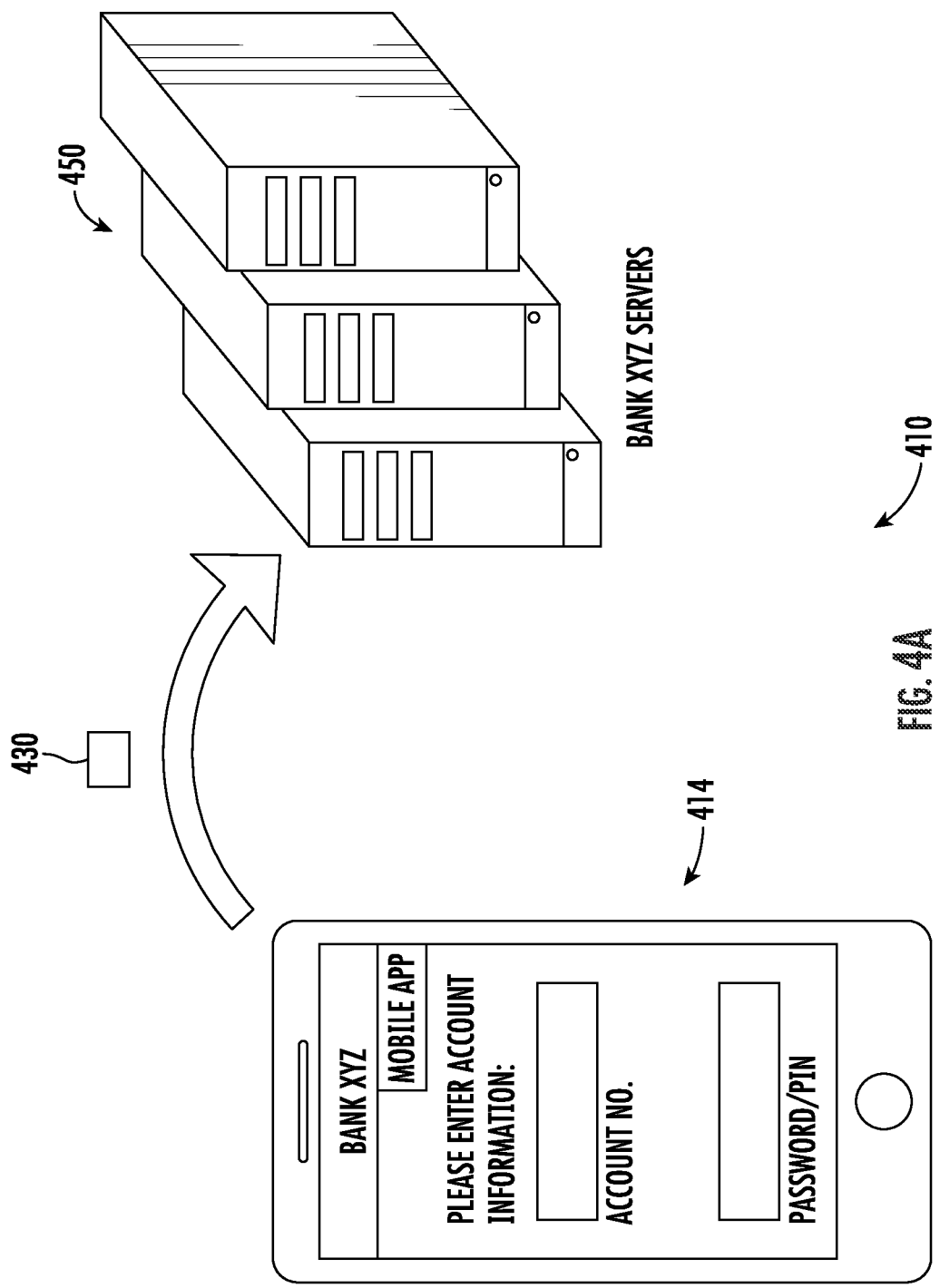
FIGS. 4A-4B illustrate another example system for securely transferring data.
Figure 4B:
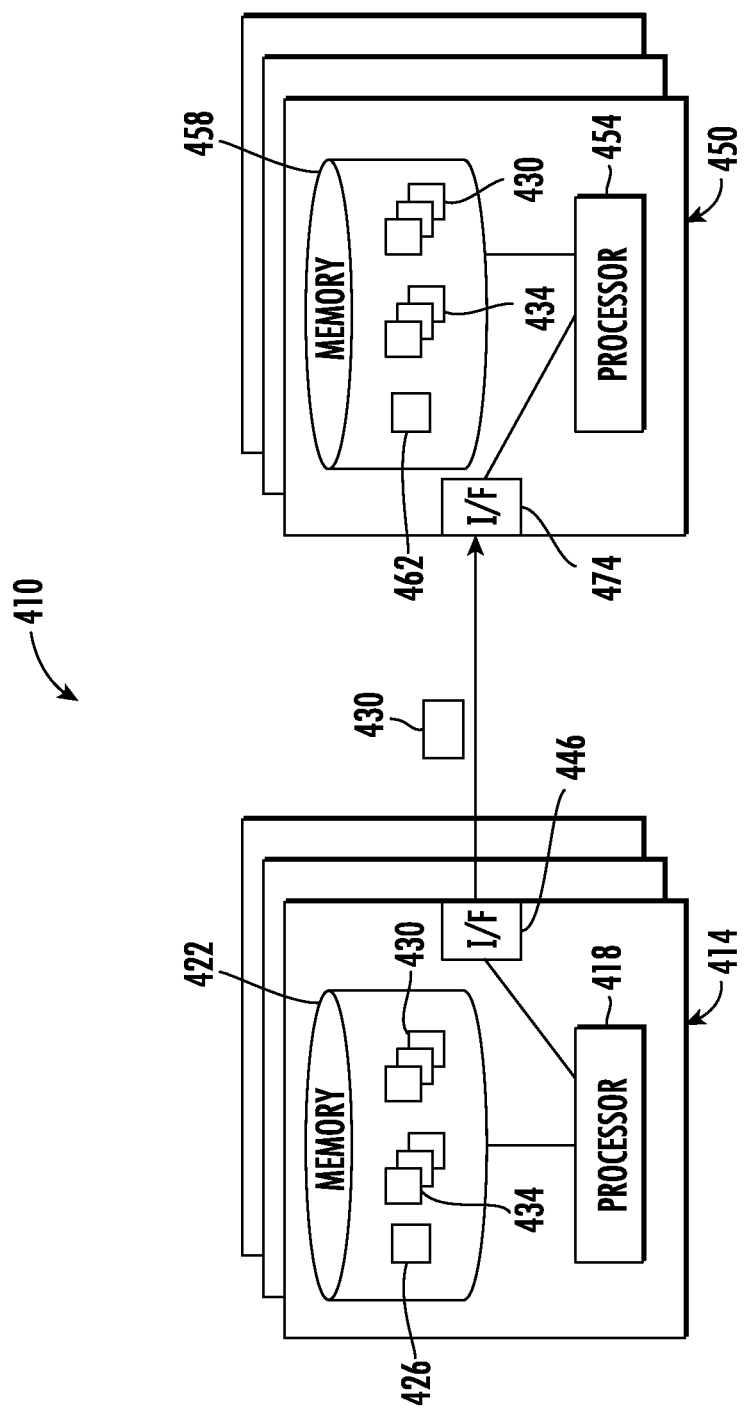

FIGS. 4A-4B illustrate another example system 410 for securely transferring data 430. As is illustrated, system 410 includes a data device 414 (e.g., a mobile phone) that determines data 430 (e.g., bank account information input by a user) for transmittal to a receiving device 450 (e.g., a server). When the data device 414 is preparing to transmit the data 430 (e.g., the bank account information) to the receiving device 450 (e.g., the server), the data device 414 generates (e.g., pseudo randomly generates) a first encryption key to be used to encrypt the data 430. Following encryption of the data 430, the encrypted data 430 is transmitted to the receiving device 450. The actual first encryption key used to encrypt the data 430, however, is not sent to the receiving device 450. Instead, the data device 414 deletes the first encryption key, without ever sending it.

Following reception of the encrypted data 430, the receiving device 450 generates (e.g., pseudo randomly generates) a second encryption key. This second encryption key matches the first encryption key (which was used to encrypt the data 430). The receiving device 450 decrypts the encrypted data 430 using the second encryption key. This allows the receiving device 450 to utilize the data 430 (e.g., the server may utilize or store the bank account information input the by user).

This example procedure may allow the data device 414 to securely transfer the data 430, in some examples. For example, not only is the data 430 encrypted (thereby providing a first level of security), but the actual encryption key is not transmitted to the receiving device 450 (thereby providing a second level of security). Additionally, because the actual encryption key is generated by the receiving device 450, the actual encryption key is not stored on disk in either the receiving device 450 or the data device 414 (thereby providing a third level of security), in some examples. This may prevent an unauthorized entity from listening, capturing, or otherwise accessing the data 430.

Data 430 represents any type of information. In some examples, data 430 is substantially similar to the data 30 of FIGS. 1A-3. For example, the data 430 may be personal information (e.g., a social security number, membership identifier, name, address), business information (e.g., a document, spreadsheet, or other information created, used, and/or received by a business), medical information (e.g., a medical report, a medical diagnosis, a medical bill), financial information (e.g., information regarding investments, credit card information, bank information, account number), security information (e.g., a password, personal access number), a document (e.g., a word document, an excel spreadsheet, a pdf), an audio file (e.g., a music file), a video file (e.g., a movie file, a tv show file, a video clip), account information, a completed voting ballot (e.g., for voting in an election for public office), any other type of information, or any combination of the preceding. The data 430 further represents any portion of information. For example, the data 430 may be an entire spreadsheet (or other document, such as a word document), or it may be a portion of an entire spreadsheet (or other document), such as only social security numbers or other personal information included in the spreadsheet (or other document). As another example, the data 430 may be an entire medical report, or it may be a portion of the medical report, such as only personal information included in the medical report and/or the diagnosis in the medical report.

In the example illustrated in FIGS. 4A-4B, the system 410 includes the data device 414. The data device 414 may be any device that stores data 430 and/or transmits data 430. In some examples, the data device 414 is substantially similar to the data device 14 of FIGS. 1A-1B. As is illustrated in FIGS. 4A-4B, the data device 414 is a mobile telephone. Furthermore, as is also illustrated in FIG. 4B, the data device 414 includes a computer/data processor 418 and data storage medium 422 (e.g., memory) comprising instructions 426 executable by the processor 418 to perform the functions of the data device 414. Additionally, the data device 414 includes a communication port 446 (e.g., receiver, transmitter, transceiver, network interface) configured to receive and transmit information (e.g., receive requests for data 430, transmit the data 430, etc.).

The data device 414 may have one or more encryption methods 434 that may be used to encrypt the data 430. An encryption method 434 represents any type of encryption method that may be utilized to encrypt data and/or decrypt encrypted data. For example, an encryption method 430 may be Rivest-Shamir-Adleman (RSA), Data Encryption Standard (DES), triple DES (DES3), Advanced Encryption Standard (AES), AES-256, symmetric encryption methods, any other method of encryption, or any combination of the preceding. The data device 414 may have any number of encryption methods 434, each of which may be used to encrypt data.

One or more encryption keys (e.g., random strings of bits created for scrambling and unscrambling data) may be used with the encryption method(s) 434 to encrypt data and/or decrypt encrypted data. However, the data device 414 may not have any encryption keys stored on disk, in some examples. Instead, in some examples, the data device 414 generates an encryption key in real-time prior to encryption of the data. In some examples, this real-time generation of the encryption key causes the encryption key to only be stored in transient memory, as opposed to being stored on disk. Furthermore, once the encryption key is used by the data device 414, the encryption key may be deleted (e.g., deleted from transient memory) or otherwise destroyed. This may prevent the encryption key(s) from being compromised if an unauthorized entity were to access the data device 414. In some examples, the encryption key may not be deleted or otherwise destroyed.

To generate the encryption key(s), the data device 414 may utilize a pseudo random bit generator (otherwise referred to as a DRBG). Examples of a pseudo random bit generator (or a DRBG) include ISAAC, ISAAC-64, Hash DRBG SHA-1, Hash DRBG SHA-256, Hash DRBG SHA-512, Cipher DRBG AES-128, Cipher DRBG AES-192, Cipher DRBG AES-256, any other pseudo random bit generator (or DRBG), or any other system or method for creating deterministically random numbers.

In the example illustrated in FIGS. 4A-4B, the system 410 further includes the receiving device 450. The receiving device 450 may be any device that receives and/or processes data 430. In some examples, the receiving device 450 is substantially similar to the receiving device 50 of FIGS. 1A-1B. As is illustrated in FIGS. 4A-4B, the receiving device 450 is a server that the user of the data device 414 is communicating with via an app executed on the data device 414. Furthermore, as is also illustrated in FIG. 4B, the receiving device 450 includes a computer/data processor 454 and data storage medium 458 (e.g., memory) comprising instructions 462 executable by the processor 454 to perform the functions of the receiving device 450. Additionally, the receiving device 450 includes a communication port 474 (e.g., receiver, transmitter, transceiver, network interface) configured to receive and transmit information (e.g., receive data 430, transmit requests for data 430).

The receiving device 450 may have one or more encryption methods 434 that may be used to decrypt the data 430. The encryption methods 434 stored on the receiving device 450 may be the same as the encryption methods 434 stored on the data device 414. As such, the data device 414 may encrypt data 430 using a particular encryption method 434, and the receiving device 450 may decrypt the encrypted data 430 using the same particular encryption method 434. The receiving device 450 may have any number of encryption methods 434, each of which may be used to decrypt data.

As is discussed above, in some examples, one or more encryption keys are used with the encryption method(s) 434 to encrypt data 430 and/or decrypt encrypted data 430. However, the receiving device 450 may not have any encryption keys stored on disk, in some examples. Instead, in some examples, the receiving device 450 generates an encryption key in real-time prior to decryption of the data 430. In some examples, this real-time generation of the encryption key causes the encryption key to only be stored in transient memory, as opposed to being stored on disk. Furthermore, once the encryption key is used by the receiving device 450, the encryption key may be deleted (e.g., deleted from transient memory) or otherwise destroyed. This may prevent the encryption key(s) from being compromised if an unauthorized entity were to access the receiving device 450. In some examples, the encryption key may not be deleted or otherwise destroyed.

To generate the encryption key(s), the receiving device 450 may also utilize a pseudo random bit generator (otherwise referred to as a DRBG). Examples of a pseudo random bit generator (or a DRBG) include ISAAC, ISAAC-64, Hash DRBG SHA-1, Hash DRBG SHA-256, Hash DRBG SHA-512, Cipher DRBG AES-128, Cipher DRBG AES-192, Cipher DRBG AES-256, any other pseudo random bit generator (or DRBG), or any other system or method for creating deterministically random numbers. The pseudo random bit generator used by the receiving device 450 may be the same as the pseudo random bit generator used by the data device 414. As such, the data device 414 may generate a first encryption key using a particular pseudo random bit generator, and the receiving device 450 may generate a second encryption key using the same particular pseudo random bit generator.

The second encryption key generated by the receiving device 450 matches the first encryption key generated by the data device 414, in some examples. The second encryption key may match the first encryption key if the two encryption keys are identical (e.g., "58U48" and "58U48"). In other examples, the second encryption key may match the first encryption key in any other way that allows the second encryption key to be used to decrypt data 430 that was encrypted using the first encryption key.

Modifications, additions, or omissions may be made to system 410 without departing from the scope of the disclosure. For example, system 410 may include any number of data devices 414 and/or receiving devices 450 (and/or any number of components, such as processors or memory units illustrated or described in the above devices). Also, any suitable logic may perform the functions of system 410 and the components and/or devices within system 410. Furthermore, one or more components of system 410 may be separated, combined, and/or eliminated.

Furthermore, although data device 414 and receiving device 450 have been described above as being separate devices, in some examples, they may both be integrated into the same device. In such an example, the data device 414 may refer to a first process being performed within a single device (e.g., within a server), and the receiving device 450 may refer to a second process being performed within the same single device (e.g., within the server). This may allow the single device to securely transfer data between two separate processes being performed by the single device. The device (e.g., a server) may utilize a first processor to perform the process of the data device 414, and may further utilize a second processor to perform the process of the receiving device 450. Alternatively, the process of the data device 414 and the process of the receiving device 450 may be performed by the same processor(s) within the single device.

Figure 5:
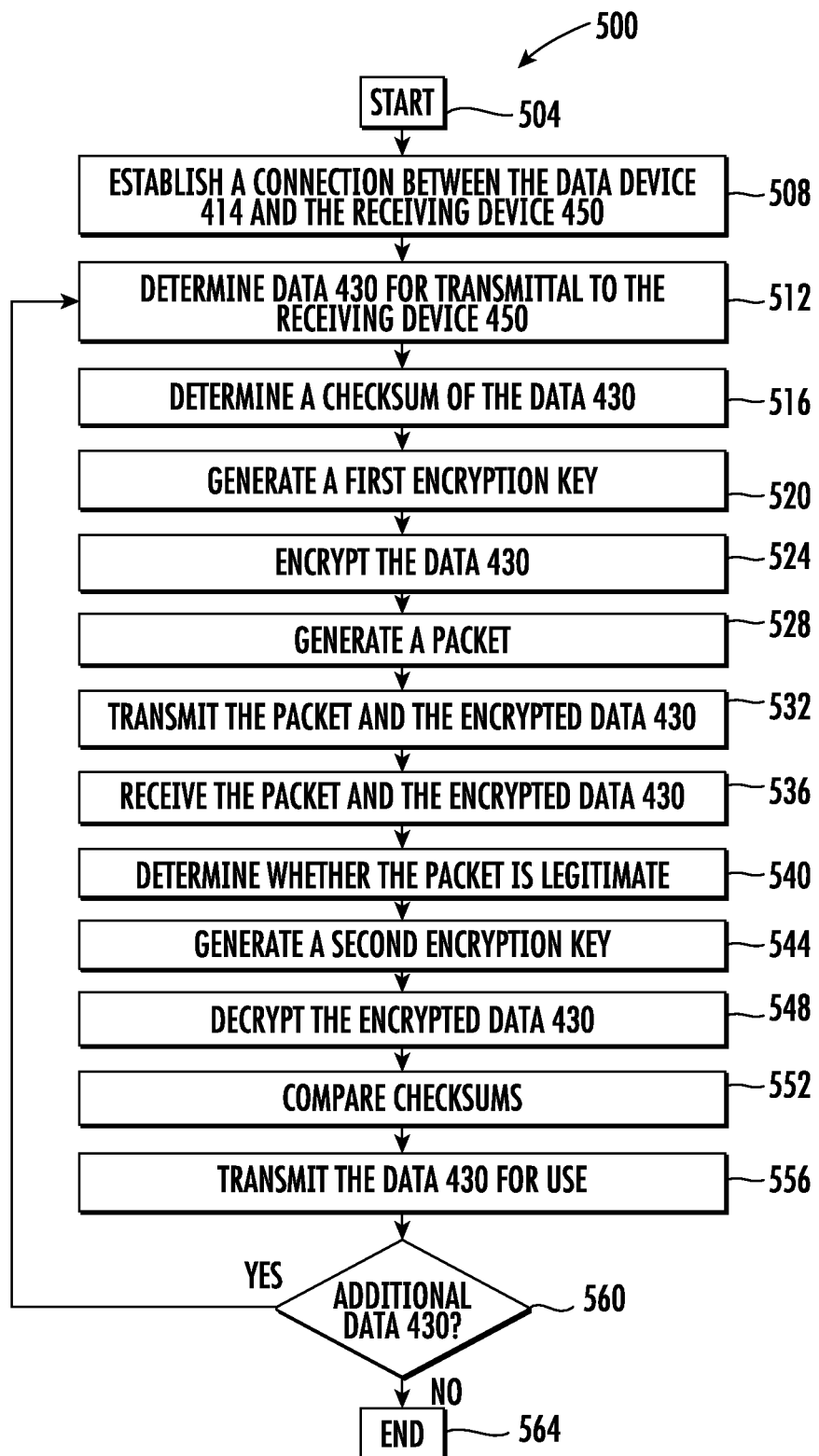
FIG. 5 illustrates another example method for securely transferring data.

FIG. 5 illustrates another example method for securely transferring data. As is illustrated, method 500 of FIG. 5 illustrates an example of securely transferring data 430 from data device 414 to receiving device 450 of FIGS. 4A-4B. However, the steps of method 500 may be utilized to securely transfer data 430 (or data 30, or any other data) from any device to any other device.

Method 500 beings at step 504. At step 508, a connection is established between data device 414 and the receiving device 450. The connection may refer to any type of connection that allows the data device 414 to communicate with the receiving device 450 (and vice versa) so as to transfer data 430, in some examples. This establishment of a connection in step 508 of FIG. 5 is substantially similar to the establishment of a connection in step 208 of FIG. 2, in some examples.

Similar to that discussed above in FIG. 2, step 508 may include a synchronization of the pseudo random bit generator(s) included in the data device 414 and the receiving device 450, in some examples. This synchronization of the pseudo random bit generator(s) allows the data device 414 and receiving device 450 to select the same encryption method 434 to use with a particular transfer of data 430, in some examples. For example, the synchronization of the pseudo random bit generator(s) may allow the data device 414 and receiving device 450 to both independently select the same first encryption method 434 (e.g., AES) to use for the transfer of first data 430 (e.g., bank account information). Furthermore, the synchronization of the pseudo random bit generator(s) may allow the data device 414 and receiving device 450 to both independently select to use the same second encryption method 434 (e.g., DES3) for the transfer of second data 430 (e.g., a request that an amount of money be transferred).

The synchronization of the pseudo random bit generator(s) may occur in any manner. For example, to synchronize the pseudo random bit generator(s), the data device 414 and the receiving device 450 may both generate, determine, and/or receive one or more seed values (e.g., one seed value, three seed values) that may be input into the pseudo random bit generators. These same seed value(s) may synchronize the pseudo random bit generator(s), causing them to independently generate matching encryption keys. The matching encryption keys may be used to encrypt data 430 and/or decrypt data 430. After this initial synchronization (i.e., initialization process or re-initialization process), information or other data received during communication between the data device 414 and the receiving device 450 may be used to keep the pseudo random bit generator(s) synchronized, in some examples.

At step 512, the data device 414 determines data 430 for transmittal to the receiving device 450. The data device 414 may determine data 430 in any manner. For example, the data device 414 may determine the data 430 when it is input by a user (or any other entity). As an example of this, the user may input their social security number into a fillable graphical box displayed on the display screen of the data device 414 (or the social security number may be auto filled by a program running on the data device 414), and then the user may activate a button that authorizes the transmittal of the input social security number. When the user activates this button, the data device 414 may determine that this social security number is data 430 that is to be transmitted to the receiving device 450. As another example, the data device 414 may determine the data 430 when it is selected by a user (or any other entity). As an example of this, the user may select a file and/or document from storage (e.g., a word document stored on the data device 414 or accessible to the data device 414), and then the user may activate a button that authorizes the transmittal of the file and/or document. When the user activates this button, the data device 414 may determine that this file and/or document is data 430 that is to be transmitted to the receiving device 450. As another example of this, the user may select an option displayed on the display screen of the data device 414, and then the user may activate a button that authorizes the transmittal of the selected option. When the user activates this button, the data device 414 may determine that this selected option is data 430 that is to be transmitted to the receiving device 450. In other examples, the determination of the data 430 may not require user input at all. For example, the transmittal of data 430 may be an automated communication between two end points. In such an example, the determination of the data 430 may occur when the data 430 is selected (or otherwise input) by one of the end points.

At step 516, the data device 14 (optionally) determines a checksum of the data 430. The checksum may allow errors to be detected in the data 430. For example, the checksum may be used to detect errors that have been introduced into the data 430 during its transmission and/or storage. The data device 414 may determine the checksum in any manner. For example, the data device 414 may determine the checksum using a checksum algorithm. In some examples, the checksum may be derived from the data 430 in its raw form.

At step 520, the data device 14 generates a first encryption key. As is discussed above, the first encryption key may be any type of key that is used with one or more encryption methods 434 to encrypt data. The first encryption key may be a random string of bits created for scrambling and unscrambling data. The first encryption key may have any length, may have any bits, and may be generated using any method. For example, the encryption key may be generated using a pseudo random bit generator. In such an example, one or more seed values may be input into the pseudo random bit generator to generate the first encryption key (and any subsequent encryption key). The pseudo random bit generator and/or the seed value(s) may be selected in any manner. For example, the pseudo random bit generator and/or the seed value(s) may be selected during the synchronization/pairing process discussed above. This may, in some examples, allow the data device 414 and the receiving device 450 to select the same pseudo random bit generator and/or the same seed value(s). In some examples, this selection may be part of an initialization process. After the initialization process, the data device 414 and the receiving device 450 may be able to select (or otherwise determine) the same seed value(s) at any time, without re-initialization.

The first encryption key is generated in real time (e.g., generated only when it is needed for a secure transfer of data 430), in some examples. This may prevent the first encryption key from having to be stored on disk. Instead, the first encryption key may only be stored in transient memory, as opposed to being stored on disk. Furthermore, once the first encryption key is used to encrypt the data 430, the first encryption key may be deleted (e.g., deleted from transient memory) or otherwise destroyed. As such, the first encryption key may be a one-time use encryption key that is destroyed after its use. This may prevent the first encryption key from being compromised if an unauthorized entity were to access the data device 414. In some examples, the first encryption key may not be deleted or otherwise destroyed.

The generation of the first encryption key by the data device 414 may refer to the data device 414 generating the first encryption key itself, or may refer to the data device 414 causing the first encryption key to be generated. For example, the data device 414 may generate the first encryption key by calling into a library or application installed or accessible to the data device 414, and having the library or application generate the first encryption key for the data device 414.

Although the first encryption key is described above as being generated (e.g., generated in real-time), in some examples, the first encryption key may be determined (e.g., determined in real-time). The first encryption key may be determined by being generated (as is discussed above) by the data device 414. Alternatively, the first encryption key may be determined in any other manner. For example, the first encryption key may be determined by selecting the first encryption key from a group of stored first encryption keys. As an example, the data device 414 may have thousands (or millions, or any other number) of possible first encryption keys stored on disk or accessible to the data device 414 (e.g., stored on a memory unit that the data device 414 has access to). In such an example, the data device 414 may determine a particular first encryption key by selecting it from these thousands (or millions, or any other number) of possible first encryption keys. This selection of the first encryption key may be performed in any manner (e.g., the selection may be pseudo random). Furthermore, because the data device 414 may store thousands (or millions, or any other number) of possible first encryption keys, the vast number of possible first encryption keys may prevent an unauthorized entity from determining which first encryption key was used, even if the unauthorized entity were to gain access to the data device 414.

Following generation of the first encryption key, the data device 414 encrypts the data 430 at step 524. The data 430 may be encrypted in any manner using the first encryption key. For example, the data device 414 may utilize the first encryption key with one or more encryption methods 434 to encrypt the data 430. The encryption method(s) 434 used to encrypt the data 430 may be selected in any manner. For example, as is discussed above, the encryption method(s) 434 may be selected during the synchronization/pairing process discussed above. This may, in some examples, allow the data device 414 and the receiving device 450 to select the same encryption method(s) 434 to use with the data 430.

At step 528, the data device 414 generates a packet. The packet may be generated in any manner. In some examples, the packet may also include additional information (other than the data 430). For example, the packet may include an identifier (e.g., a header, trailer, etc.). The identifier of the packet may include an identification code (which may identify the packet as having been sent by the data device 414), a timestamp (which may identify the time and/or date the packet was created and/or transmitted by the data device 414, such as in a yyyy.dd.HH.mm.sss format or any other format and at any time resolution), a parsing format identifier (which may identify how the packet was formed and how the data can be de-parsed), the determined checksum, a sequence number that may help to identify and recover from the event of a dropped packet or out of order packets within the communication between two devices, any other data, or any combination of the preceding. The generation of the packet may also optionally include encoding one or more portions of the packet (e.g., the checksum and/or the timestamp) using transmittal tokens 82. Examples of this encoding are discussed above with regard to FIGS. 1A-3. The generation of the packet may also optionally include adding one or more chaff tokens to the packet, in some examples. Examples of this addition of one or more chaff tokens is discussed above in step 232 of FIG. 2.

At step 532, the data device 414 transmits the packet and the encrypted data 430. The data device 414 may transmit the packet and the encrypted data 430 to the receiving device 450. The data device 414 may transmit the packet and the encrypted data 430 in any manner and over any communications network. For example, the data device 414 may transmit the packet and the encrypted data 430 over the Internet (e.g., using a TCP communications protocol, using a HTTP communications protocol), a WI-FI network, a cellular network, a radio telecommunication network, a BLUETOOTH network, a NFC network, any other wireless network, any wired network (e.g., a PSTN), any other manner of transmission, or any combination of the preceding. Furthermore, the packet and the encrypted data 430 may be transmitted in a single transmission, but they may remain separate, in some examples. In some examples, the packet may be sent over separate communication protocol(s) and/or path(s) than the encrypted data 430, so as to further enhance security.

Following transmittal of the packet and the encrypted data 430, the receiving device 450 receives the packet and the encrypted data 430 at step 536. After receiving the packet and the encrypted data 430, the receiving device 450 determines whether the packet is legitimate at step 540. The receiving device 450 may determine whether the packet is legitimate in any manner. In some examples, this determination of whether the packet is legitimate (at step 540 of FIG. 5) is substantially similar to that of step 244 of FIG. 2. Furthermore, the receiving device 450 may determine whether the packet is legitimate at a different time or step than step 536. Also, as is discussed above, one or more portions of the packet (e.g., the checksum and/or the timestamp) may have been encoded using transmittal tokens 82. In such examples, determining whether the packet is legitimate includes decoding these portions using reception mapping data 84. Examples of this decoding are discussed above with regard to FIGS. 1A-3.

At step 544, the receiving device 50 generates a second encryption key. As is discussed above, the second encryption key may be any type of key that is used with one or more encryption methods 434 to decrypt data. The second encryption key may be a random string of bits created for scrambling and unscrambling data. The second encryption key may have any length, may have any bits, and may be generated using any method. For example, the second encryption key may be generated using a pseudo random bit generator. In such an example, one or more seed values may be input into the pseudo random bit generator to generate the second encryption key (and any subsequent encryption key). The pseudo random bit generator and/or the seed value(s) may be selected in any manner. For example, the pseudo random bit generator and/or the seed value(s) may be selected during the synchronization/pairing process discussed above. This may, in some examples, allow the data device 414 and the receiving device 450 to select the same pseudo random bit generator and/or the same seed value(s), and may further allow the data device 414 and the receiving device 450 to generate (or determine) matching encryption keys.

The second encryption key generated by the receiving device 450 matches the first encryption key generated by the data device 414, in some examples. The second encryption key may match the first encryption key if the two encryption keys are identical (e.g., "58U48" and "58U48"). In other examples, the second encryption key may match the first encryption key in any other way that allows the second encryption key to be used to decrypt data 430 that was encrypted using the first encryption key.

The second encryption key is generated in real time (e.g., generated only when it is needed for a secure transfer of data 430), in some examples. This may prevent the second encryption key from having to be stored on disk. Instead, the second encryption key may only be stored in transient memory, as opposed to being stored on disk. Furthermore, once the second encryption key is used to decrypt the data 430, the second encryption key may be deleted (e.g., deleted from transient memory) or otherwise destroyed. As such, the second encryption key may be a one-time use encryption key that is destroyed after its use. This may prevent the second encryption key from being compromised if an unauthorized entity were to access the receiving device 450. In some examples, the second encryption key may not be deleted or otherwise destroyed.

The generation of the second encryption key by the receiving device 450 may refer to the receiving device 450 generating the second encryption key itself, or may refer to the receiving device 450 causing the second encryption key to be generated. For example, the receiving device 450 may generate the second encryption key by calling into a library or application installed on or accessible to the receiving device 450, and having the library or application generate the second encryption key for the receiving device 450.

Although the second encryption key is described above as being generated (e.g., generated in real-time), in some examples, the second encryption key may be determined (e.g., determined in real-time). The second encryption key may be determined by being generated (as is discussed above) by the receiving device 450. Alternatively, the second encryption key may be determined in any other manner. For example, the second encryption key may be determined by selecting the second encryption key from a group of stored possible second encryption keys. As an example, the receiving device 450 may have thousands (or millions, or any other number) of possible second encryption keys stored on disk or accessible to the receiving device 450 (e.g., stored on a memory unit that the receiving device 450 has access to). In such an example, the receiving device 450 may determine a particular second encryption key by selecting it from these thousands (or millions, or any other number) of possible second encryption keys. This selection of the second encryption key may be performed in any manner (e.g., the selection may be pseudo random). Furthermore, because the receiving device 450 may store thousands (or millions, or any other number) of possible second encryption keys, the vast number of possible second encryption keys may prevent an unauthorized entity from determining which second encryption key was used, even if the unauthorized entity were to gain access to the receiving device 450.

Following the generation of the second encryption key, the receiving device 450 decrypts the encrypted data 430 at step 548. The receiving device 450 may utilize the second encryption key to decrypt the encrypted data 430. The encrypted data 430 may be decrypted in any manner using the second encryption key. For example, the receiving device 450 may utilize the second encryption key with the same encryption method 434 that was used by the data device 414 to originally encrypt the data 430. In some examples, the receiving device 450 may select this same encryption method 434 during the synchronization/pairing process discussed above. In other examples, the receiving device 450 may select this same encryption method 434 based on an identifier included in the packet, itself.

At step 552, the receiving device 450 (optionally) determines a second checksum of the data 430, and compares it to the checksum received from the data device 414. The checksum may allow errors to be detected in the data 430. For example, the checksum may be used to detect errors that have been introduced into the data 430 during its transmission and/or storage. The receiving device 450 may determine the checksum in any manner. For example, the receiving device 450 may determine the checksum using a checksum algorithm. In some examples, the checksum may be derived from the data 430 in its raw form. The receiving device 450 may compare the two checksums in any manner. For example, the receiving device 450 may compare the two checksums using a CRC. If the two checksums match, the receiving device 450 may move to step 556 where the data 430 is transmitted for use. If the two checksums do not match, the receiving device 450 may discard the data 430 (as it may include errors), and may request that the data device 14 re-transmit the data 430 again.

At step 556, the receiving device 450 transmits the data 430 for use. In some examples, the receiving device 450 may transmit the data 430 for use by the receiving device 450. For example, the data 430 may be transmitted to an application or other program that is being executed by the processor of the receiving device 450. This may allow the application or other program to use or otherwise access the data 430. In other examples, the receiving device 450 may transmit the data 430 to the user of the receiving device 450. In such an example, the transmission of the data 430 may refer to a transmission that causes the data 430 to be displayed on a display screen (e.g., displayed on a display screen of a Smartphone), and/or a transmission that causes the data 430 to be output to another user interface (e.g., output as sound from speakers or earphones of a mobile device). As such, the user may view, listen to, or otherwise access the data 430. In additional examples, the receiving device 450 may transmit the data 430 to another device (e.g., a server that will store the data 430, a television that will display the data 430). In other examples, the transmission of the data 430 may refer to any other manner in which the receiving device 450 may utilize the data 430. For example, the transmission of the data 430 may refer to the receiving device 450 storing the data 430 in memory (e.g., storage on disk).

At step 560, the data device 414 determines whether to transmit additional data 430. The data device 414 may determine whether to transmit additional data 430 for any reason. For example, a user of data device 414 may have selected to have additional data 430 transmitted. As another example, an application, program, and/or device on data device 414 may have provided additional data 430 to the data device 414 for transmittal. As a further example, the data device 414 may have received a request from the receiving device 450 for additional data 430.

If it is determined at step 560 that additional data 430 should not be transmitted, the method 500 moves to step 564, where the method 500 ends. On the other hand, if it is determined that additional data 430 should be transmitted, the method 500 moves back up to step 512, where the data device 414 retrieves the additional data 430. Then the method 500 re-performs one or more (or all) of steps 512-560 so as to securely transfer the additional data 430.

Although the method 500 may re-perform one or more (or all) of steps 512-560, it may do so using different encryption keys. As such, even if an unauthorized entity were to determine the first encryption key, second encryption key, and/or data 430 from the previous transmission, these determinations would not help the unauthorized entity in subsequent transmission of data 430.

In order to utilize different encryption keys, both the data device 414 and the receiving device 450 may generate (or determine) new encryption keys. For example, for a second transmission, the data device 414 may generate (or determine) a third encryption key, and the receiving device 450 may generate (or determine) a fourth encryption key to decrypt data 430 encrypted using the third encryption key. This generation of new encryption keys may be similar to steps 520 and 544 discussed above.

The steps 512-560 may be re-performed for any number of times, so as to securely transfer any amount of data.

Furthermore, the steps 512-560 may continue to be performed even if a particular transmission of data 430 does not reach its intended recipient (i.e., the receiving device 450). As an example, if the receiving device 450 receives a third set of data 430, and also receives a fifth set of data 430 (but never receives the fourth set of data 430, for some reason), the receiving device 450 may still be able decrypt the fifth set of data 430, and any subsequent packet or other data 430. In such an example, the receiving device 450 may utilize the sequence number in the identifier of the packet (discussed above) to assist in identifying that the fourth set of data 430 was not received, and to further assist in generating (or otherwise determining) the encryption key for the fifth set of data 430. In traditional systems, such a failure to receive data in its proper order may cause issues. In contrast to this, the system 410 may be able to handle not receiving data in order. One reason for this is that the encryption keys are generated in real time, in some examples. This may allow the encryption key for the fifth set of data 430 to be generated despite the receiving device 450 having never received the fourth set of data 430, in some examples.

Additionally, the steps 512-560 may continue to be performed even if data 430 is received by the receiving device 450 in the wrong order. As an example, if the receiving device 450 receives an eighth set of data 430 before it received the sixth or seventh set of data 430, the receiving device 450 may still be able to decrypt the eighth set of data 430, and any prior or subsequent set of data 430 or other data 430. In such an example, the receiving device 450 may keep track (e.g., in a log) of the sequence numbers from the packets it has already received. Then, if the receiving device 450 is expecting to receive the sixth set of data 430 (because it has already received the first five sets of data 430), but it actually receives the eighth set of data 430 instead, the receiving device 450 may jump ahead to generating (or determining) the encryption key for the eighth set of data 430 (instead of for the sixth set of data 430). This jump may be performed by running two extra iterations of the method that generates (or determines) the encryption key. This new encryption key may be used to decrypt the eighth set of data 430. The receiving device 50 may then store the sequence number for the eighth set of data 430, and then it may reset to its last known complete state (e.g., the state where it had received and determined the fifth set of data 430).

Then, if the receiving device 450 receives the seventh set of data 430 (instead of the sixth set of data 430), the receiving device 450 may jump ahead to generating (or determining) the encryption key for the seventh set of data 430 (instead of for the sixth set of data 430). This jump may be performed by running one extra iteration of the method that generates (or determines) the encryption key. This new encryption key may be used to decrypt the seventh set of data 430. The receiving device 450 may then store the sequence number for the seventh set of data 430, and then it may reset to its last known complete state (e.g., the state where it had received and determined the fifth set of data 430). Then, if the receiving device 450 finally receives the sixth set of data 430, the receiving device 450 may generate (or determine) the encryption key for the sixth set of data 430, and use it to decrypt the sixth set of data 430. Then the receiving device 450 may determine that it has received the first eight sets of data 430, and it may set its complete state to the eighth set of data 430. The receiving device 450 may now be ready to receive subsequent sets of data 430.

Modifications, additions, or omissions may be made to method 500. For example, although the steps of method 500 are described above as being performed by data device 414 or receiving device 450, in some examples, one or more of the steps of method 500 may be performed by any other device. As another example, one or more steps of method 500 may be optional, or may not be performed. For example, method 500 may not include step 508, where a connection is established. Instead, communication between the data device 414 and receiving device 450 may begin when the data device 414 starts transmitting data 430. As another example, method 500 may not include steps 516 and 552 regarding checksums, and/or may not include determining whether the packet was received within a predetermined amount of time. As a further example, the steps of method 500 may be performed in parallel or in any suitable order.

Furthermore, in some examples, system 410 is not limited to only transferring data 430 from the data device 414 to the receiving device 450. For example, the receiving device 450 may perform steps 512-532 to transmit data 430 to data device 414, and the data device 414 may perform steps 536-556 to determine this data 430. That is, both devices may utilize the same steps to communicate back and forth between each other.

Additionally, although system 410 of FIGS. 4A-5 has been described above as being separate from system 10 of FIGS. 1A-3, in some examples, the system 410 and system 10 (and their functionalities) are integrated into a single system. In such examples, the combined system is able to securely transfer data using either (1) transmittal mapping data 78 and reception mapping data 84 (as is discussed in FIGS. 1A-3), or (2) generated encryption keys (as is discussed in FIGS. 4A-5). Furthermore, the combined system is able to switch between the two methods for securely transferring data, in some examples. For example, the combined system may securely transfer a first set of data using transmittal mapping data 78 and reception mapping data 84 (as is discussed in FIGS. 1A-3), and then it may switch so that it securely transfers a second set of data using generated encryption keys (as is discussed in FIGS. 4A-5), or vice versa.

The combined system may switch between the two methods for securely transferring data for any reason. For example, the system may alternate the two methods (e.g., switching every other piece of data, switching every three pieces of data). As another example, the method used to securely transfer the data may be randomly chosen from the two methods (e.g., using the pseudo random bit generator and the seed value(s)). As a further example, the method used to securely transfer the data may be based on the size of the data. In such an example, if the size of the data is less than a predetermined threshold, the combined system may choose to securely transfer the data using transmittal mapping data 78 and reception mapping data 84 (as is discussed in FIGS. 1A-3). On the other hand, if the size of the data is equal to or greater than the predetermined threshold, the combined system may choose to securely transfer the data using generated encryption keys (as is discussed in FIGS. 4A-5), or vice versa. The combined system may then insert a flag into the packet that indicates what method was used, or what the size of the data was, in some examples.

The predetermined threshold may be any amount of data. As an example, the predetermined threshold may be 8 bytes, 16 bytes, 32 bytes, 64 bytes, 128 bytes, 256 bytes, 512 bytes, 1 kilobyte, 1 megabyte, 1 gigabyte, any other amount of data, or any amount of data in-between 1 byte and 1 terabyte. In some examples, the predetermined threshold may be a measure of the amount of data (e.g., data 30, data 430) prior to the addition of chaff tokens, header, checksum, timestamp, and/or any other additional information included in the packet.

As one example, the predetermined threshold is 16 bytes. In such an example, the combined system securely transfers the data using transmittal mapping data 78 and reception mapping data 84 (as is discussed in FIGS. 1A-3) if the data is less than 16 bytes, while the combined system securely transfers the data using generated encryption keys (as is discussed in FIGS. 4A-5) if the data is equal or greater than 16 bytes.

System and Method for Detecting Compromised Devices

As is discussed above, a device (e.g., a mobile device) can typically be compromised (e.g., jailbroken, rooted) to provide additional access to the mobile device. For example, a mobile device can be jailbroken to provide access to the entire file system of the mobile device. When a mobile device is compromised, it may be freed from the limitations imposed on the device by its manufacture (e.g., APPLE) and/or the mobile service carrier (e.g., AT&T). As such, the compromised mobile device may be able to do things it previously could not, such as install unofficial applications and modify settings. This compromised mobile device may present a security risk. For example, the compromised device may include malware, spyware, and/or other undesirable software that could be transmitted to other devices. Unfortunately, traditional methods for detecting such compromised mobile devices may be deficient.

Figure 6A:
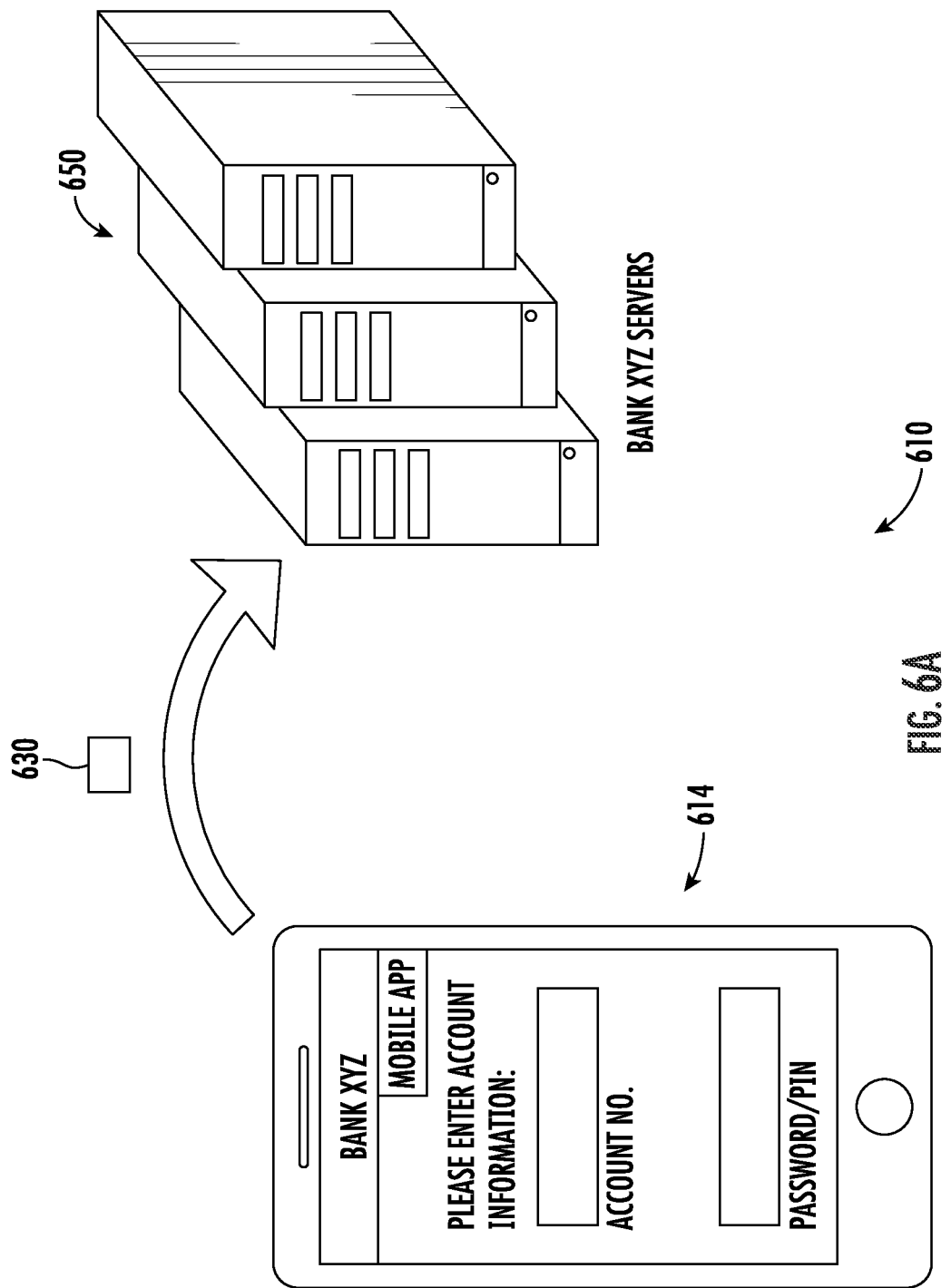
FIGS. 6A-6B illustrate an example system for detecting compromised devices.
Figure 6B:
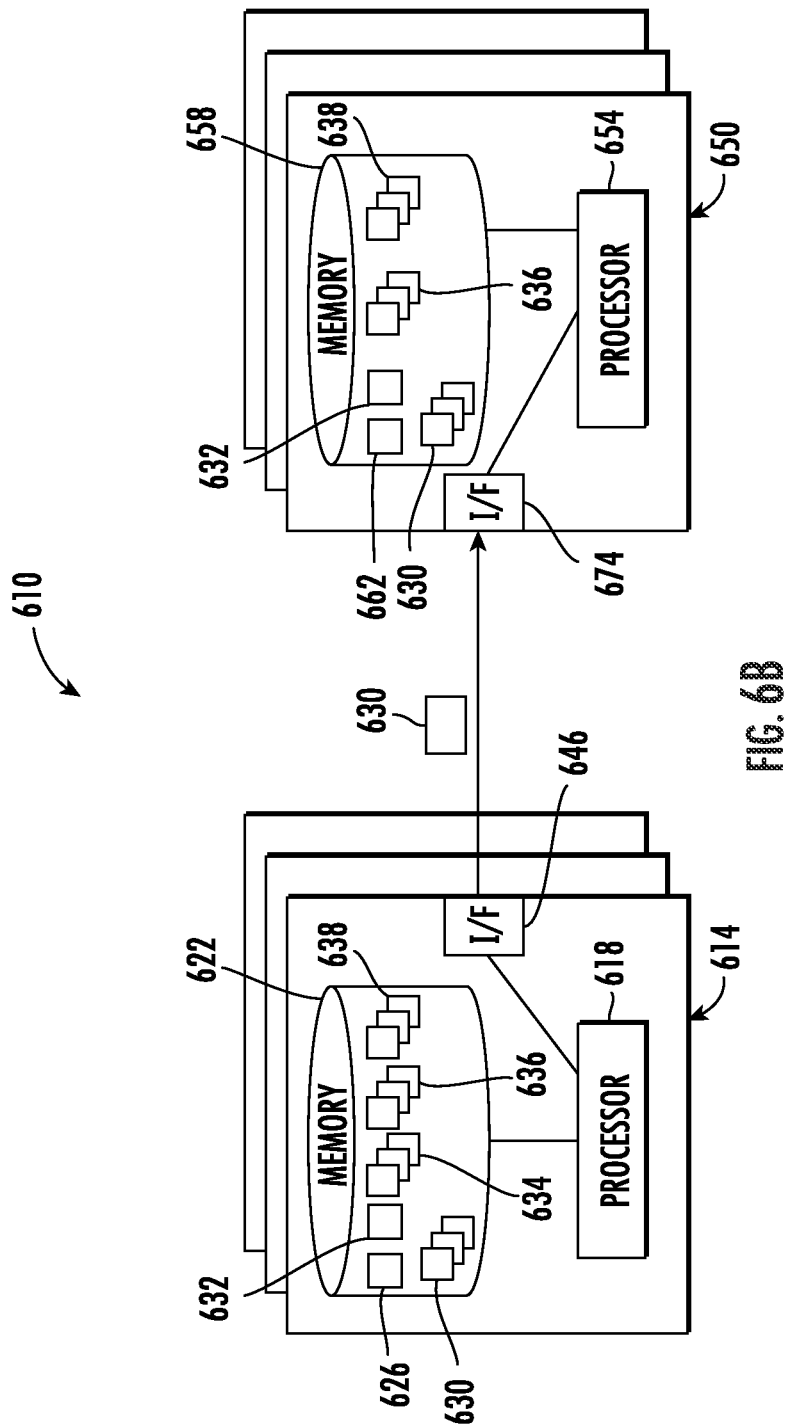

Contrary to this, the system 610 of FIGS. 6A-6B may address one or more of these deficiencies. FIGS. 6A-6B illustrate an example system 610 for detecting compromised data devices 614. In the example illustrated in FIGS. 6A-6B, system 610 includes a data device 614 (e.g., a mobile phone) that determines data 630 (e.g., bank account information input by a user) for transmittal to a receiving device 650 (e.g., a server). This data device 614, however, may be compromised (e.g., jailbroken, rooted), which may present a security risk to the receiving device 650 if the receiving device 650 were to utilize this data 630 from the data device 614. To prevent against this, the data device 614 performs various actions that may reduce the risk to the receiving device 650. First, the data device 614 determines an authentication code 632 (e.g., a nonce). Second, the data device 614 performs one or more tests 634 on the data device 614 that indicate whether the data device 614 is compromised (e.g., jailbroken, rooted). Third, if the data device 614 passes these tests 634 (i.e., the data device 614 is not compromised), the data device 614 manipulates the authentication code 632 to generate a first seed value. On the other hand, if the data device 614 fails these tests 634 (i.e., the data device 614 is compromised), the data device 614 manipulates the authentication code 632 to generate a second seed value. Fourth, the data device 614 modifies the data 630 using the first seed value (if the data device 614 is not compromised) or the second seed value (if the data device 614 is compromised). Fifth, the data device 614 transmits the modified data to the receiving device 650.

Following reception of the modified data, the receiving device 650 determines the authentication code 632 (e.g., a nonce). The receiving device 650 then manipulates the authentication code 632 to generate a third seed value that matches the first seed value. Finally, the receiving device 650 de-modifies the modified data using the third seed value. If the data device 614 is compromised (e.g., jailbroken, rooted), the de-modification will not be successful, and the receiving device 650 discards the modified data. This is because the data device 614 modified the data 630 using the second seed value, while the receiving device 650 tried to de-modify the data using the third seed value (which matches the first seed value, not the second seed value). On the other hand, if the data device 614 is not compromised, the de-modification will be successful. This is because the data device 614 modified the data 630 using the first seed value, and the receiving device 650 de-modified the data using the third seed value (which matches this first seed value). The receiving device 650 then transmits the data 630 for use (e.g., stores it in memory). As can be seen above, the receiving device 650 can only de-modify the modified data received from the data device 614 if the data device 614 is not compromised. This prevents the receiving device 650 from utilizing data 630 received from a compromised data device 614, in some examples. It also allows the receiving device 650 to detect that the data device 614 is compromised, in some examples.

Data 630 represents any type of information. In some examples, data 630 is substantially similar to the data 30 of FIGS. 1A-3 and/or the data 430 of FIGS. 4A-5. For example, the data 630 may be personal information (e.g., a social security number, membership identifier, name, address), business information (e.g., a document, spreadsheet, or other information created, used, and/or received by a business), medical information (e.g., a medical report, a medical diagnosis, a medical bill), financial information (e.g., information regarding investments, credit card information, bank information, account number), security information (e.g., a password, personal access number), a document (e.g., a word document, an excel spreadsheet, a pdf), an audio file (e.g., a music file), a video file (e.g., a movie file, a tv show file, a video clip), account information, a completed voting ballot (e.g., for voting in an election for public office), any other type of information, or any combination of the preceding. The data 630 further represents any portion of information. For example, the data 630 may be an entire spreadsheet (or other document, such as a word document), or it may be a portion of an entire spreadsheet (or other document), such as only social security numbers or other personal information included in the spreadsheet (or other document). As another example, the data 630 may be an entire medical report, or it may be a portion of the medical report, such as only personal information included in the medical report and/or the diagnosis in the medical report.

In the example illustrated in FIGS. 6A-6B, the system 610 includes the data device 614. The data device 614 may be any device that determines data 630, stores data 630, and/or transmits data 630. In some examples, the data device 614 is substantially similar to the data device 14 of FIGS. 1A-3 and/or the data device 414 of FIGS. 4A-5. As is illustrated in FIGS. 4A-4B, the data device 614 is a mobile telephone, such as a Smartphone.

The data device 614 may be a compromised device. The data device 614 may be compromised in any manner. For example, the data device 614 may be compromised in a manner that provides additional access to the data device 614 and/or that causes the data device 614 to be free from the limitations imposed on the device by its manufacturer (i.e., APPLE) and/or the mobile service carrier (e.g., AT&T). Examples of a compromised data device 614 include a jailbroken device and a rooted device. A jailbroken device refers to an APPLE device (e.g., an IPHONE, an IPAD) that has been freed from the limitations imposed on the device by its manufacturer (i.e., APPLE) and/or the mobile service carrier (e.g., AT&T), in some examples. As an example of this, a jailbroken IPHONE may have been compromised by removing software restrictions imposed by APPLE on the operating system of the IPHONE. A rooted device refers to an ANDROID device (e.g., a GOOGLE Pixel Phone, a SAMSUNG phone) that has been freed from the limitations imposed on the device by its manufacturer and/or the mobile service carrier, in some examples. A compromised device may be a security risk to a receiving device 650 because the compromised device may include malware, spyware, and/or other undesirable software that could be transmitted to the receiving device 650, in some examples. As such, it may be beneficial to prevent the transfer of data from a compromised device to the receiving device 650, in some examples.

As is also illustrated in FIG. 6B, the data device 614 includes a computer/data processor 618 and data storage medium 622 (e.g., memory) comprising instructions 626 executable by the processor 618 to perform the functions of the data device 614. Additionally, the data device 614 includes a communication port 646 (e.g., receiver, transmitter, transceiver, network interface) configured to receive and transmit information (e.g., receive requests for data 630, transmit the data 630).

In the example illustrated in FIG. 6B, the data device 614 has an authentication code 632. An authentication code 632 is a set of data that authenticates the data device 614. For example, the authentication code 632 may indicate that the data device 614 has been registered with the receiving device 650, thereby authenticating the data device 614. The authentication code 632 is a two factor authentication code, in some examples. The authentication code 632 may be any type of data. For example, the authentication code 632 may be a set of numbers, a set of letters (e.g., A, B, C, etc.), a set of numbers and letters, a set of symbols (e.g., %, !, ?, etc.), a code, any other grouping of characters, or any combination of the preceding. In some examples, the authentication code 632 may only include numbers. In other examples, the authentication code 632 may include both numbers and other characters. The authentication code 632 may have any length. For example, the authentication code 632 may be a four character code, an eight character code, a sixteen character code, a 32 character code, a code with a length between four characters and 32 characters, or a code with any other length.

In some examples, the authentication code 632 may be a nonce. A nonce refers to a time-varying numerical value that has almost no chance of repeating. The nonce may be a nonce (or cryptographic nonce) defined by the National Institute of Standards and Technology (NIST) standards. In some examples, the authentication code 632 may be a nonce after it is manipulated (as is discussed below).

As is discussed above, the authentication code 632 indicates that the data device 614 has been registered with the receiving device 650, in some examples. The authentication code 632 may be first generated (or otherwise determined) when the data device 614 first registers with the receiving device 650. The authentication code 632 may be generated (or otherwise determined) in any manner. For example, the authentication code 632 may be generated by a pseudo random bit generator based on the time/date that the registration occurs. After the first generation, a new authentication code 632 may be generated (or otherwise be determined) each time the data device 614 begins a communication session with the receiving device 650. As an example of this, if the data device 614 communicates with the receiving device 650 via a mobile app executed on the data device 614, a new authentication code 632 may be generated each time this mobile app is opened on the data device 614. As another example, if the data device 614 communicates with the receiving device 650 via a browser or webpage accessed on the data device 614, a new authentication code 632 may be generated each time this browser or webpage is accessed on the data device 614.

Furthermore, because the authentication code 632 is generated when the data device 614 first registers with the receiving device 650 (or when the data device 614 beings a communication session with the receiving device 650), both the data device 614 and the receiving device 650 may generate (or otherwise determine) the same authentication code 632, in some examples. This authentication code 632 may be used by both the data device 614 and the receiving device 650 to assist in detecting whether the data device 614 is compromised.

In the example illustrated in FIG. 6B, the data device 614 has one or more tests 634. A test 634 refers to any test or process that can be executed or run by the data device 614 in order to test for whether or not the data device 614 is compromised. One example of a test 634 is a test that verifies that the entirety of an application's code has not been altered in any way (e.g., if the application's code is altered, the data device 614 is compromised). Other examples of a test 634 include a test that verifies whether particular files/items are installed on the data device 614 (e.g., a data device 614 with a "Cydia" file or a "SBSettings" file is jailbroken) and/or are accessible to the data device 614, a test that verifies whether particular files have been un-installed from the data device 614 (e.g., a data device 614 that does not include one or more Default Applications is jailbroken), a test that verifies whether or not low level commands to the operating system of the data device 614 are denied (e.g., a data device 614 that does not deny low level commands to the operating system is jailbroken), a test that scans the data device 614 to determine whether the data device 614 is jailbroken or rooted, a test that verifies whether any of the tests 634 have been altered in any way (e.g., if the test 634 is altered, the data device 614 is jailbroken), any other test or process that can be used to test for whether or not the data device 614 is compromised, or any combination of the preceding. In some examples, the tests 634 may be industry standard tests. The data device 614 may include any number of tests 634.

When the data device 614 executes or runs a test 634 on the data device 614, the test can be either passed or failed. A passed test refers to a test result that indicates that the data device 614 is not compromised. As such, a passed test refers to a "negative" or "failed" result, if such a "negative" or "failed" result indicates that the data device 614 is not compromised. Furthermore, a passed test refers to a "positive" or "passed" result, if such a "positive" or "passed" result indicates that the data device 614 is not compromised. Alternatively, a failed test refers to a test result that indicates that the data device 614 is compromised. As such, a failed test refers to a "positive" or "passed" result, if such a "positive" or "passed" result indicates that the data device 614 is compromised. Furthermore, a failed test refers to "negative" or "failed" result, if such a "negative" or "failed" result indicates that the data device 614 is compromised. As one example of this, the test 634 may cause the data device 614 to search for a "Cydia" file. In such an example, the data device 614 passes this test if the result is "negative" (i.e., the "Cydia" file was not found), which indicates that the data device 614 is not compromised. Alternatively, the data device 614 fails this test if the result is "positive" (i.e., the "Cydia" file was found), which indicates that the data device 614 is compromised.

In the example illustrated in FIG. 6B, the data device 614 has one or more manipulation methods 636. A manipulation method 636 refers to a method that manipulates the authentication code 632 so as to change it, in some examples. A manipulation method 636 may manipulate the authentication code 632 in any manner. As one example, a manipulation method 636 may be a mathematical method that manipulates one or more numbers included in the authentication code 632. In such an example, the manipulation method 636 may be a method that adds a number (e.g., 2, 10, −3) to the authentication code 632, subtracts a number (e.g., 5, 7, 2) from the authentication code 632, multiplies the authentication code 632 by a number (e.g., 0, 4, 8), divides the authentication code 632 by a number (e.g., 1, −1, 4, 10), mathematically manipulates one or more numbers in the authentication code 632 in any other manner, or any combination of the preceding. As one example of this, if the authentication code 632 is "5879", the mathematical method may subtract "2" from this authentication code 632 to manipulate the authentication code 632 to be "5877". The mathematical method may manipulate the entire authentication code 632, or it may only manipulate a portion of the authentication code 632 (e.g., it may only manipulate the first number in the authentication code 632).

The manipulation methods 636 may include any number of mathematical methods. Also, a different mathematical method may be used to manipulate the authentication code 632 depending on whether or not the data device 614 passes a test 634 (discussed above). As one example of this, the test 634 may cause the data device 614 to search for a "Cydia" file. If the data device 614 passes this test (i.e., the "Cydia" file was not found, which indicates that the data device 614 is not compromised), the data device 614 may select (or generate) a first mathematical method to manipulate the authentication code 632 (e.g., the data device 614 may subtract "2" from the authentication code 632 "5879" to manipulate the authentication code 632 to be "5877"). Alternatively, if the data device 614 fails this test (i.e., the "Cydia" file was found, which indicates that the data device 614 is compromised), the data device 614 may select (or generate) a second different mathematical method to manipulate the authentication code 632 (e.g., the data device 614 may add "4" to the authentication code 632 "5879" to manipulate the authentication code 632 to be "5883"). In this example, the authentication code 632 is manipulated in different ways depending on whether or not the data device 634 is compromised.

A manipulation method 636 may also be a seed generation method that further manipulates the authentication code 632 to generate a seed value, in some examples. A seed value (or seed) refers to a value that may be input into a pseudo random bit generator (or DRBG). As an example of this, a seed value is a string of bits that is used as an input to a pseudo random bit generator (or DRBG), and that determines a portion of the internal state of the pseudo random bit generator (or DRBG), as defined by the NIST standards. A seed generation method may further manipulates the authentication code 632 in any manner to generate a seed value. As one example, the seed generation method may combine the authentication code 632 (which has already been manipulated based on the results of test(s) 634 and mathematical method(s), as is discussed above) with an entropy input and an optional personalization value to generate the seed value, in accordance with the NIST standards. In such an example, the manipulated authentication code 632 is a nonce, the entropy is a secret piece of truly random data that makes the technology cryptographically secure, and the personalization value is a unique identifier for the pair of the data device 614 and the receiving device 650. Furthermore, in such an example, the entropy and the personalization value may never change. Only the nonce changes, in some examples.

As another example, the seed generation method may generate the seed value using only the authentication code 632 (which has already been manipulated based on the results of test(s) 634 and mathematical method(s), as is discussed above). As one example of this, the seed generation method may generate the seed value by merely selecting the authentication code 632 to be the seed value (which has already been manipulated, as is discussed above). In such an example, no further manipulation may occur. As another example of this, the seed generation method may generate the seed value by further manipulating the authentication code 632 in some manner (e.g., reversing the bits of the authentication code 632). In these examples, an entropy input and personalization value may not be used to generate the seed value.

In the example illustrated in FIG. 6B, a different seed value is generated depending on whether or not the data device 614 is compromised. That is, if the data device 614 is not compromised, a first seed value is generated. On the other hand, if the data device 614 is compromised, a second seed value is generated. Furthermore, this second seed value is different from the first seed value. As one example of this, the test 634 may cause the data device 614 to search for a "Cydia" file. In this example, if the data device 634 passes this test (i.e., the "Cydia" file was not found, which indicates that the data device 614 is not compromised), the data device 614 may utilize a first mathematical method to subtract "2" from the authentication code 632 "5879", so as to manipulate the authentication code 632 to be "5877". Alternatively, if the data device 634 fails this test (i.e., the "Cydia" file was found, which indicates that the data device 614 is compromised), the data device 614 may utilize a second mathematical method to add "4" to the authentication code 632 "5879", so as to manipulate the authentication code 632 to be "5883". In this example, there are two different possible authentication codes 632: (1) "5877" for a non-compromised data device 614; and (2) "5883" for a compromised data device 614. If the data device 614 is not compromised, the authentication code 632 "5877" may be combined with an entropy input and an optional personalization value to generate the first seed value (e.g., "9F4${"), in accordance with a seed generation method. If the data device 614 is compromised, the authentication code 632 "5883" may be combined with an entropy input and an optional personalization value to generate the second seed value (e.g., "H7dB5"), in accordance with the seed generation method.

In the example illustrated in FIG. 6B, the data device 614 also has one or more data modification methods 638. A data modification method 638 refers to a method that modifies the data 630 so that it can be securely transferred to the receiving device 650. The data modification method 638 may modify the data 630 in any manner so that it can be securely transferred to the receiving device 650.

In one example, a data modification method 638 is a method that uses the transmittal mapping data 78 and reception mapping data 84 (discussed in FIGS. 1A-3) to securely transfer the data 630 to the receiving device 650. In such an example, the data 630 is replaced with transmittal tokens 82, and these transmittal tokens 82 are transmitted to the receiving device 650 (as is discussed above in FIGS. 1A-3). The actual data 630 is not sent to the receiving device 650. Furthermore, as is also discussed above in FIGS. 1A-3, the transmittal tokens 82 may be generated using a seed value. This causes the data device 614 to generate different transmittal tokens 82 (and transmittal mapping data 78)

when it utilizes the first seed value (i.e., if the data device 614 is not compromised), than when it utilizes the second seed value (i.e., if the data device 614 is compromised).

In another example, a data modification method 638 is a method that utilizes generated encryption keys (as is discussed in FIGS. 4A-5) to securely transfer the data 630 to the receiving device 650. In such an example, the data 630 is encrypted using an encryption method and the generated first encryption key, and this encrypted data 630 is then transmitted to the receiving device 650 (as is discussed above in FIGS. 4A-5). Furthermore, as is also discussed above in FIGS. 4A-5, the first encryption key may be generated using a seed value. This causes the data device 614 to generate a different first encryption key when it utilizes the first seed value (i.e., if the data device 614 is not compromised), than when it utilizes the second seed value (i.e., if the data device 614 is compromised).

In another example, a data modification method 638 is a method that utilizes the seed value as the encryption key for an encryption method, so as securely transfer the data 630 to the receiving device 650. In such an example, the encryption key is different when the data device 614 utilizes the first seed value (i.e., if the data device 614 is not compromised), than when the data device 614 utilizes the second seed value (i.e., if the data device 614 is compromised). In other examples, the data modification method 638 may be any other method that utilizes a seed value (i.e., the first seed value or the second seed value) to modify the data 630 so that it can be securely transferred to the receiving device 650.

In the example illustrated in FIGS. 6A-6B, the system 610 further includes the receiving device 650. The receiving device 650 may be any device that receives data 630, processes data 630, and/or utilizes data 630. In some examples, the receiving device 650 is substantially similar to the receiving device 50 of FIGS. 1A-3 and/or the receiving device 450 of FIGS. 4A-5. As is illustrated in FIGS. 6A-6B, the receiving device 650 is a server that the user of the data device 614 is communicating with via a mobile app executed on the data device 614. Furthermore, as is also illustrated in FIG. 6B, the receiving device 650 includes a computer/data processor 654 and data storage medium 658 (e.g., memory) comprising instructions 662 executable by the processor 654 to perform the functions of the receiving device 650. Additionally, the receiving device 650 includes a communication port 674 (e.g., receiver, transmitter, transceiver, network interface) configured to receive and transmit information (e.g., receive data 630, transmit requests for data 630).

In the example illustrated in FIG. 6B, the receiving device 650 has the authentication code 632, one or more manipulation methods 636, and one or more data modification methods 638. The authentication code 632 stored on the receiving device 650 is the same as the authentication code 632 stored on the data device 614, in some examples.

The manipulation methods 636 stored on the receiving device 650 are also the same as the manipulation methods 636 stored on the data device 614, in some examples. As such, the receiving device 650 has the same (or some of the same) mathematical method(s) for manipulating the authentication code 632, as the data device 614. The receiving device 650 also has the same (or some of the same) seed generation method(s) for manipulating the authentication code 632 to generate a seed value, as the data device 614. However, unlike the data device 614, the receiving device 650 only utilizes the mathematical method(s) that are associated with the data device 614 passing its tests 634 (not the ones that are associated with the data device 614 failing its tests 634), in some examples. That is, the receiving device 650 assumes that the data device 614 passes all of its tests 634, and it manipulates the authentication code 632 as if the data device 614 did pass its tests 634 (even if it did not, in actuality). As a result of this, when the data device 614 is compromised, the data device 614 manipulates its authentication code 632 to be a different code than what the receiving device 650 manipulates its authentication code 632 to be. This prevents the receiving device 650 from successfully de-modifying the modified data that was transmitted by the compromised data device 614.

The data modification methods 638 stored on the receiving device 650 are also the same as the data modification methods 638 stored on the data device 614, in some examples. As such, the receiving device 650 can de-modify the data 630 using the same method(s) used by the data device 614 to modify the data 630.

Modifications, additions, or omissions may be made to system 610 without departing from the scope of the disclosure. For example, system 610 may include any number of data devices 614 and/or receiving devices 650 (and/or any number of components, such as processors or memory units illustrated or described in the above devices). Also, any suitable logic may perform the functions of system 610 and the components and/or devices within system 610. Furthermore, one or more components of system 610 may be separated, combined, and/or eliminated.

Although data device 614 and receiving device 650 have been described above as being separate devices, in some examples, they may both be integrated into the same device. In such an example, the data device 614 may refer to a first process being performed within a single device (e.g., within a server), and the receiving device 650 may refer to a second process being performed within the same single device (e.g., within the server). This may allow the single device to securely transfer data between two separate processes being performed by the single device. The device (e.g., a server) may utilize a first processor to perform the process of the data device 614, and may further utilize a second processor to perform the process of the receiving device 650. Alternatively, the process of the data device 614 and the process of the receiving device 650 may be performed by the same processor(s) within the single device.

FIG. 7 illustrates an example method for detecting compromised devices. As is illustrated, method 700 of FIG. 7 illustrates an example where the receiving device 650 of FIGS. 6A-6B detects whether the data device 614 of FIGS. 6A-6B is compromised. However, the steps of method 700 may be utilized by any device to detect whether any other device is compromised.

Method 700 beings at step 704. At step 708, a connection is established between the data device 614 and the receiving device 650. The connection refers to any type of connection that allows the data device 614 to communicate with the receiving device 650 (and vice versa) so as to transfer data 630, in some examples. The establishment of the connection at step 708 of FIG. 7 is substantially similar to the establishment of the connection at step 208 of FIG. 2 and/or the establishment of the connection at step 508 of FIG. 5, in some examples. As such, the connection at step 708 of FIG. 7 may include a pairing process, and may also include a synchronization of pseudo random bit generator(s) included in the data device 614 and the receiving device 650, in some examples.

The connection between the data device 614 and the receiving device 650 may be the result of a registration process. For example, in order to establish a connection between the data device 614 and the receiving device 650 for the first time, the user of the data device 614 may need to register the data device 614 with the receiving device 650. To do so, the user may access a website associated with the receiving device 650, or the user may download and execute an application (e.g., a mobile app) that is associated with the receiving device 650, or the user may access the receiving device 650 in any other manner. Then the user may set up an account (e.g., by inputting a user name and/or password). This may register the data device 614 with the receiving device 650. The registration may result in information being generated for both the data device 614 and the receiving device 650. For example, the registration may result in an authentication code 632 being generated for both the data device 614 and the receiving device 650. As another example, the registration may result in an authentication code 632, an entropy input, and a personalization value being generated for both the data device 614 and the receiving device 650.

In other examples, the connection between the data device 614 and the receiving device 650 may be the result of the data device 614 initiating a communication session with the receiving device 650 after the data device 614 has already been registered with the receiving device 650. For example, this initiation may occur immediately after the registration process has been finished. As another example, this initiation may occur any subsequent time that the data device 614 attempts to connect with the receiving device 650 (e.g., the second time that the data device 614 attempts to connect with the receiving device, the fourth time, the 100th time). The initiation may be the result of the user of the data device 614 accessing the website associated with the receiving device 650, the user opening the application (e.g., the mobile app) that is associated with the receiving device 650, or any other manner of connecting with the receiving device 650 after the registration. The initiation may also result in an authentication code 632 being generated for both the data device 614 and the receiving device 650, in some examples. In such examples, a new authentication code 632 may be generated for both the data device 614 and the receiving device 650 each time the user opens the mobile app that is associated with the receiving device 650.

At step 712, the data device 614 determines the authentication code 632. The authentication code 632 is a set of data that authenticates the data device 614. Furthermore, the authentication code 632 is used to detect whether the data device 614 is compromised, in some examples. The data device 614 may determine the authentication code 632 in any manner. For example, the data device 614 may generate the authentication code 632, receive the authentication code 632 (e.g., from the receiving device 650, from another entity or application (such as GOOGLE authenticator)), select the authentication code 632 (e.g., select it from a group of possible authentication codes), determine the authentication code 632 in any other manner, or any combination of the preceding. In some examples, the data device 614 may determine the authentication code 632 when it is generated (or otherwise determined) during step 708 of FIG. 7.

At step 716, the data device 614 performs one or more tests 634 on the data device 614. Each of these tests 634 may indicate whether the data device 614 is compromised. Examples of these tests 634 are discussed above with regard to FIGS. 6A-6B. The tests 634 may be performed in any manner. For example, the processor of the data device 614 may execute or run each test 634 in order to perform the test 634. A test 634 may be performed on any portion of the data device 614. For example, a test 634 may be performed on the operating system of the data device 614, on software running on the data device 614 (e.g., on the mobile app that is communicating with the receiving device 650), on software installed on the data device 614, on any other portion of the data device 614, or any combination of the preceding. The data device 614 may perform any number of tests 634. For example, the data device 614 may perform one test 634, two tests 634, four tests 634, eight tests 634, ten tests 634, or any other number of tests 634.

Although the data device 614 may perform one or more test(s) 634 that indicate whether the data device 614 is compromised, in some examples, the data device 614 may not determine (or otherwise realize) that it has been compromised. Instead, the data device 614 may merely perform test(s) 634 and modify data based on the results of those test(s) 634. In this example, if an unauthorized user (e.g., a hacker) is using the compromised data device 614, the unauthorized user will not receive any indication that the compromised data device 614 has been detected. Instead, everything will appear to be working properly to the unauthorized user. This may prevent the unauthorized from trying to defeat this detection, in some examples. In other examples, the data device 614 may determine (or otherwise realize) that it has been compromised.

At step 720, the data device 614 determines whether the data device 614 passed the test(s) 634. The data device 614 may make this determination in any manner. For example, the data device 614 may determine that the data device 614 passed the test 634 if the results of the test 634 (e.g., "passed", "positive", "failed", "negative") indicate that the device is not compromised. As another example, the data device 614 may determine that the data device 614 failed the test 634 if the results of the test 634 (e.g., "passed", "positive", "failed", "negative") indicate that the device is compromised. As just one example of this, the test 634 may cause the data device 614 to search for a "Cydia" file. In such an example, the data device 614 determines that it passed this test 634 if the result is "negative" (i.e., the "Cydia" file was not found), which indicates that the data device 614 is not compromised. Alternatively, the data device 614 determines that it failed this test if the result is "positive" (i.e., the "Cydia" file was found), which indicates that the data device 614 is compromised.

If the data device 614 passes the test(s) 634, the method 700 moves to step 724, where the data device 614 manipulates the authentication code 632 to generate a first seed value. Alternatively, if the data device 614 fails the test(s) 634, the method 700 moves to step 728, where the data device 614 manipulates the authentication code 632 to generate a second seed value. The data device 614 may manipulate the authentication code 632 in any manner to generate a first seed value (at step 724) or a second seed value (at step 728). As one example of this, the manipulation may be a two-stage process. In the first stage, the data device 614 may first utilize one or more of the mathematical methods (of the manipulation methods 636) to manipulate one more numbers in the authentication code 632. Then, in the second stage, the data device 614 may utilize a seed generation method (also of the manipulation methods 636) that further manipulates the authentication code 632 to generate the first seed value (at step 724) or the second seed value (at step 728).

In the first stage, the manipulation performed at step 724 is different than the manipulation performed at step 728. In particular, the manipulation performed at step 724 (i.e., when the data device 614 passes the tests 634) utilizes different mathematical method(s) than does the manipulation performed at step 728 (i.e., when the data device 614 fails the tests 634), in some examples. For example, when the data device 614 passes the test(s) 634, a first mathematical method (e.g., add "4" to the authentication code 632) is used to manipulate the authentication code 632 (at step 724). Alternatively, when the data device 614 fails the tests 634, a second different mathematical method (e.g., subtract "2" from the authentication code 632) is used to manipulate the authentication code 632 (at step 728). This causes the authentication code 632 to be manipulated in different ways depending on whether the data device 614 passed the test(s) 634 or not.

In some examples, the first stage (of step 724 or step 728) may be performed only once, no matter how many tests 634 are performed. As an example of this, if the data device 614 performs four different tests 634, the first stage manipulation of the authentication code 632 (of step 724 or step 728) may only be performed once. In such an example, the data device 614 may only determine that the data device 614 has passed the tests 634 if (and only if) the data device 614 first passes all of these four tests 634. If it does pass all of these four tests 634, the method 700 may finally move to step 724, where the authentication code 632 is manipulated (per the first stage). Alternatively, the data device 614 may determine that the data device 614 has failed the tests 634 if the data device 614 fails even one of the tests 634 (despite passing the others). If this occurs, the method 700 may then move to step 728, where the authentication code 632 is manipulated (per the first stage). In this example, there may be two different possible mathematical methods, and only one of them is used to manipulate the authentication code 632.

In other examples, the first stage may be performed for each and every test 634 that is performed. As an example of this, if the data device 614 performs four different tests 634, the first stage manipulation of the authentication code 632 (of step 724 or step 728) may also be performed four different times. In such an example, the data device 614 may perform the first test 634, and then it may immediately move to the first stage of step 724 or step 728, where a first mathematical method (e.g., subtract "2") is used to manipulate the authentication code 632 if the first test 634 was passed, or where a second mathematical method (e.g., subtract "10") is used to manipulate the authentication code 632 if the first test 634 was failed. Then the data device 614 may move back to step 716 where it performs the second test 634. It may then immediately move to the first stage of step 724 or step 728, where a third mathematical method (e.g., add "7") is used to manipulate the (already manipulated) authentication code 632 if the second test 634 was passed, or where a fourth mathematical method (e.g., subtract "0") is used to manipulate the (already manipulated) authentication code 632 if the second test 634 was failed. This may then be repeated for each of the two remaining tests 634. In this example, there may be eight different possible mathematical methods, and four of them are used to manipulate the authentication code 632 (i.e., one after each test 634).

The mathematical method(s) used in the first stage (of step 724 or step 728) may be determined in any manner. As one example, the mathematical method(s) may be selected from a list of possible mathematical methods (stored as manipulation methods 636). In such an example, the data device 614 may select two mathematical methods for each test 634 (or for the combination of tests 634). The first selected mathematical method may be used if data device 614 passes the test(s) 634, and the second selected mathematical method may be used if the data device 614 fails the test(s) 634. This selection process may then be repeated for each remaining test 634, if any. In other examples, the mathematical method(s) in the first stage may be generated (e.g., in real-time). The selection from the list (or the generation) of the mathematical method(s) may be made using a pseudo random bit generator and one or more seed values, in some examples.

Following the first stage (of step 724 or step 728), the data device 614 may move to the second stage, where the data device 614 utilizes one or more seed generation method(s) to generate the first seed value (at step 724) or the second seed value (at step 728) using the already manipulated authentication code 634. In the second stage, the data device 614 may utilize the same seed generation method (or methods) regardless of whether the data device 614 passed the test(s) 632 or failed the test(s) 632. However, this same seed generation method (or methods) generates a different seed value in step 724 (i.e., the first seed value) than the seed value in step 728 (i.e., the second seed value). This difference is the result of the different manipulation of the authentication code 632 that occurs in the first stage.

As one example of this, a test 634 performed by the data device 614 may cause the data device 614 to search for a "Cydia" file. In this example, if the data device 614 passes this test (i.e., the "Cydia" file was not found, which indicates that the data device 614 is not compromised), the data device 614 may utilize a first mathematical method to subtract "2" from the authentication code 632 "5879", so as to manipulate the authentication code 632 to be "5877". Alternatively, if the data device 634 fails this test (i.e., the "Cydia" file was found, which indicates that the data device 614 is compromised), the data device 614 may utilize a second mathematical method to add "4" to the authentication code 632 "5879", so as to manipulate the authentication code 632 to be "5883". In this example, there are two possible different authentication codes 632: (1) "5877" for a non-compromised data device 614; and (2) "5883" for a compromised data device 614. If the data device 614 is not compromised, the authentication code 632 "5877" may be combined with an entropy input and an optional personalization value to generate the first seed value (e.g., "9F4$["), in accordance with the seed generation method. Alternatively, if the data device 614 is compromised, the authentication code 632 "5883" may be combined with the entropy input and the optional personalization value to generate the second seed value (e.g., "H7dB5"), in accordance with the same seed generation method. As is seen in this example, a different seed value is generated depending on whether or not the data device 614 is compromised. That is, if the data device 614 is not compromised, a first seed value (e.g., "9F4$[") is generated. On the other hand, if the data device 614 is compromised, a second seed value (e.g., "H7dB5") is generated. Furthermore, this second seed value is different from the first seed value.

The data device 614 may utilize any seed generation method(s) in the second stage. In the illustrated example, the data device 614 utilizes a seed generation method that generates the seed value (i.e., either the first seed value or the second seed value) by combining the authentication code 632 (which has already been manipulated in the first stage) with an entropy input and a personalization value. The seed generation method(s) used in the second stage (of step 724 or step 728) may be determined in any manner. For example, it may be selected (e.g., from a list) or generated using a pseudo random bit generator and one or more seed values. In other examples, the data device 614 may only have a single seed generation method, and it may therefore select this single seed generation method as the one to utilize.

Following generation of the first seed value (at step 724) or the second seed value (at step 728), the data device 614 may enter a waiting process, where it waits for data 630 to be determined for transmittal, in some examples. In other examples, the generation of the first seed value (at step 724) or the second seed value (at step 728) may not occur until after data 630 has been determined for transmittal.

At step 732, the data device 614 determines data 630 for transmittal to the receiving device 650. The data device 614 may determine data 630 in any manner. For example, the data device 614 may determine the data 630 when it is input by a user (or any other entity). As an example of this, the user may input their social security number into a fillable graphical box displayed on the display screen of the data device 614 (or the social security number may be auto filled by a program running on the data device 614), and then the user may activate a button that authorizes the transmittal of the input social security number. When the user activates this button, the data device 614 may determine that this social security number is data 630 that is to be transmitted to the receiving device 650. As another example, the data device 614 may determine the data 630 when it is selected by a user (or any other entity). As an example of this, the user may select a file and/or document from storage (e.g., a word document stored on the data device 614 or accessible to the data device 614), and then the user may activate a button that authorizes the transmittal of the file and/or document. When the user activates this button, the data device 614 may determine that this file and/or document is data 630 that is to be transmitted to the receiving device 650. As another example of this, the user may select an option displayed on the display screen of the data device 614, and then the user may activate a button that authorizes the transmittal of the selected option. When the user activates this button, the data device 614 may determine that this selected option is data 630 that is to be transmitted to the receiving device 50. In other examples, the determination of the data 630 may not require user input at all. For example, the transmittal of data 630 may be an automated communication between two end points. In such an example, the determination of the data 630 may occur when the data 630 is selected (or otherwise input) by one of the end points.

At step 736, the data device 614 (optionally) determines a checksum of the data 630. The checksum may allow errors to be detected in the data 630. For example, the checksum may be used to detect errors that have been introduced into the data 630 during its transmission and/or storage. The data device 614 may determine the checksum in any manner. For example, the data device 614 may determine the checksum using a checksum algorithm. In some examples, the checksum may be derived from the data 630 in its raw form.

In some examples, the data device 614 may also (optionally) determine a timestamp for the data 630 at step 736 (or following step 736). This timestamp may be used to determine whether a packet sent from the data device 614 to the receiving device 650 is legitimate. The timestamp may be determined at step 736 (or following step 736), in some examples, because the timestamp (and/or the checksum, discussed above) may be added to the data 630 before the data is modified (at step 740).

At step 740, the data device 614 modifies the data 630 using a seed value. If the data device 614 is not compromised (i.e., it passed the test(s) 634), the data device 614 modifies the data 630 using the first seed value (generated at step 724). On the other hand, if the data device 614 is compromised (i.e., it failed one or more of the test(s) 634), the data device 614 modifies the data 630 using the second seed value (generated at step 728). The data device 614 modifies the data 630 using the seed value (either the first seed value or the second seed value), and a data modification method 638, in some examples. The data device 614 may modify the data 630 using any data modification method 638 so that the data 630 can be securely transferred to the receiving device 650.

As one example of this, the data device 614 may modify the data 630 using a data modification method 638 that utilizes the transmittal mapping data 78 and reception mapping data 84 (discussed in FIGS. 1A-3) to securely transfer the data 630 to the receiving device 650. In such an example, the data 630 is replaced with transmittal tokens 82, and these transmittal tokens 82 are transmitted to the receiving device 650 (as is discussed above in FIGS. 1A-3). The actual data 630 is not sent to the receiving device 650. Furthermore, as is also discussed above in FIGS. 1A-3, the transmittal tokens 82 may be generated using a seed value. This causes the data device 614 to generate different transmittal tokens 82 (and transmittal mapping data 78) when it utilizes the first seed value (i.e., if the data device 614 is not compromised), than when it utilizes the second seed value (i.e., if the data device 614 is compromised). In some examples, this type of modification of the data 630 may include one or more (or all) of steps 216-228 of FIG. 2. Furthermore, in some examples, the optional checksum and/or timestamp may be added to the data 630 before the data 630 is modified using this type of modification.

As another example, the data device 614 may modify the data 630 using a data modification method 638 that utilizes generated encryption keys (as is discussed in FIGS. 4A-5) to securely transfer the data 630 to the receiving device 650. In such an example, the data 630 is encrypted using an encryption method and the generated first encryption key, and this encrypted data 630 is transmitted to the receiving device 650 (as is discussed above in FIGS. 4A-5). Furthermore, as is also discussed above in FIGS. 4A-5. the first encryption key may be generated (e.g., in real-time) using a seed value. This causes the data device 614 to generate a different first encryption key when it utilizes the first seed value (i.e., if the data device 614 is not compromised), than when it utilizes the second seed value (i.e., if the data device 614 is compromised). In some examples, this type of modification of the data 630 may include one or more (or all) of steps 520-524 of FIG. 5. Furthermore, in some examples, the optional checksum and/or timestamp may not be added to the data 630 before the data 630 is modified using this type of modification. However, in these examples, the optional checksum and/or timestamp may be encoded using transmittal tokens 82. Examples of this encoding are discussed above with regard to FIGS. 1A-3.

The data modification method 638 used to modify the data 630 may be determined in any manner. As one example, it may be selected (e.g., from a list) using a pseudo random bit generator and one or more seed values. In other examples, the data device 614 may only have a single data modification method 638, and it may therefore select this single data modification method 638 as the one to utilize. In a further example, the data modification method 638 may be selected based on the size of the data 630. In such an example, if the size of the data 630 is less than a predetermined threshold, the data device 614 may select to modify the data 630 using a data modification method 638 that utilizes the transmittal mapping data 78 and reception mapping data 84 (discussed in FIGS. 1A-3). On the other hand, if the size of the data is equal to or greater than the predetermined threshold, the data device 614 may select to modify the data 630 using a data modification method 638 that utilizes generated encryption keys (as is discussed in FIGS. 4A-5), or vice versa. The data device 614 may then insert a flag into the packet that indicates what data modification method 638 was used, or what the size of the data was, in some examples. The predetermined threshold may be any amount of data 630. As an example, the predetermined threshold may be 8 bytes, 16 bytes, 32 bytes, 64 bytes, 128 bytes, 256 bytes, 512 bytes, 1 kilobyte, 1 megabyte, 1 gigabyte, any other amount of data 630, or any amount of data 630 in-between 1 byte and 1 terabyte. In some examples, the predetermined threshold may be a measure of the amount of data 630 prior to the addition of chaff tokens, header, checksum, timestamp, and/or any other additional information included in the packet.

At step 744, the data device 414 generates a packet. The packet may be generated in any manner. In some examples, the packet may include additional information, such as an identifier (e.g., a header, trailer, etc.). The identifier of the packet may include an identification code (which may identify the packet as having been sent by the data device 614), a timestamp (which may identify the time and/or date the packet was created and/or transmitted by the data device 614, such as in a yyyy.dd.HH.mm.sss format or any other format and at any time resolution), a parsing format identifier (which may identify how the packet was formed and how the data can be de-parsed), the determined checksum, a sequence number that may help to identify and recover from the event of a dropped packet or out of order packets within the communication between two devices, any other data, or any combination of the preceding. The generation of the packet may also optionally include adding one or more chaff tokens to the packet, in some examples. Examples of this addition of one or more chaff tokens is discussed above in step 232 of FIG. 2.

At step 748, the data device 414 transmits the packet and the modified data. This modified data refers to the transmittal tokens 82 (that replaced the data 630), or it refers to the encrypted data 630, or it refers to any other data that was modified using a data modification method 638. The data device 414 may transmit the packet and the modified data to the receiving device 650. The data device 614 may transmit the packet and the modified data in any manner and over any communications network. For example, the data device 614 may transmit the packet and the modified data over the Internet (e.g., using a TCP communications protocol, using a HTTP communications protocol), a WI-FI network, a cellular network, a radio telecommunication network, a BLUETOOTH network, an NFC network, any other wireless network, any wired network (e.g., a PSTN), any other manner of transmission, or any combination of the preceding. The modified data may be included in the packet, in some examples. In other examples, the modified data may be separate from the packet.

Following transmittal of the packet and the modified data, the receiving device 650 receives the packet and the modified data at step 752. After receiving the packet and the modified data, the receiving device 650 determines whether the packet is legitimate at step 756. The receiving device 650 may determine whether the packet is legitimate in any manner. In some examples, this determination of whether the packet is legitimate (at step 756 of FIG. 7) is substantially similar to that of step 244 of FIG. 2. Furthermore, the receiving device 650 may determine whether the packet is legitimate at a different time or step than step 756. For example, the receiving device 650 may determine whether the packet is legitimate at step 780 (or following step 780, but before step 784).

At step 760, the receiving device 650 determines the authentication code 632. As is discussed above, the authentication code 632 determined by the receiving device 650 is the same as the authentication code 632 determined by the data device 614. The receiving device 650 may determine the authentication code 632 in any manner. For example, the receiving device 650 may generate the authentication code 632, receive the authentication code 632 (e.g., from the data device 614, from another entity or application (such as GOOGLE authenticator)), select the authentication code 632 (e.g., select it from a group of possible authentication codes), determine the authentication code 632 in any other manner, or any combination of the preceding. In some examples, the receiving device 650 may determine the authentication code 632 when it is generated (or otherwise determined) during step 708 of FIG. 7.

At step 764, the receiving device 650 manipulates the authentication code 632 to generate a third seed value. The receiving device 650 may manipulate the authentication code 632 in any manner to generate a third seed value. As one example of this, the manipulation may be a two-stage process. In the first stage, the receiving device 650 may utilize one or more of the mathematical methods (of the manipulation methods 636) to manipulate one more numbers in the authentication code 632. Then, in the second stage, the receiving device 650 may utilize a seed generation method (also of the manipulation methods 636) to further manipulate the authentication code 632 to generate the third seed value.

The first stage and the second stage of step 764 may be identical to the first and second stages of steps 724 and 728 (performed by the data device 614). However, in the first stage of step 764, the receiving device 650 only utilizes the mathematical method(s) that are associated with the data device 614 passing its test(s) 634 (not the ones that are associated with the data device 614 failing its test(s) 634). That is, the receiving device 650 assumes that the data device 614 passes all of its test(s) 634, and it manipulates the authentication code 632 as if the data device 614 did pass its test(s) 634 (even if it did not, in actuality).

As one example of this, a test 634 (performed by the data device 614, at step 716) may be associated with two different mathematical methods: (1) a first mathematical method (e.g., add "4" to the authentication code 632) for a passed test; and (2) a second different mathematical method (e.g., subtract "2" from the authentication code 632) for a failed test. In such an example, the receiving device 650 assumes that the data device 614 passes this test 634, and it performs the first mathematical method (e.g., add "4" to the authentication code 632) for the passed test. As a result of this, when the data device 614 is compromised, the data device 614 manipulates its authentication code 632 to be a different code than what the receiving device 650 manipulates its authentication code 632 to be.

Furthermore, although the receiving device 650 utilizes the mathematical method(s) that are associated with the data device 614 passing its test(s) 634, the receiving device 650 does not perform any of the tests 634, in some examples. Only the data device 614 performs test(s) 634, in some examples.

Similar to that of steps 724 and 728, the first stage of step 764 may, in some examples, be performed only once, no matter how many tests 634 are performed by the data device 614. In other examples, the first stage of step 764 may be performed for each and every test 634 that is performed by the data device 614. In such an example, if the data device 614 performs four tests 634, the receiving device 650 assumes that the data device 614 passed all four tests, and the receiving device 650 performs the four mathematical methods for the four passed tests.

The mathematical methods used in the first stage of step 764 may be determined in any manner that causes the receiving device 650 to determine the same mathematical methods that would be utilized by the data device 614 if the data device 614 passes all of its tests 634. As one example of this, the mathematical methods may be selected from a list of possible mathematical methods (stored as manipulation methods 636). In such an example, the receiving device 650 may select two mathematical methods for each test 634 (or for the combination of tests 634). The first selected mathematical method may be associated with a passed test 634, and the second selected mathematical method may be associated with a failed test 634. In this example, the receiving device 650 will utilize the first selected mathematical method associated with the passed test 634 (not the second selected mathematical method associated with the failed test 634). This selection process may then be repeated for each remaining test 634, if any. In other examples, the mathematical methods in the first stage may be generated (e.g., in real-time). The determination of the mathematical method(s) may be made using the same pseudo random bit generator and the same seed value (e.g., the original authentication code 632) that was used by the data device 614, in some examples. This use of the same pseudo random bit generator and the same seed value may cause the receiving device 650 and the data device 614 to determine the same mathematical methods for the test(s) 634.

Following the first stage of 764, the receiving device 650 may move to the second stage, where the receiving device 650 utilizes a seed generation method (or methods) to generate the third seed value using the already manipulated authentication code 634. To generate the third seed value, the receiving device 650 utilizes the same seed generation method (or methods) that was used by the data device 614 (in step 724 or 728). This seed generation method may be determined in any manner that causes the receiving device 650 to determine the same seed generation method as the data device 614. As one example, the seed generation method may be determined using the same pseudo random bit generator and the same seed value (e.g., the original authentication code 632) that was used by the data device 614.

The third seed value (generated at step 764) matches the first seed value (from step 724), in some examples. That is, the third seed value matches the first seed value that is generated if the data device 614 is not compromised. The third seed value matches the first seed value when the two values are identical (e.g., "9F4$k{" and "9F4$k{"), in some examples.

At step 768, the receiving device 650 de-modifies the modified data received from the data device 614. The receiving device 650 de-modifies this modified data using the third seed value (generated at step 764). To de-modify the modified data, the receiving device 650 utilizes the same data modification method 638 that was used by the data device 614 (in step 740) to modify the data 630, in some examples. The data modification method 638 may be determined in any manner that causes the receiving device 650 to determine the same data modification method 638 as the data device 614. As one example, the data modification method 638 may be identified in the packet (e.g., in the header of the packet) received from the data device 614. As another example, the data modification method 638 may be determined using the same pseudo random bit generator and the same seed value (e.g., the original authentication code 632) that was used by the data device 614. In other examples, the data modification method 638 may be determined based on the size of the modified data, an example of which is discussed above with regard to step 740.

As one example of the de-modification, the receiving device 650 may de-modify the modified data using the data modification method 638 that utilizes the transmittal mapping data 78 and reception mapping data 84 (discussed in FIGS. 1A-3). In such an example, the modified data includes the transmittal tokens 82 (and it does not include the actual data 630). Furthermore, in such an example, the receiving device 650 may determine the reception mapping data 84 using the third seed value. Then, the receiving device 650 may determine (e.g., rebuild) the data 630 using this reception mapping data 84. In some examples, this type of de-modification may include one or more (or all) of steps 248-260 of FIG. 2.

In another example of the de-modification, the receiving device 650 may de-modify the modified data using the data modification method 638 that utilizes generated encryption keys (as is discussed in FIGS. 4A-5). In such an example, the modified data includes the data 630, which has been encrypted using a first generated key. The receiving device 650 may generate (e.g., in real-time) a second encryption key using the third seed value. Then the receiving device 650 may use this second encryption key to de-crypt the encrypted data 630. In some examples, this type of de-modification may include one or more (or all) of steps 544-548 of FIG. 5.

At step 772, the receiving device 650 determines whether the de-modification of the modified data was successful. The de-modification of the modified data is only successful if the data device 614 is not compromised, in some examples. If the data device 614 is compromised, the de-modification cannot be successful, in some examples. The reason for this is that the data device 614 uses different seed values to modify the data 630, based on whether or not the data device 614 is compromised. That is, the data device 614 uses a first seed value if the data device 614 is not compromised (i.e., the data device 614 passes its test(s) 634), and the data device 614 uses a second seed value if the data device is compromised (i.e., the data device 614 fails its test(s) 634). Furthermore, the receiving device 650 de-modifies the modified data using a third seed value that matches the first seed value (not the second seed value). Therefore, the receiving device 650 can only de-modify the modified data if that data was modified using the first seed value (i.e., the data device 614 is not compromised).

The receiving device 650 may determine whether the de-modification was successful in any manner. For example, if the de-modification was not successful, the result of the de-modification may be unreadable, undecipherable, or unusable. On the other hand, if the de-modification was successful, the result of the de-modification may be readable, decipherable, or usable. As such, in some examples, the receiving device 650 may parse the result of the de-modification in order to determine whether the result is readable, decipherable, or usable. A successful de-modification of the modified data may transform the modified data into data 630, in some examples.

If the de-modification was not successful, the method moves to step 776 where the receiving device 650 discards the modified data (and/or the packet). That is, the receiving device 650 will not utilize the modified data (or the data 630) at all. This is because the data device 614 is compromised, and may present a security risk to the receiving device 650.

The receiving device 650 discards the modified data without alerting the data device 614 to the problem, in some examples. In this example, if an unauthorized user (e.g., a hacker) is using the compromised data device 614, the unauthorized user will not receive any indication that the compromised data device 614 has been detected and that the data 630 is just being discarded. Instead, everything will appear to be working properly to the unauthorized user. In other examples, the receiving device 650 may inform the data device 614 and its user of the detection. In some examples, the receiving device 650 may mark the data device 614 as compromised. As a result of this, the receiving device 650 may discard any further data (and/or packets) received from the data device 614 (without attempting to de-modify the modified data at all), may transmit a message to a user of the receiving device 650 informing the user of the compromised data device 614, may perform any other function corresponding to a compromised data device, or may perform any combination of the preceding. The method may then move to step 792, where the method 700 ends.

On the other hand, if the de-modification was successful, the method 700 moves to step 780 where the receiving device 650 (optionally) determines a second checksum of the data 630, and compares it to the checksum received from the data device 614. The checksum may allow errors to be detected in the data 630. For example, the checksum may be used to detect errors that have been introduced into the data 630 during its transmission and/or storage. The receiving device 650 may determine the checksum in any manner. For example, the receiving device 650 may determine the checksum using a checksum algorithm. In some examples, the checksum may be derived from the data 630 in its raw form. The receiving device 650 may compare the two checksums in any manner. For example, the receiving device 650 may compare the two checksums using a CRC. If the two checksums match, the method 700 moves to step 784 where the data 630 is transmitted for use. If the two checksums do not match, the receiving device 650 may discard the data 630 (as it may include errors), and may request that the data device 614 re-transmit the data 630 again.

In some examples, at step 780 (or following step 780, but before step 784), the receiving device 650 may also (optionally) determine whether the packet was received within a predetermined amount of time. This determination may be made using the timestamp discussed above. Examples of this determination are discussed above in FIGS. 1A-3.

At step 784, the receiving device 650 transmits the data 630 for use. In some examples, the receiving device 650 may transmit the data 630 for use by the receiving device 650. For example, the data 630 may be transmitted to an application or other program that is being executed by the processor of the receiving device 650. This may allow the application or other program to use or otherwise access the data 630. In other examples, the receiving device 650 may transmit the data 630 to the user of the receiving device 650. In such an example, the transmission of the data 630 may refer to a transmission that causes the data 630 to be displayed on a display screen (e.g., displayed on a display screen of a Smartphone), and/or a transmission that causes the data 630 to be output to another user interface (e.g., output as sound from speakers or earphones of a mobile device). As such, the user may view, listen to, or otherwise access the data 630. In additional examples, the receiving device 650 may transmit the data 630 to another device (e.g., a server that will store the data 630, a television that will display the data 630). In other examples, the transmission of the data 630 may refer to any other manner in which the receiving device 650 may utilize the data 630. For example, the transmission of the data 630 may refer to the receiving device 650 storing the data 630 in memory (e.g., storage on disk).

At step 788, the data device 614 determines whether to transmit additional data 630. The data device 614 may determine whether to transmit additional data 630 for any reason. For example, a user of data device 614 may have selected to have additional data 630 transmitted. As another example, an application, program, and/or device on data device 614 may have provided additional data 630 to the data device 614 for transmittal. As a further example, the data device 614 may have received a request from the receiving device 650 for additional data 630.

If it is determined at step 788 that additional data 630 should not be transmitted, the method 700 moves to step 792, where the method 700 ends. On the other hand, if it is determined that additional data 630 should be transmitted, the method 700 moves back up to step 732, where the data device 614 determines the additional data 630 for transmittal to the receiving device 650. Then the method 700 re-performs one or more (or all) of steps 732-756, 768, and 780-788 so as to securely transfer the additional data 630. In doing so, the data device 614 and the receiving device 650 may modify the data 630 (at step 740) and de-modify the modified data (at step 768) using identical seed values that are generated by their pseudo random bit generator(s) (which are synchronized in accordance with the examples discussed above).

As can be seen above, the method 700 may skip steps 712-728, 760-764, and 772-776 when securely transferring the additional data 630. The reason for this is that the receiving device 650 has already determined that the data device 614 is not compromised during this communication session. As such, there is no need to repeat these steps during this communication session. If the communication session ends, however, method 700 may need to be repeated in its entirety for additional communication sessions (e.g., the next time the user opens the mobile app on the data device 614).

The steps 732-756, 768, and 780-788 may be re-performed for any number of times, so as to securely transfer any amount of data. Furthermore, the steps 732-756, 768, and 780-788 may continue to be performed even if a particular transmission of data 630 does not reach its intended recipient (i.e., the receiving device 650) and/or if the transmission of data 630 is received by the receiving device 650 in the wrong order. Examples of this are also discussed above.

Modifications, additions, or omissions may be made to method 700. For example, although the steps of method 700 are described above as being performed by data device 614 or receiving device 650, in some examples, one or more of the steps of method 700 may be performed by any other device. As another example, one or more steps of method 700 may be optional, or may not be performed. For example, method 700 may not include steps 736 and 780, regarding checksums. As a further example, the steps of method 700 may be performed in parallel or in any suitable order.

Furthermore, in some examples, system 610 is not limited to only transferring data 630 from the data device 614 to the receiving device 650. For example, the receiving device 650 may perform steps 732-748 to transmit data 630 to data device 614, and the data device 614 may perform steps 752-756, 768, and 780-788 to determine this data 630. That is, both devices may utilize the same steps to communicate back and forth between each other.

System 610 and method 700 may provide one or more advantages over traditional methods for detecting a compromised device, in some examples. Specifically, many traditional methods for detecting a compromised device may be defeated (or otherwise interfered with) by software changes at the device. For example, a user may interfere with traditional detection methods by modifying the software code in the device (e.g., the software code running on the mobile app and that is associated with the receiving device) to cause the device to skip one or more of the checks that would determine whether the device is compromised. This, however, may not interfere with the detection method performed by system 610 and method 700 of FIGS. 6A-7, in some examples. For example, if this occurred in system 610 and method 700, the data device 614 would be unable to properly modify the authentication code 632 because one or more of the tests 634 were skipped (due to the software modifications). This would result in the data 630 being modified using a seed value that does not match the seed value generated at the receiving device 650—and would therefore cause the receiving device 650 to not be able to successfully de-modify the modified data, in some examples.

As another example, a user may interfere with traditional detection methods by decompiling the software code (e.g., app code) and changing it to delete the checks or to make them always return the correct response. This, however, may not interfere with the detection method performed by system 610 and method 700 of FIGS. 6A-7, in some examples. For example, as is discussed above, one of the tests 634 performed by the data device 614 may be a test that verifies that the entirety of an application's code has not been altered in any way. In such an example, the result of this test 634 would be a failed test (i.e., indicating that the data device 614 is compromised). This would result in the data 630 being modified using a seed value that does not match the seed value generated at the receiving device 650—and would therefore cause the receiving device 650 to not be able to successfully de-modify the modified data, in some examples.

As a further example, a user may interfere with traditional detection methods by modifying the code of the actual checks, causing them to be called (or otherwise executed) by the data device 614, but further causing them to not do anything when called. This, however, may not interfere with the detection method performed by system 610 and method 700 of FIGS. 6A-7, in some examples. For example, as is discussed above, system 610 and method 700 modifies the authentication code 632 based on whether or not the test 634 was passed or failed. If the test 634 were modified to not do anything when called, there would be no determination of whether the test 634 passed or failed. As such, the data device 614 would be unable to properly modify the authentication code 632 because one or more of the tests 634 was neither passed nor failed. This would result in the data 630 being modified using a seed value that does not match the seed value generated at the receiving device 650—and would therefore cause the receiving device 650 to not be able to successfully de-modify the modified data, in some examples. Additionally, as is also discussed above, one of the tests 634 performed by the data device 614 may be a test that verifies that the entirety of an application's code has not been altered in any way. In such an example, the result of this test 634 would be a failed test (i.e., indicating that the data device 614 is compromised) because the test 634 was modified to not do anything. This would result in the data 630 being modified using a seed value that does not match the seed value generated at the receiving device 650—and would therefore cause the receiving device 650 to not be able to successfully de-modify the modified data, in some examples.

In various examples, the herein described systems (e.g., system 10, system 410, system 610), devices (e.g., data device 14, receiving device 50, data device 414, receiving device 450, data device 614, receiving device 650), components of the devices, and methods may be implemented in software, firmware, or executable instructions stored in a data storage medium such as or including machine-readable medium. The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. Some examples may be implemented using a machine-readable medium or article which may store an instruction or a set of instructions that, if executed by a machine, may cause the machine to perform a method and/or operations in accordance with the examples. Such a machine may include, for example, any suitable processing platform, computing platform, computing device, processing device, computing system, processing system, computer, processor, or the like, and may be implemented using any suitable combination of hardware and/or software. Computers and computer systems described herein (e.g., data device 14, receiving device 50, data device 414, receiving device 450, data device 614, receiving device 650) may include operatively associated computer-readable memory media such as memory for storing software applications and instructions used in obtaining, processing, storing or communicating data. It can be appreciated that such memory can be internal, external, remote or local with respect to its operatively associated computer or computer system. Memory may also include any manner of storing software or other instructions including, for example and without limitation, a hard disk, an optical disk, floppy disk, DVD, compact disc, memory stick, ROM (read only memory), RAM (random access memory), PROM (programmable ROM), EEPROM (extended erasable PROM), or other like computer-readable media. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like.

It will be further apparent to one of ordinary skill in the art that some of the examples as described hereinabove may be implemented in many different examples of instruction (e.g., software or firmware) and hardware. The instructions may include any suitable type of code, such as source code, compiled code, interpreted code, executable code, static code, dynamic code, and the like. The actual software code or specialized control hardware used to implement some of the illustrated examples do not limit the present disclosure. The instructions may be implemented, for example, using any suitable programing language, which may include high-level, low-level, object-oriented, visual, compiled or interpreted programming languages, such as, but not limited to, C, C++, C#, Java, BASIC, SQL, Perl, Matlab, Pascal, Visual BASIC, Go, Python, Java Script, Typescript, Objective C, Swift, assembly language, machine code, and so forth. The examples are not limited in this context.

The methods (e.g., method 100, method 500, method 700), systems (e.g., system 10, system 410, system 610), devices (e.g., data device 14, receiving device 50, data device 414, receiving device 450, data device 614, receiving device 650), and components of the devices have been illustrated and described herein as comprising several separate functional elements, such as modules or units. Although certain of such modules or units may be described by way of example, it can be appreciated that a greater or lesser number of modules or units may be used and still fall within the scope of the examples. Further, although various examples may be described in terms of modules or units to facilitate description, such modules or units may be implemented by one or more hardware components (e.g., embedded systems/peripherals, processors, chips, FPGAs, DSPs, PLDs, ASICs, circuits, registers, servers, clients, network switches and routers), software components (e.g., programs, subroutines, logic) and/or combination thereof. It can be appreciated that, in certain aspects, a single component may be replaced by multiple components, and multiple components may be replaced by a single component, to provide an element or structure or to perform a given function or functions. Except where such substitution would not be operative to practice certain examples of the present disclosure, such substitution is considered within the scope of the present disclosure. In one example, all or a portion of the system, its features or functional elements, modules, units, etc. or one or more steps of the method may be associated with, implemented by, executed on, or embedded in (e.g., as embedded software/firmware) one or more hardware components. Further, such one or more components so configured may be installed or associated with one or more devices and therein configured to perform the herein described system functionalities or methods. The modules or units may comprise, or be implemented as, one or more systems, sub-systems, devices, components, circuits, logic, programs, or any combination thereof, as desired for a given set of design or performance constraints. For example, the modules may comprise electronic elements fabricated on a substrate. In various implementations, the electronic elements may be fabricated using silicon-based IC processes such as complementary metal oxide semiconductor (CMOS), bipolar, and bipolar CMOS (BiCMOS) processes, for example. The examples are not limited in this context.

It may be appreciated that terms such as "processing", "generating", "determining", or the like, unless stated otherwise, refer to the action or processes of a computer or computing system, or similar electronic computing device, that manipulates or transforms data represented as physical quantities (e.g., electronic) within the computing system's registers or memories into other data similarly represented as physical quantities within the computing system's memories, registers or other such information storage, transmission or display devices. The examples are not limited in this context. An action such as "identifying" or "matching" when performed by a computer or computer system may include identification by determining, accessing system data, comparisons with system data, instructions, or the like. An action such as initiating may include causing an event or thing initiated either directly or indirectly. For example, initiating may include signaling, providing power or instructions, physical manipulation, transmission of data, calculation of conditions, or other step resulting in the event sought to be initiated. Furthermore, an action such as "storing", when used in reference to a computer or computer system, refers to any suitable type of storing operation including, for example, storing a value to memory, storing a value to cache memory, storing a value to a processor register, and/or storing a value to a non-volatile data storage device.

This specification has been written with reference to various non-limiting and non-exhaustive examples. However, it will be recognized by persons having ordinary skill in the art that various substitutions, modifications, or combinations of any of the disclosed examples (or portions thereof) may be made within the scope of this specification. Thus, it is contemplated and understood that this specification supports additional examples not expressly set forth in this specification. Such examples may be obtained, for example, by combining, modifying, or reorganizing any of the disclosed steps, components, elements, features, aspects, characteristics, limitations, and the like, of the various non-limiting and non-exhaustive examples described in this specification. In this manner, Applicant reserves the right to amend the claims during prosecution to add features as variously described in this specification.

What is claimed is:

1. A system, comprising:
 a first computing device comprising:
  one or more first memory units; and
  one or more first processors coupled to the first memory units and configured, upon executing one or more first instructions, to:
   determine an authentication code;
   perform one or more tests that indicate whether the first computing device is compromised;
   in response to a determination that the first computing device passed the one or more tests, manipulate the authentication code to generate a first seed value;
   in response to a determination that the first computing device failed the one or more tests, manipulate the authentication code to generate a second seed value;

determine data for transmittal to a second computing device;

modify the data using the first seed value or the second seed value; and transmit the modified data for receipt by the second computing device.

2. The system of claim 1, wherein the second computing device is configured to:

receive the modified data transmitted by the first computing device;

determine the authentication code;

manipulate the authentication code to generate a third seed value that matches the first seed value;

de-modify the modified data using the third seed value;

determine whether the de-modification was successful;

in response to a determination that the de-modification was not successful, discard the data; and in response to a determination that the de-modification was successful, transmit the data for use.

3. The system of claim 1, wherein, to perform the one or more tests and manipulate the authentication code to generate the first seed value or the second seed value, the one or more first processors are further configured, upon executing the one or more first instructions, to:

for each test of the one or more tests:
perform the respective test;
in response to a determination that the first computing device passed the respective test, perform a respective first mathematical method on one or more numbers included in the authentication code; and
in response to a determination that the first computing device failed the respective test, perform a respective second mathematical method on the one or more numbers included in the authentication code; and perform a seed generation method on the authentication code to generate the first seed value or the second seed value, wherein the authentication code has been manipulated based on the determination for each test of the one or more tests.

4. The system of claim 1, wherein, to modify the data using the first seed value or the second seed value, the one or more first processors are further configured, upon executing the one or more first instructions, to:

generate a first encryption key using the first seed value or the second seed value; and encrypt, using the first encryption key, the data to form the modified data.

5. The system of claim 1, wherein, to modify the data using the first seed value or the second seed value, the one or more first processors are further configured, upon executing the one or more first instructions, to:

determine one or more transmittal tokens;

break the data into one or more portions; and replace each of the one or more portions of the data with a transmittal token of the one or more transmittal tokens to form the modified data.

6. The system of claim 1, wherein the first computing device is a mobile telephone, and wherein the one or more tests indicate whether the mobile device is jailbroken or rooted.

7. The system of claim 1, wherein, to modify the data using the first seed value or the second seed value, the one or more first processors are further configured, upon executing the one or more first instructions, to:

determine a size of the data;

in response to a determination that the size of the data is below a predetermined threshold, select a first data modification method;

in response to a determination that the size of the data is equal to or greater than the predetermined threshold, select a second data modification method; and modify the data using the first seed value or the second seed value, and further using the first data modification method or the second data modification method.

8. The system of claim 1, further comprising:

the second computing device comprising:
one or more second memory units; and
one or more second processors coupled to the second memory units and configured, upon executing one or more second instructions, to:
receive the modified data transmitted by the first computing device;
determine the authentication code;
manipulate the authentication code to generate a third seed value that matches the first seed value;
de-modify the modified data using the third seed value;
determine whether the de-modification was successful;
in response to a determination that the de-modification was not successful, discard the data; and
in response to a determination that the de-modification was successful, transmit the data for use.

9. A method, comprising:

determining, by one or more processors of a first computing device, an authentication code;

performing, by the one or more processors of the first computing device, one or more tests that indicate whether the first computing device is compromised;

in response to a determination that the first computing device passed the one or more tests, manipulating, by the one or more processors of the first computing device, the authentication code to generate a first seed value;

in response to a determination that the first computing device failed the one or more tests, manipulating, by the one or more processors of the first computing device, the authentication code to generate a second seed value;

determining, by the one or more processors of the first computing device, data for transmittal to a second computing device;

modifying, by the one or more processors of the first computing device, the data using the first seed value or the second seed value; and transmitting, by the one or more processors of the first computing device, the modified data for receipt by the second computing device.

10. The method of claim 9, further comprising:
receiving, by one or more processors of the second computing device, the modified data transmitted by the first computing device;
determining, by the one or more processors of the second computing device, the authentication code;
manipulating, by the one or more processors of the second computing device, the authentication code to generate a third seed value that matches the first seed value;
de-modifying, by the one or more processors of the second computing device, the modified data using the third seed value;
determining, by the one or more processors of the second computing device, whether the de-modification was successful;
in response to a determination that the de-modification was not successful, discarding, by the one or more processors of the second computing device, the data; and
in response to a determination that the de-modification was successful, transmitting, by the one or more processors of the second computing device, the data for use.

11. The method of claim 9, wherein performing the one or more tests and manipulating the authentication code to generate the first seed value or the second seed value comprises:
for each test of the one or more tests:
performing the respective test;
in response to a determination that the first computing device passed the respective test, performing a respective first mathematical method on one or more numbers included in the authentication code; and
in response to a determination that the first computing device failed the respective test, performing a respective second mathematical method on the one or more numbers included in the authentication code; and
performing a seed generation method on the authentication code to generate the first seed value or the second seed value, wherein the authentication code has been manipulated based on the determination for each test of the one or more tests.

12. The method of claim 9, wherein modifying the data using the first seed value or the second seed value comprises:
generating a first encryption key using the first seed value or the second seed value; and
encrypting, using the first encryption key, the data to form the modified data.

13. The method of claim 9, wherein modifying the data using the first seed value or the second seed value comprises:
determining one or more transmittal tokens;
breaking the data into one or more portions; and
replacing each of the one or more portions of the data with a transmittal token of the one or more transmittal tokens to form the modified data.

14. The method of claim 9, wherein the first computing device is a mobile telephone, and wherein the one or more tests indicate whether the mobile device is jailbroken or rooted.

15. A tangible non-transitory computer readable medium comprising logic configured, when executed by one or more processors of a first computing device, to:
determine an authentication code;
perform one or more tests that indicate whether the first computing device is compromised;
in response to a determination that the first computing device passed the one or more tests, manipulate the authentication code to generate a first seed value;
in response to a determination that the first computing device failed the one or more tests, manipulate the authentication code to generate a second seed value;
determine data for transmittal to a second computing device;
modify the data using the first seed value or the second seed value; and
transmit the modified data for receipt by the second computing device.

16. The tangible non-transitory computer readable medium of claim 15, wherein the second computing device is configured to:
receive the modified data transmitted by the first computing device;
determine the authentication code;
manipulate the authentication code to generate a third seed value that matches the first seed value;
de-modify the modified data using the third seed value;
determine whether the de-modification was successful;
in response to a determination that the de-modification was not successful, discard the data; and
in response to a determination that the de-modification was successful, transmit the data for use.

17. The tangible non-transitory computer readable medium of claim 15, wherein, to perform the one or more tests and manipulate the authentication code to generate the first seed value or the second seed value, the logic is further configured, when executed by the one or more processors of the first computing device, to:
for each test of the one or more tests:
perform the respective test;
in response to a determination that the first computing device passed the respective test, perform a respective first mathematical method on one or more numbers included in the authentication code; and
in response to a determination that the first computing device failed the respective test, perform a respective second mathematical method on the one or more numbers included in the authentication code; and
perform a seed generation method on the authentication code to generate the first seed value or the second seed value, wherein the authentication code has been manipulated based on the determination for each test of the one or more tests.

18. The tangible non-transitory computer readable medium of claim 15, wherein, to modify the data using the first seed value or the second seed value, the logic is further configured, when executed by the one or more processors of the first computing device, to:
generate a first encryption key using the first seed value or the second seed value; and
encrypt, using the first encryption key, the data to form the modified data.

19. The tangible non-transitory computer readable medium of claim 15, wherein, to modify the data using the first seed value or the second seed value, the logic is further configured, when executed by the one or more processors of the first computing device, to:
- determine one or more transmittal tokens;
- break the data into one or more portions; and
- replace each of the one or more portions of the data with a transmittal token of the one or more transmittal tokens to form the modified data.

20. The tangible non-transitory computer readable medium of claim 15, wherein the first computing device is a mobile telephone, and wherein the one or more tests indicate whether the mobile device is jailbroken or rooted.

* * * * *